US010887319B2

(12) United States Patent
Zezza

(10) Patent No.: US 10,887,319 B2
(45) Date of Patent: Jan. 5, 2021

(54) SYSTEMS AND METHODS FOR DEPLOYING AND MANAGING SECURE LIMITED-ADMINISTRATION SERVER SYSTEMS

(71) Applicant: One-Simple U.S., LLC, Greenville, NY (US)

(72) Inventor: Louisa H. Zezza, Palm Beach, FL (US)

(73) Assignee: One-Simple U.S., LLC, Greenville, NY (US)

( * ) Notice: Subject to any disclaimer, the term of this patent is extended or adjusted under 35 U.S.C. 154(b) by 152 days.

(21) Appl. No.: 16/016,150

(22) Filed: Jun. 22, 2018

(65) Prior Publication Data

US 2019/0394206 A1 Dec. 26, 2019

(51) Int. Cl.
*H04L 29/06* (2006.01)
*H04L 12/24* (2006.01)
*H04L 29/08* (2006.01)

(52) U.S. Cl.
CPC .......... *H04L 63/104* (2013.01); *H04L 41/044* (2013.01); *H04L 63/105* (2013.01); *H04L 67/32* (2013.01); *H04L 67/42* (2013.01)

(58) Field of Classification Search
CPC .................................................. H04L 63/104
(Continued)

(56) References Cited

U.S. PATENT DOCUMENTS

2003/0217101 A1* 11/2003 Sinn .................... H04L 61/1523
709/203

2012/0233220 A1* 9/2012 Kaschenvsky .... G06F 16/24573
707/803

(Continued)

OTHER PUBLICATIONS

W. Tsai and Q. Shao, "Role-Based Access-Control Using Reference Ontology in Clouds," 2011 Tenth International Symposium on Autonomous Decentralized Systems, Tokyo & Hiroshima, 2011, pp. 121-128, doi: 10.1109/ISADS.2011.21. (Year: 2011).*

(Continued)

*Primary Examiner* — Jacob Lipman
(74) *Attorney, Agent, or Firm* — Sheppard, Mullin, Richter & Hampton LLP

(57) ABSTRACT

A method comprises creating template limited-administration ontologies, the template limited-administration ontologies each identifying a plurality of different managers, each of the different managers having distinct and limited system access privileges. A request is received for a limited-administration server system, the request being associated with a client entity. A particular template limited-administration ontology of the template limited-administration ontologies is selected based on the request. A deployment ontology is generated based on the particular template limited-administration ontology and the request. A limited-administration server system deployment package is generated based on the deployment ontology. The limited-administration server system deployment package is provided for execution, wherein execution of the limited-administration server system deployment package creates a limited-administration server system, the limited-administration server system being capable of controlling access to one or more other systems associated with the client entity, and the limited-administration server system being limited to administration according to the different managers.

20 Claims, 49 Drawing Sheets

(58) Field of Classification Search
USPC .............................................................. 726/4
See application file for complete search history.

(56) References Cited

U.S. PATENT DOCUMENTS

| | | |
|---|---|---|
| 2013/0086065 A1 | 4/2013 | Sharma et al. |
| 2015/0006688 A1* | 1/2015 | Sanghvi .............. H04L 41/0843 |
| | | 709/221 |
| 2018/0068108 A1* | 3/2018 | Fish .................... H04L 63/0861 |

OTHER PUBLICATIONS

PCT/US2019/038309, "International Search Report and Written Opinion", dated Sep. 10, 2019 (11 pages).

\* cited by examiner

SECURITY AUDIT LOGS

| Type | Date | Time | Source Application | Category | User | Computer | Event Class | Message Text |
|---|---|---|---|---|---|---|---|---|
| Failure Audit | 20-07-2017 | 11:45:37 AM | Application 1 | Object Access | Johan | APHRODY | Critical | Logon |
| Failure Audit | 20-07-2017 | 12:45:37 AM | Application 2 | Logon/Logoff | Johan | APHRODY | Critical | Logon |
| Failure Audit | 20-07-2017 | 03:45:37 AM | Application 3 | Object Access | Johan | APHRODY | Critical | Logon |

Showing 1 to 3 of 3

Page 1 of 1

FIG. 15B

SYSTEMS AND METHODS FOR DEPLOYING AND MANAGING SECURE LIMITED-ADMINISTRATION SERVER SYSTEMS

TECHNICAL FIELD

This disclosure pertains to server systems. More specifically, this disclosure pertains to deploying and managing secure limited-administration server systems.

BACKGROUND

Information computing systems routinely face a myriad of cyber security threats. Protecting against such threats is typically a complex endeavor requiring specifically trained system administrators. Such system administrators are often given root access privileges to manage information and protect against security threats. For example, a system administrator may have root privileges to administer document management systems, grant or restrict user access privileges, register and administer user devices (e.g., mobile devices, laptops), and perform other functions. However, while having such administrators may protect against some threats, they may also open the door for other threats and/or fail to mitigate damage caused from a cyber security breach. For example, if an administrator account is hacked, the hacker will often have unrestricted access to the entire system.

SUMMARY

A claimed solution rooted in computer technology overcomes problems specifically arising in the realm of computer technology. In various embodiments, a computing system is configured to provide a multi-server architecture capable of deploying and executing secure limited-administration servers for controlling access to a variety of different systems, applications, and/or services. The limited-administration server systems may provide improved cyber security capabilities, require minimal client configuration, require minimal computing resources (e.g., less resources than traditional server architectures), and/or require minimal time to "spin-up." In some embodiments, a deployment server may configure domain-level settings (e.g., web domain, operating system security settings) for a limited-administration server system, and then deploy the limited-administration server system, often within a short amount of time (e.g., minutes or hours). As used herein, a limited-administration server system provides a server that limits administrator privileges. For example, rather than providing an administrator with root access, several "siloed" administrators (or, "managers") are provided with different and/or distinction privileges. This may prevent and/or mitigate damage caused by security breaches. For example, if a hacker were to gain access to the system as a manager, the hacker would be limited to the functionality of that manager (i.e., they would not have root access to the system).

Various embodiments of the present disclosure include systems, methods, and non-transitory computer readable media configured to create one or more template limited-administration ontologies, the one or more template limited-administration ontologies each identifying a plurality of different managers, each of the different managers having distinct and limited system access privileges. A request is received for a limited-administration server system, the request being associated with a client entity. A particular template limited-administration ontology of the one or more template limited-administration ontologies is selected based on the request. A deployment ontology is generated based on the particular template limited-administration ontology and the request. A limited-administration server system deployment package is generated based on the deployment ontology. The limited-administration server system deployment package is provided for execution, wherein execution of the limited-administration server system deployment package creates a limited-administration server system, the limited-administration server system being capable of controlling access to one or more other systems associated with the client entity, and the limited-administration server system being limited to administration according to the different managers having distinct and limited system privileges identified in the deployment ontology.

In some embodiments, the plurality of different managers includes an access permissions manager, the access permission manager including system access privileges for assigning one or more user types to one or more groups.

In some embodiments, the plurality of different managers includes a user manager, the user manager including system access privileges for adding, removing, and suspending one or more users, wherein adding one or more users includes storing user information associated with the added user. In related embodiments, the plurality of different managers includes an invitation manager, the invitation manager including system access privileges for verifying the user information for each of one or more users.

In some embodiments, the plurality of different managers includes a distribution manager, the distribution manager including system access privileges for creating distribution lists.

In some embodiments, the plurality of different managers includes a device manager, the device manager including system access privileges for registering user devices, the user devices including BYOD device and non-BYOD devices. In related embodiments, the plurality of different managers includes a monitor manager, the monitor manager including system access privileges for accessing one or more activity logs associated with the user devices.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIGS. 12A-12J depict screenshots of example user manager interfaces of an example limited-administration server system according to some embodiments.

FIGS. 13A-13C depict screenshots of example invitation manager interfaces of an example limited-administration server system according to some embodiments.

FIGS. 14A-14I depict screenshots of example distribution manager interfaces of an example limited-administration server system according to some embodiments.

FIGS. 15A-15B depict screenshots of example monitor manager interfaces of an example limited-administration server system according to some embodiments.

DETAILED DESCRIPTION

Figure 1:
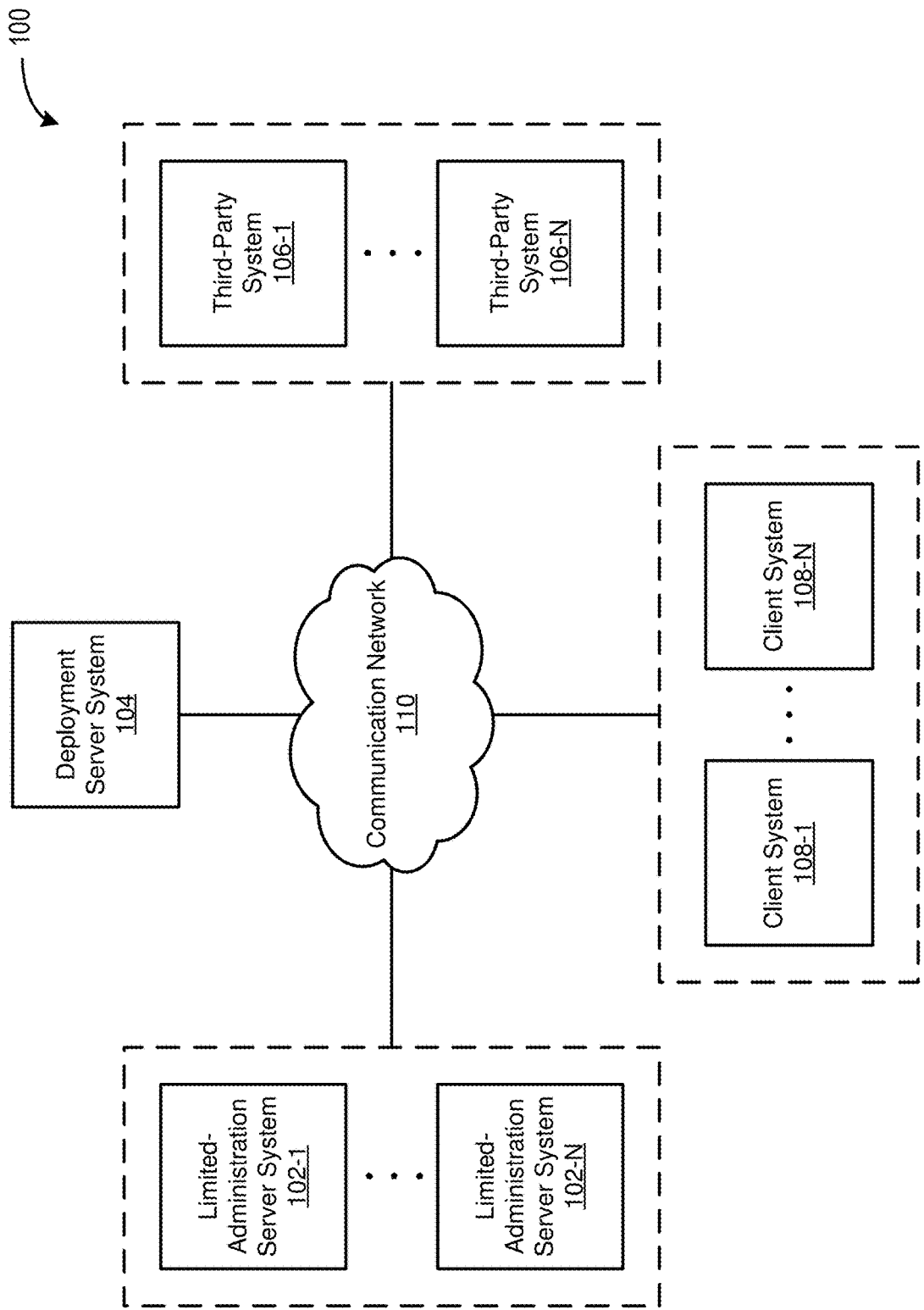
FIG. 1 depicts a diagram of an example system for deploying and managing secure limited-administration server systems according to some embodiments.

Information computing systems routinely face a myriad of cyber security threats. Protecting against such threats is typically a complex endeavor requiring specifically trained system administrators. Such system administrators are often given root access privileges to manage information and protect against security threats. For example, a system administrator may have root privileges to administer document management systems, grant or restrict user access privileges, register and administer user devices (e.g., mobile devices, laptops), and perform other functions. However, while having such administrators may protect against some threats, they may also open the door for other threats and/or fail to mitigate damage caused from a cyber security breach. For example, if an administrator account is hacked, the hacker will often have unrestricted access to the entire system.

A claimed solution rooted in computer technology overcomes problems specifically arising in the realm of computer technology. In various embodiments, a computing system is configured to provide a multi-server architecture capable of deploying and executing secure limited-administration servers for controlling access to a variety of different systems, applications, and/or services. The limited-administration server systems may provide improved cyber security capabilities, require minimal client configuration, require minimal computing resources (e.g., less resources than traditional server architectures), and/or require minimal time to "spin-up." In some embodiments, a deployment server may configure domain-level settings (e.g., web domain, operating system security settings) for a limited-administration server system, and then deploy the limited-administration server system, often within a short amount of time (e.g., minutes or hours). As used herein, a limited-administration server system provides a server that limits administrator privileges. For example, rather than providing an administrator with root access, several "siloed" administrators (or, "managers") are provided with different and/or distinction privileges. This may prevent and/or mitigate damage caused by security breaches. For example, if a hacker were to gain access to the system as a manager, the hacker would be limited to the functionality of that manager (e.g., they would not have root access to the system).

In one example, a deployment server system may receive a request from a client (e.g., HBO, Bechtel, and/or the like) for a limited-administration server system for a project (e.g., an HBO television show, a Bechtel construction project, and/or the like). The client may provide information (e.g., a requested domain name, a desired security level, a list of current applications and/or systems to be controlled by the limited-administration server system), and the deployment server system may generate a limited-administration server system for that project. The limited-administration server system may include various predefined and/or limited manager privileges. In some embodiments, only a deployment server system, and/or corresponding deployment server system administrator(s), may create managers, and their associated predefined and/or limited manager privileges, for a limited-administration server system.

In some embodiments, the deployment server system may assign and/or change managers for a limited-administration server system before and/or after the limited-administration server system has been deployed. In other embodiments, the managers may not be assigned and/or changed once the limited-administration server system is deployed. In various embodiments, manager assignments and/or manager changes may not be made by the limited-administration server system at any time (e.g., before or after deployment). For example, manager assignments and/or manager changes may only be performed by the deployment server system.

In some embodiments, the deployed limited-administration server system may present a different portal for each of the managers to perform their assigned function. For example, each of the portals may be designed to consolidate, simplify and/or translate complex interfaces of client systems (e.g., operating system security settings interfaces) for access permission control, and/or other information management, based on a user's understanding of business processes and workflows, rather than an understanding of information technology. This may allow users untrained in information technology (e.g., human resources personnel) to perform functions typically requiring information technology professionals.

FIG. 1 depicts a diagram of an example system 100 for deploying and managing secure limited-administration server systems 102 according to some embodiments. In the example of FIG. 1, the system 100 includes limited-administration server systems 102-1 to 102-N (individually, the limited-administration server system 102, collectively, the limited-administration server systems 102), a deployment server system 104, third-party systems 106-1 to 106-N (individually, the third-party system 106, collectively, the third-party systems 106), client systems 108-1 to 108-N (individually, the client system 108, collectively, the client systems 108), and a communication network 110.

The limited-administration server systems 102 may each function to securely control and/or manage privileged access to one or more systems and/or associated information. In one example, a limited-administration server system 102 may securely control and/or manage privileged access to a computer network including a communication network (e.g., communication network 110), client systems (e.g., client systems 108), and/or third-party systems (e.g., third-party systems 106). This may improve security, for example, by separating administrators from the client systems and/or associated client information. In some embodiments, the limited-administration server systems 102 each provide "siloed" administration accounts (or, "managers") that have limited (or, "restricted" privileges). For example, none of the managers may be capable of accessing all of the features and/or functionality of the limited-administration server system 102. In some embodiments, a limited-administration server system 102 may be limited to administration by their managers. Accordingly, other administrators (e.g., administrators of a deployment server system 104) may not be allowed to manage the limited-administration server system 102.

In various embodiments, functionality of the limited-administration server systems 102 may each be performed by one or more servers (e.g., a cloud-based server, a local server) and/or other computing devices. In some embodiments, a limited-administration server system 102 may be implemented by a cloud-computing platform (e.g., a private virtual cloud). As used herein, a cloud-computing platform may refer to an on-demand cloud-computing platform, a "serverless" cloud-computing platform, and/or another cloud-computing platform. It will be appreciated that a "serverless" cloud-computing platform may dynamically manage allocation of computing resources and may still require servers.

In some embodiments, the limited-administration server systems 102 may each be configured based on respective limited-administration ontologies and/or associated rules. A limited-administration ontology may provide objects, properties, and/or relationships associated with the secure "siloed" operation of a limited-administration server system 102. In some embodiments, a limited-administration ontology defines domain-level settings for the limited-administration server system 102, defines managers for the limited-administration server system 102, user types (e.g., employee, temporary employee), defines default user groups (e.g., human resources group, production group, studio group) for the limited-administration server system 102, defines rules (e.g., manager access permission privileges), and/or the like. For example, the limited-administration ontology may define six different "siloed" managers (e.g., access permissions manager, user manager, invitation manager, distribution manager, device manager, and monitor manager).

As used herein a "manager" may refer to an administrator, software and/or hardware agent (e.g., an automated agent), and/or the like. In some embodiments, the managers have distinct system privileges, with none of the managers having privileges overlapping with any of the other managers. In other embodiments, some of the managers may having some overlapping privileges with one or more other managers, although none of the managers may have all the privileges of the other managers. This may help ensure that if the system is breached the hacker has limited access to the limited-administration server system 102 and/or other associated systems (e.g., the computer network being access controlled by the limited-administration server system 102), thereby reducing damage the hacker may cause. In some embodiments, particular actions performed by a manager may trigger notification(s) of one or more other managers. For example, in order to perform a particular action (e.g., add a user and/or upgrade a user's permissions), a manager (e.g., a user manager) may input user information, which may then trigger the limited-administration server system 102 to generate a notification. The notification may be provided to another manager (e.g., an invitation manager) for either approval or denial the particular action. This may improve security, for example, by ensuring that some or all actions require at least two different managers.

In some embodiments, the limited-administration server systems 102 may each function to provide limited-administration server system portals (or, "interfaces"). For example, the limited-administration server system portals may include a portal (e.g., unique portal) for each of the different managers. Each of the managers may be able to access the corresponding portal, but not access other portals. For example, an access permissions manager may be able to access an access permissions manager portal, but not a user manager portal. Once within their corresponding portal, the managers may perform limited-administration functionality In various embodiments, functionality of each of the managers may be limited based on the limited-administration ontology. For example, the limited-administration ontology may define that an access permissions manager creates groups (e.g., default groups and/or new custom groups) and defines access permissions for those groups. The user manager may be able to assign user types to users, assigns users to a group, and/or the like. For example, the user manager may link a user to a particular department and a particular user type, and the limited-administration server system 102 may automatically assign that user to a corresponding group. In another example, the user manager may link a user with a custom group that may unassociated with the user's job role or job type. However, the user manager may be unable to modify access permissions for user types, which may be defined by the limited-administration ontology as being the purview of another manager (e.g., the access permissions manager). User access permissions may be based on their assigned user type, job role, group, and/or the like. For example, a user may inherit the access permissions of an assigned group, an assigned user type, and/or an assigned job role.

The deployment server system 104 may function to deploy limited-administration server systems 102. In some embodiments, the deployment server system 104 may rapidly deploy (e.g., "spin-up") limited-administration server systems 104. For example, the deployment server system 104 may select a limited-administration ontology from a set of predefined (or, "template") limited-administration ontologies, generate a limited-administration server system 102 based on the selected limited-administration ontology, and deploy the limited-administration server system 102 in a matter of hours or minutes. Accordingly, the deployment server system 104 may define the ontology that provides the security for the limited-administration server system 102, and the limited-administration server system 102 may not have the capability to alter the underlying parameters of that ontology. For example, a limited-administration ontology may define an ontology having six different managers, and the limited-administration server system 102 may be unable to add different managers, remove managers, change permissions of the managers, and so forth. This may ensure that the underlying ontology providing the security to the limited-administration server system is not alterable at the limited-administration server system 102.

In various embodiments, functionality of the deployment server system 104 may be performed by one or more servers (e.g., a cloud-based server) and/or other computing devices. The deployment server system 104 may be implemented by a cloud-computing platform.

In some embodiments, the deployment server system 104 functions to generate a server deployment portal. The server deployment portal may include server interfaces for creating limited-administration ontologies, customizing predefined limited-administration ontologies (e.g., setting domain-level values), and/or the like. For example, the server deployment portal may be accessed by a deployment server system administrator.

In some embodiments, the deployment server system 104 functions to generate a client deployment portal. The client deployment portal may include client interfaces for a client (e.g., a client administrator) to access the deployment server system 104. In some embodiments, the client may access the deployment server system 104 to set values for attributes or parameters of a limited-administration ontology, and/or otherwise provide input regarding a configuration of limited-administration server system 102 to be deployed and/or an already deployed limited-administration server system 102. For example, the client may select a web domain for the limited-administration server system 102, indicate security levels for the limited-administration server system 102, and/or the like.

The third-party systems 106 may each function to provide third-party services and/or applications (e.g., Azure, Intune). In some embodiments, functionality of the third-party systems 106 may be performed by one or more servers (e.g., cloud-based servers) and/or other computing devices. In various embodiments, the third-party systems 106 may be access controlled by a limited-administration server system 102.

The client systems 108 may each function to interact with one or more of the limited-administration server systems 102 and/or the deployment server system 104. For example, the client system 108 may interact with the client portal of the deployment server system 104. In various embodiments, functionality of the client systems 108 may be performed by one or more servers (e.g., a cloud-based server) and/or other computing devices. Client systems 108 may include user devices (e.g., mobile devices), document management systems, and/or other systems capable of being access controlled by a limited-administration server system 102.

In various embodiments, one or more of the third-party systems 106 and/or one or more of the client systems 108 may comprise at least a portion of a client network (e.g., a Software Defined Hybrid Network). The client network may be associated (e.g., owned and/or operated) with a client entity. The limited-administration server system 102 may manage privileged access to the client network.

The communications network 110 may represent one or more computer networks (e.g., LAN, WAN, or the like) or other transmission mediums. The communication network 110 may provide communication between systems 102-108 and/or other systems described herein. In some embodiments, the communication network 110 includes one or more computing devices, routers, cables, buses, and/or other network topologies (e.g., mesh, and the like). In some embodiments, the communication network 110 may be wired and/or wireless. In various embodiments, the communication network 110 may include the Internet, one or more wide area networks (WANs) or local area networks (LANs), one or more networks that may be public, private, IP-based, non-IP based, and so forth.

Figure 2:
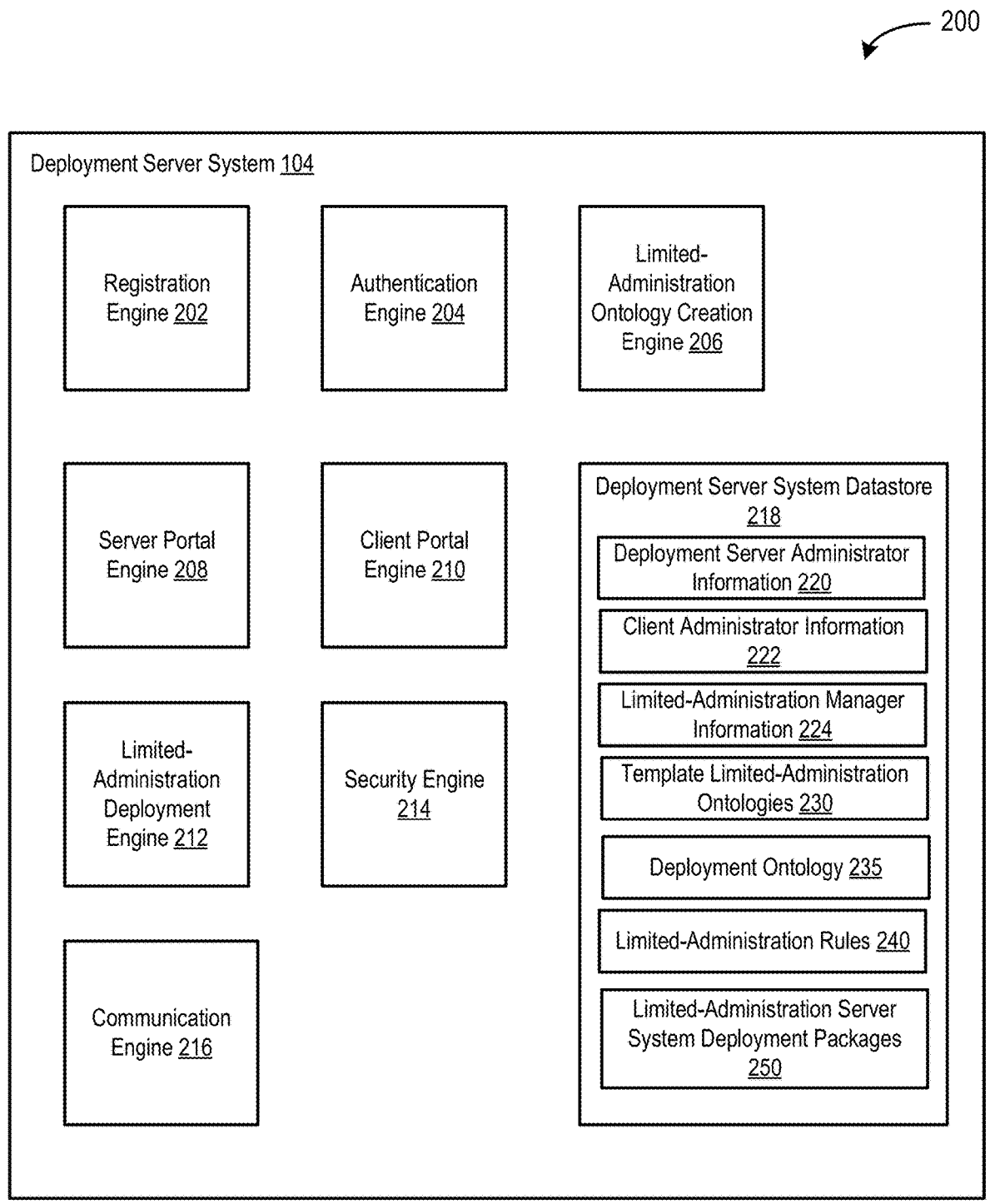
FIG. 2 depicts a diagram of an example of a deployment server system according to some embodiments.

FIG. 2 depicts a diagram 200 of an example of a deployment server system 104 according to some embodiments. In the example of FIG. 2, the deployment server system 104 includes a registration engine 202, an authentication engine 204, a limited-administration ontology creation engine 206, a server portal engine 208, a client portal engine 210, a limited-administration deployment engine 212, a security engine 214, a deployment server system communication engine 216, and a deployment server system datastore 218.

The registration engine 202 may function to register users of the deployment server system 104. Users of the deployment server system 104 may include a deployment server system administrator and client administrators. In some embodiments, the deployment server system administrator may be limited to administration of the deployment server system 104 and/or particular features thereof. For example, a deployment server system administrator may be able to set parameters of a limited-administration ontology, and/or set values for some of the parameters of the limited-administration ontology but may not administer a limited-administration server system 102 and/or associated systems (e.g., client system 108, third-party system 106). The registration engine 202 may store deployment server system administrator information 220 and client administrator information 222.

In some embodiments, the deployment server system administrator information 220 includes some or all of the following:
- Identifier: unique identifier of the deployment server system administrator.
- Credentials: credentials (e.g., username, password, two-factor authentication) to access and/or perform administrator functions on the deployment server system (e.g., through a server portal generated by the server portal engine 208).
- Personal information (e.g., name, date of birth)
- Registered Devices: device identifier for registered devices of the deployment server system administrator. For example, the identifier may be used to authenticate the deployment server system administrator.

In some embodiments, the client system administrator information 222 includes some or all of the following:
- Identifier: unique identifier of the client system administrator (or, "client administrator").
- Credentials: credentials (e.g., username, password, two-factor authentication) to access and/or perform client functions on the deployment server system (e.g., through a client portal generated by the client portal engine 210).
- Entity (or, "organization"): the entity (e.g., HBO) the client administrator represents and/or is otherwise associated with.
- Project: the project (e.g., HBO television show) the client administrator represents and/or is otherwise associated with.
- Registered Devices: device identifier for registered devices of the client administrator. For example, the identifier may be used to authenticate the client administrator.

In some embodiments, the registration engine 202 functions to register limited-administration managers of the limited-administration server system 102. The registration engine 202 may store limited-administration manager information. In some embodiments, the limited-administration manager information 224 includes some or all of the following:

- Identifier: uniquely identifies the limited-administration manager.
- Type (e.g., access permission manager, user manager, invitation manager, distribution manager, device manager, monitor manager)
- Personal Information
- Registered Devices: device identifier for registered devices of the manager. For example, the identifier may be used to authenticate the manager.

The authentication engine 204 may function to authenticate users attempting to access the deployment server system 104. For example, the authentication engine 204 may authenticate client administrators attempting to access the deployment server system 104 through a client portal (e.g., presented on a client system 108), and/or authenticate server administrators attempting to access the deployment server system 104 through a server portal. Authentication may include verifying usernames, passwords, multi-factor authentications, and/or the like.

The limited-administration ontology creation engine 206 may function to create template limited-administration ontologies 230. The template limited-administration ontologies 230 may define domain-level parameters and/or values for use in generating a limited-administration server system 102. In various embodiments, the template limited-administration ontologies may be modifiable. For example, the limited-administration ontology creation engine 206 may create a template limited-administration ontology 230 based on input from a deployment server system administrator, and the limited-administration ontology creation engine 206 may modify one or more values in response to input from a client administrator. In some embodiments, the parameters of a template limited-administration ontology 230 may not be modified by the client administrator, and some or all of the associated values may be modified by the client administrator. In some embodiments, a template limited-administration ontology 230 may include some or all of the following:

- Elected Limited-Administration Managers (e.g., access permission manager, user manager, invitation manager, distribution manager, device manager, monitor manager)
- Manager Permissions: access permission privileges for each of the different managers.
- Domain-Level Settings (e.g., web domain, default security settings, operating system settings)
- Rules: rules (e.g., limited-administration rules 240) to include with and/or otherwise associate with the limited-administration server system. The rules may include parameters (e.g., user types, job roles, default groups), and access permissions (e.g., immutable access permissions) for parameters. The rules may also provide functionality for creating new groups (e.g., overlapping groups), special roles (e.g., overlapping job roles), and/or the like.
- Applications, Systems, and/or Services: identifier(s) and/or associated API(s) for applications, systems, and/or services (e.g., client systems 108, third-party systems 106) to be controlled by, and/or integrated with, the limited-administration server system.

The server portal engine 208 may function to generate a server portal. A deployment server system administrator may perform some or all of the functionality of the deployment server system 102 described herein through the server portal. For example, the deployment server system administrator may create template limited-administration ontologies 230, deploy limited-administration server systems 102, and so forth.

The client portal engine 210 may function to generate a client portal. A client administrator may access limited settings for creating a limited-administration server system 102. For example, the client administrator may configure a portion of a template limited-administration ontology 230 and/or limited-administration rules 240 to specify a desired security level, desired web domain, a deployment time and/or a timeframe for a deployment, and/or the like.

The limited-administration deployment engine 212 may function to deploy limited-administration server systems 102. In some embodiments, the limited-administration deployment engine 212 may generate a limited-administration server system package 250 including a configured template limited-administration ontology 235, limited-administration manager information 224, and/or limited-administration manager rules 240. A configured limited-administration ontology may be referred to as a deployment ontology 235. The limited-administration deployment engine 212 may compress and/or encrypt the limited-administration server system package 250. The limited-administration server system package 250 may be executed, interpreted, and/or otherwise "run," in order to spin-up the limited-administration server system 102. For example, the limited-administration deployment engine 212 may provide the package to another system over a communication network (e.g., communication network 110) for execution, and/or the deployment server system 104 may execute the limited-administration server system deployment package 250 and spin-up the limited-administration server system 102 (e.g., as part of a virtual private cloud).

The security engine 214 may authenticate actions (e.g., system actions and/or user actions). The security engine 214 may authenticate actions of registered users that are logged in. In some embodiments, action authentication may be "role" based. For example, whether a client administrator can perform an action (e.g., set the web domain of a limited-administration ontology to be used to generate a limited-administration server system 102) is based on the permissions of the client administrator user role (e.g., as defined by the server rules 240).

In some embodiments, action authentication may be "non-role" based instead of, or in addition to, role based. For example, whether a client administrator can perform an action is based on the action itself, as opposed to the permissions of the client administrator. In some embodiments, various features and/or information stored on the deployment server system 104 may be associated with a "state," and based upon that state, an action may be allowed or denied. For example, before a limited-administration server system 102 has been deployed, some or all of an associated limited-administration ontology (e.g., a template limited-administration ontology 230) may be editable, but after it is deployed, some or all of the associated limited-administration ontology (e.g., deployed ontology 235) may become un-editable (e.g., immutable). This may improve security, for example, because even if a deployment server administrator account is hacked, the authentication engine 204 may prevent actions that may otherwise have been allowable based on a role-based permission of the deployment server system administrator.

The deployment server system communication engine 216 may function to send requests, transmit and, receive communications, and/or otherwise provide communication with one or a plurality of systems. In some embodiments, the communication engine 216 functions to encrypt and decrypt communications. The communication engine 216 may function to send requests to and receive data from one or more systems through a network or a portion of a network. Depending upon implementation-specific considerations, the communication engine 216 may send requests and receive data through a connection, all or a portion of which may be a wireless connection. The communication engine 216 may request and receive messages, and/or other communications from associated systems. Communications may be stored in the deployment server system datastore 218.

The deployment server system datastore 218 may comprise one or more cloud-based datastores, local datastores, and/or the like. Accordingly, in various embodiments, information described herein may be stored in a single data store or multiple datastores. For example, server administrator account information 220 may be stored in a datastore, client account administrator information 222 may be stored in different datastore, and so forth. In various embodiments, the datastore 216, and/or other datastores described here, may have physical and/or virtual partitions (e.g., some information and/or features may be "siloed" to increase security).

Figure 3:
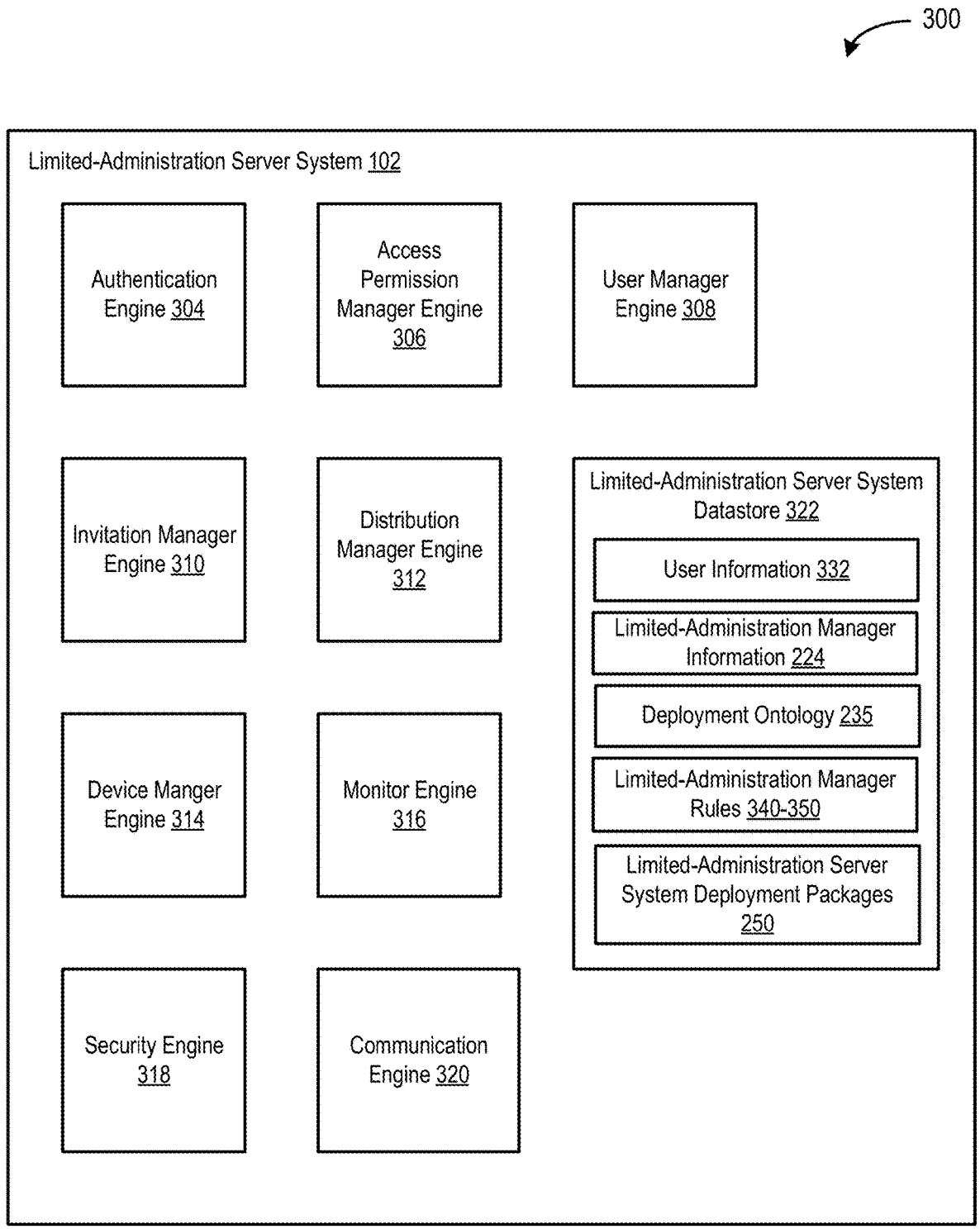
FIG. 3 depicts a diagram of an example of a limited-administration server system according to some embodiments.

FIG. 3 depicts a diagram 300 of an example of a limited-administration server system 102 according to some embodiments. In the example of FIG. 3, the limited-administration server system 102 includes an authentication engine 304, an access permission manager engine 306, a user manager engine 308, an invitation manager engine 310, a device manager engine 314, a monitor manager engine 316, a security engine 318 a limited-administration server system communication engine 320, a limited-administration server system datastore 322.

The authentication engine 304 may function to authenticate users attempting to access the limited-administration server system 102. For example, the authentication engine 304 may authenticate limited-administration managers and/or other users attempting to access the limited-administration server system 102 and/or systems associated with the limited-administration server system 102 (e.g., systems access controlled by the limited-administration server system 102). Authentication may include verifying usernames, passwords, multi-factor authentications, and/or the like.

The access permission manager engine 306 may function to determine, enforce, and/or control access permissions for computer networks (e.g., client networks), client systems (e.g., client systems 108), communication networks (e.g., communication network 110), third-party systems (e.g., third-party systems 106), and/or the limited-administration server system 102 itself. Like the other engines 308-316, only authorized access permission managers may access the functionality of the access permission manager engine 306, and the access permission managers may not access the functionality of the other engines 308-316.

In some embodiments, the access permission manager engine 306 functions to create, read, update, and/or delete access permission manager rules 340. The access permission manager rules 340 may include default rules that may or may not be customized, and/or new rules created by the access permission manager engine 306. The access permission manager rules 340 may initially be received from the deployment server system 102 (e.g., as part of the limited-administration server system deployment package).

In some embodiments, the access permission manager engine 306 functions to execute and/or enforce the access permission manager rules 340 and/or deployment ontology 235. The access permission manager engine 306 may create, read, update, and/or delete user groups, create/assign access permissions for groups, create user types, create/assign access permissions for user types, create job roles, create/assign access permissions for job roles, and/or the like. The access permission manager rules 340 may be based on the limited-administration ontology. For example, the limited-administration ontologies may define the available parameters (e.g., default groups, default user types, default job roles, default access permissions) and/or default values for available parameters. In various embodiments, groups and the group access permissions are provisioned to client systems (e.g., client systems 108) and/or third-party systems (e.g., third-party systems 106), such as shared storage folder access, specified SaaS services, and/or the like.

Figure 11A:
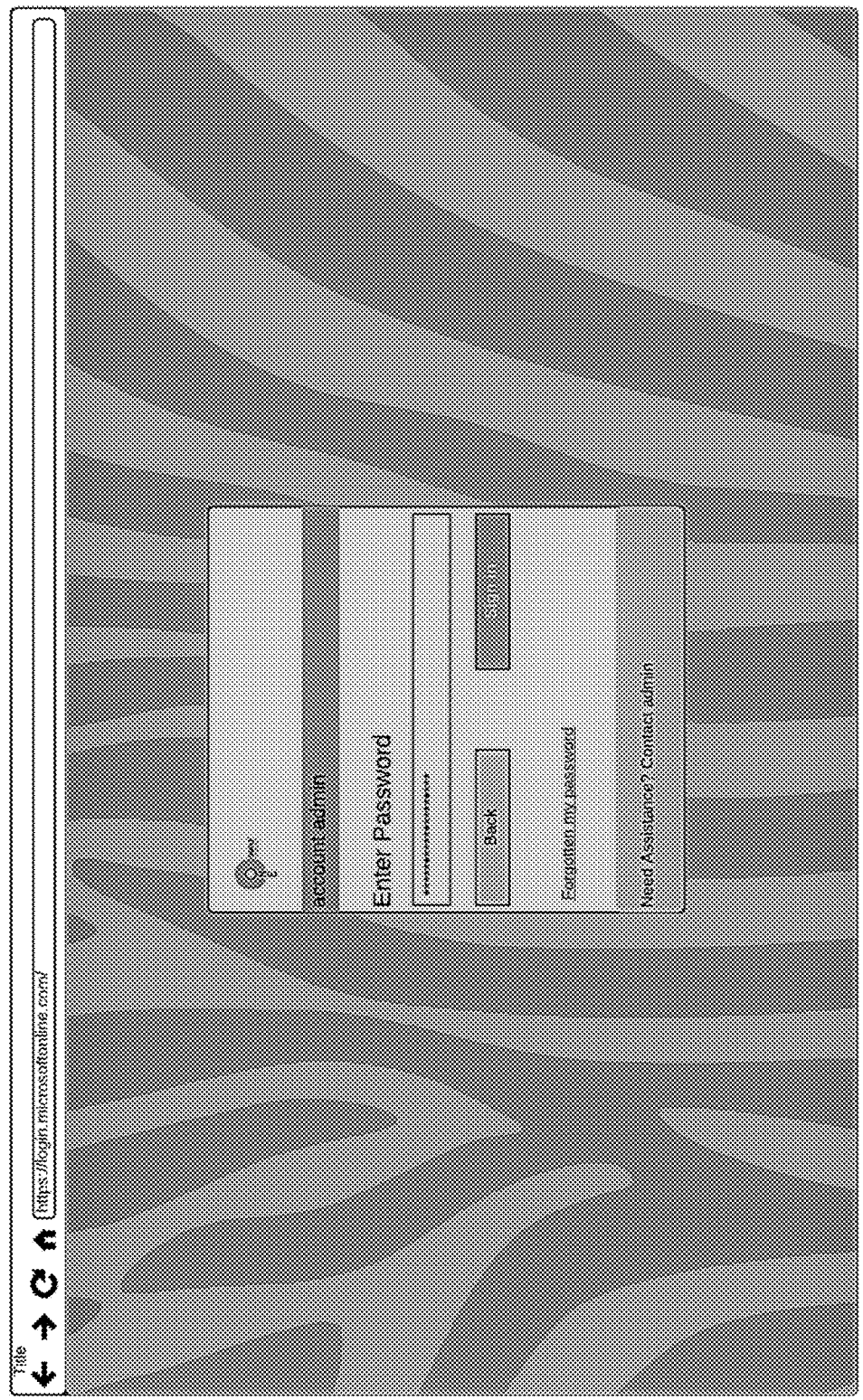
FIGS. 11A-11N depict screenshots of example access permission manager interfaces of an example limited-administration server system according to some embodiments.
Figure 11B:
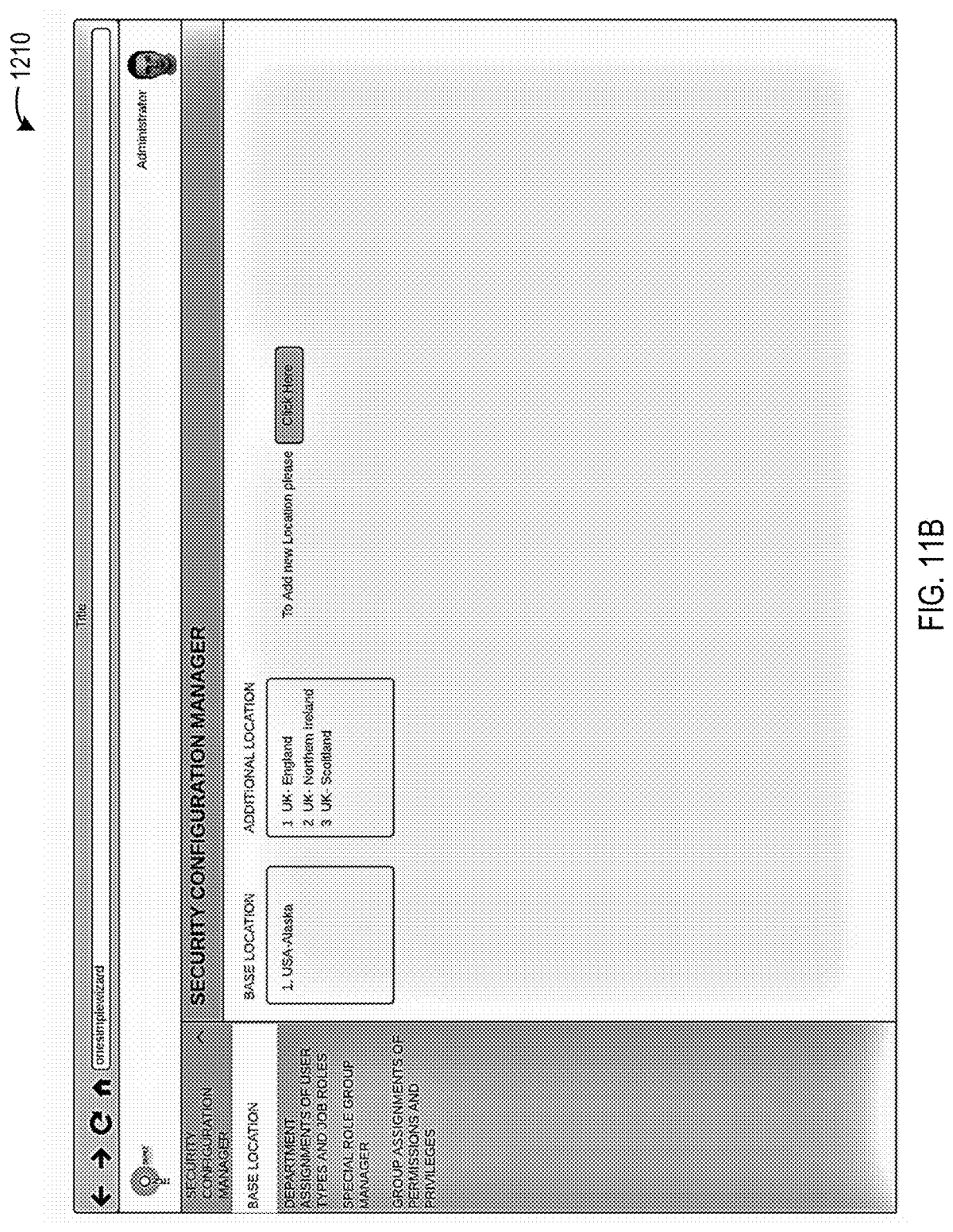

The access permission manager engine 306 may function to generate and/or present an access permission manager portal (e.g., as shown in FIGS. 11A-11N). The access permission manager portal may be presented in response to a user navigating to the access permission manager portal from another portal and/or interface (e.g., a main portal for the limited-administration server system). In some embodiments, the access permission manager portal may be presented in response to a recognized identifier associated with the user. For example, the device of the user (e.g., laptop) may be recognized by the limited-administration server system as the device of the access permissions manager and present the access permission manager portal. This may prevent different limited-administration managers attempting to log in to another limited-administration manager portal. Accordingly, even if another limited-administration manager had the access permissions manager credentials, they may be unable to even attempt a login as the access permissions manager.

The access permission manager engine 306 may function to assign one or more user types (e.g., production hire, subcontractor, studio employee, prospective hire) to one or more default user groups (e.g., department) and/or custom groups (e.g., created by the user manager engine 308). Custom groups may be created so that a user in one department may obtain temporary and/or permanent access permissions of another group. For example, a user in a "legal" department may need to access documents in a particular folder of the "human resources" department, so a custom group may be created that provides the access privileges that particular folder of the human resources department. In some embodiments, the access permission manager engine 306 may perform the assignments and/or create groups by editing one or more limited-administration access permission manager rules 340. The rules 340 may include default assignments and/or custom assignments (e.g., as specified by the user manager engine 308).

The user manager engine 308 may function to add, remove, suspend, and/or reactivate users. In some embodiments, the user manager engine 308 adds, removes, suspends, and/or reactivates users from client systems (e.g., client systems 108) and/or other systems managed by the limited-administration server system 102. In some embodiments, the user manager engine 308 may create, read, update, and/or delete user manager rules 342. The user manager rules 342 may include default rules that may or may not be customized, and/or new rules created by the user manager engine 308. The user manager rules 342 may initially be received from the deployment server system 102 (e.g., as part of the limited-administration server system deployment package 250). The user manager rules 342 may define fields, text boxes, drop-down menus, and/or the like, for adding, removing, and/or suspending users. In some embodiments, the user manager engine 308 may predict some or all fields based on the user manager rules 342. For example, an email address field may be predicted and/or populated based on a name of the user. Predictions may be chained (e.g., based on previous predictions). For example, a second field (e.g., instant messenger handle) may be predicted based on a predicted email address field.

The user manager engine 308 may function to generate and/or store user information 332 corresponding to added, removed, and/or suspended users. The user manager engine 308 may store user information 332 in a datastore (e.g., limited-administration server system datastore 322). User information 332 may include a variety of fields and/or attributes (e.g., as shown in FIG. 12). For example, the user information 332 may include a user identifier, name, email address, phone number, department, user type, job role, access start date, access end date, and/or number of permitted devices.

In some embodiments, the user manager engine 308 functions to generate and/or present a user manager portal (e.g., as shown in FIGS. 12A-12J). Like the other limited-administration portals described herein, they are limited to functionality of the associated manager. For example, the user manager portal provides access to functionality of a user manager, but not the functionality of an access permissions manager. The user manager portal may be presented in response to a user navigating to the user manager portal from another portal and/or interface (e.g., a main portal for the limited-administration server system). In some embodiments, the user manager portal may be presented in response to a recognized identifier associated with the user. For example, the device of the user (e.g., laptop) may be recognized by the limited-administration server system 102 as the device of the user manager and present the user manager portal. This may prevent different limited-administration managers attempting to log in to another limited-administration manager portal. Accordingly, even if another limited-administration manager had the user manager credentials, they may be unable to even attempt a login as the user manager.

The invitation manager engine 310 may function to verify user information 332 and provide notifications (or, "invitations") to users. For example, the invitation manager engine 310 may provide a welcome message to verified users indicating the steps the user needs to perform to complete an onboarding process (e.g., setup passwords, emails, and/or the like). In some embodiments, the invitation manager engine 310 may verify user information 332 and/or provide notifications based on invitation manager rules 344. For example, the invitation manager rules 344 may specify verification procedures (e.g., manual verification and/or comparison with one or more other data sources), type of content to include in notifications, and/or the like.

Figure 13A:
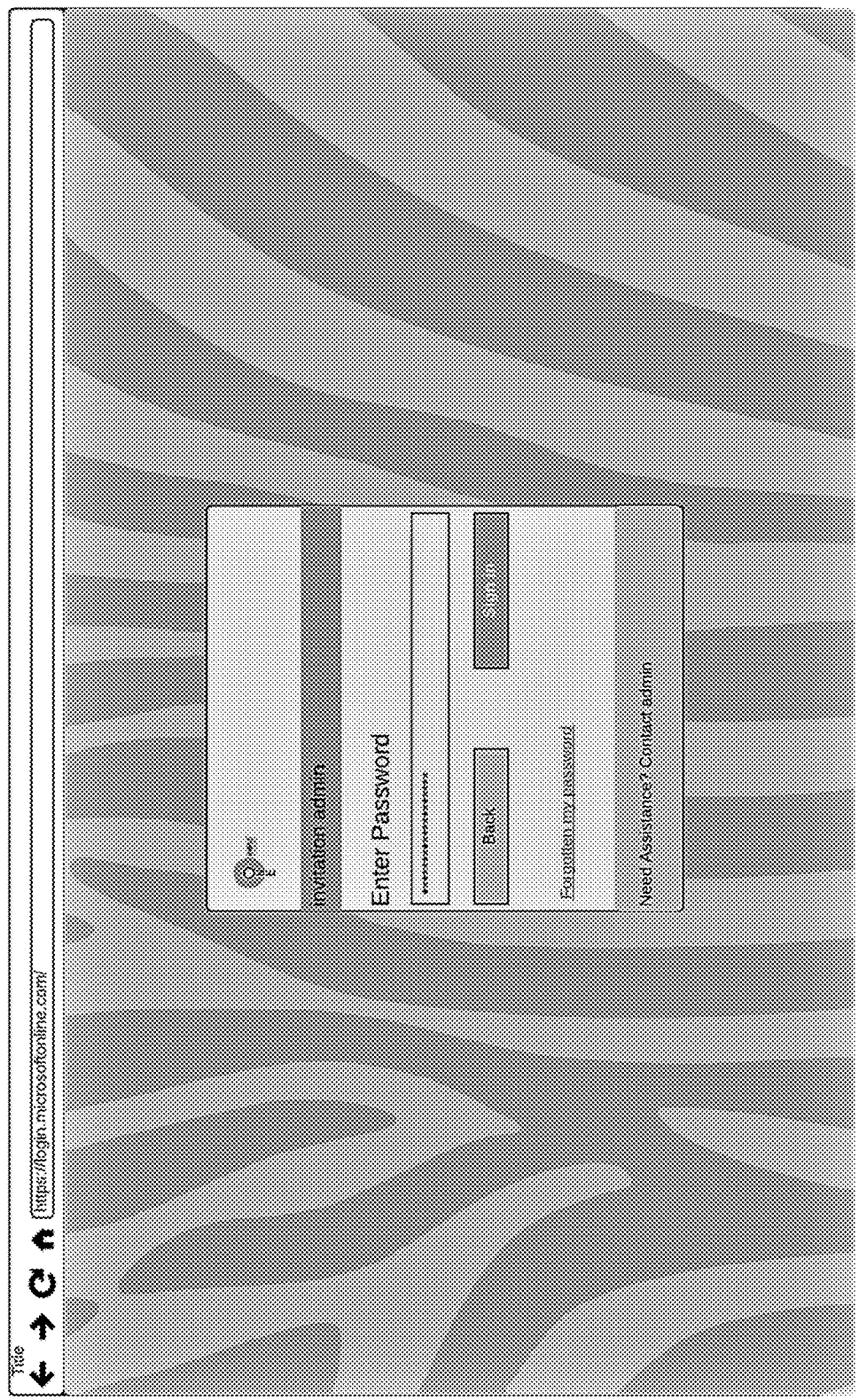
Figure 13B:
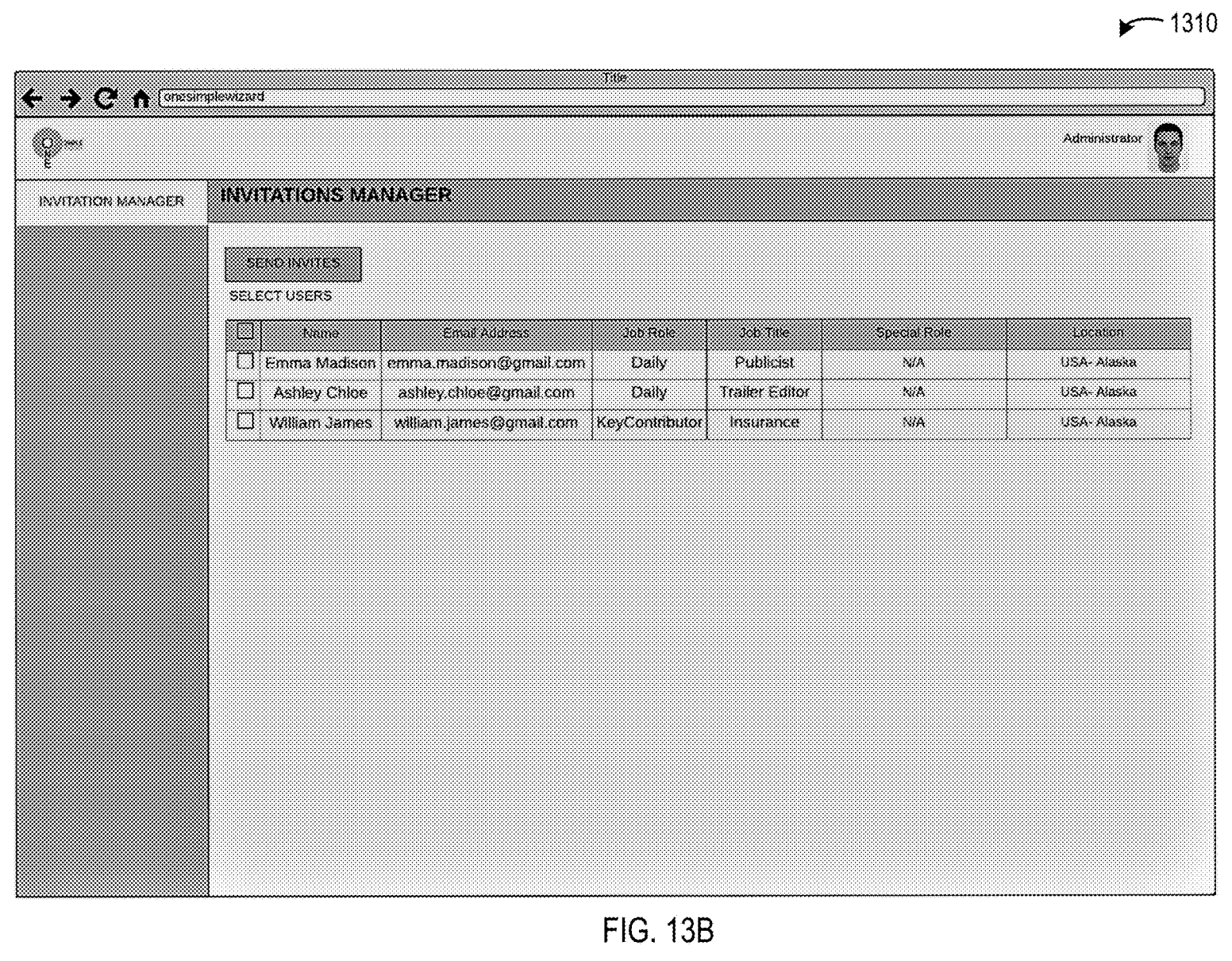
Figure 13C:
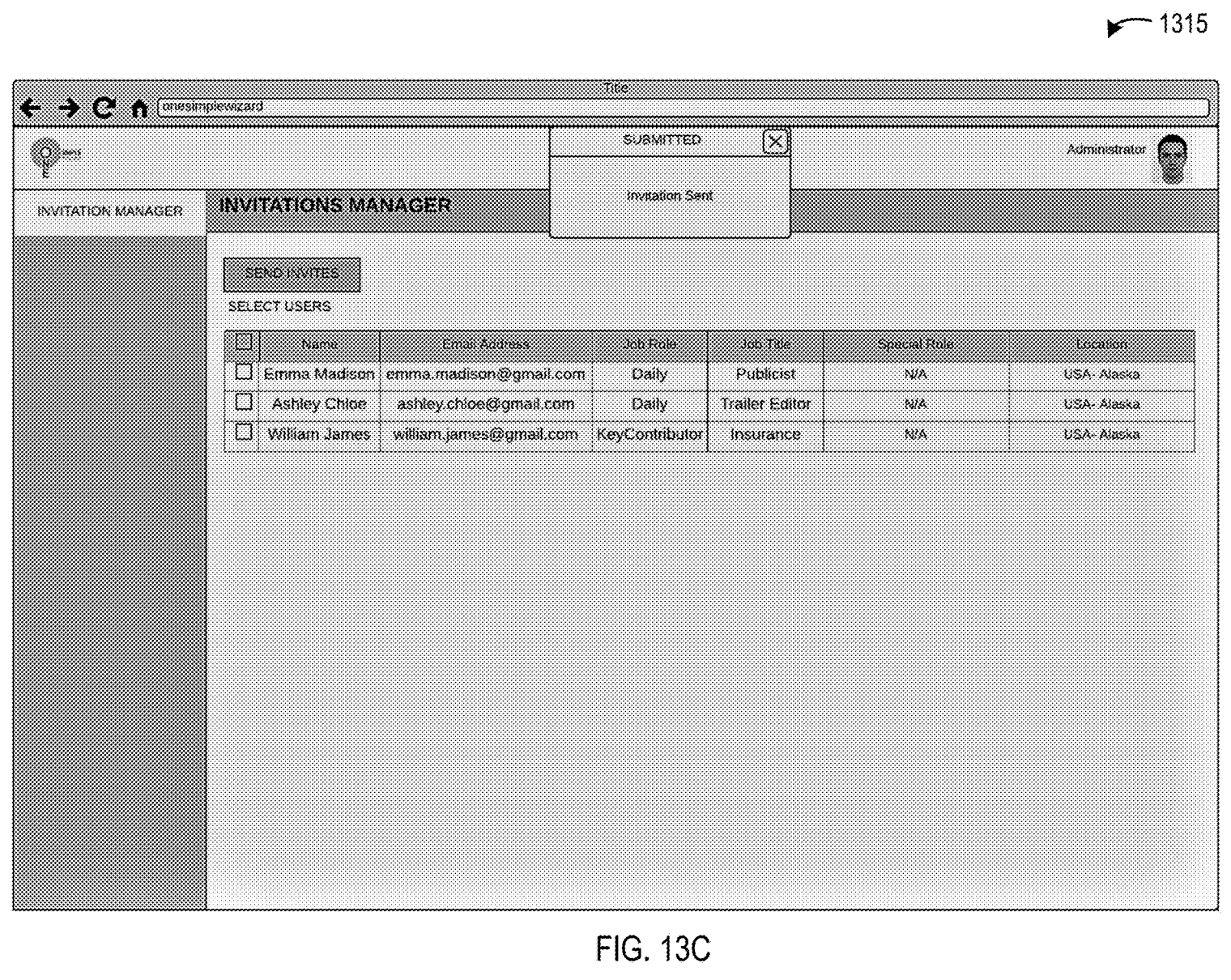

The invitation manager engine 310 may function to generate and/or present an invitation manager portal (e.g., as shown in FIGS. 13A-13C). The invitation manager portal may be presented in response to a user navigating to the invitation manager portal from another portal and/or interface (e.g., a main portal for the limited-administration server system). In some embodiments, the invitation manager portal may be presented in response to a recognized identifier associated with the user. For example, the device of the user (e.g., laptop) may be recognized by the limited-administration server system as the device of the invitation manager and present the invitation manager portal. This may prevent different limited-administration managers attempting to log in to another limited-administration manager portal. Accordingly, even if another limited-administration manager had the invitation manager credentials, they may be unable to even attempt a login as the invitation manager.

The distribution manager engine 312 may function to create, read, update, delete, and/or otherwise manage distribution lists. As used herein, distribution lists refer to "system" or "master" distributions lists, as opposed to Outlook mailing lists, and/or the like. In some embodiments, the distribution manager engine 312 may obtain one or more pre-mapped default distribution lists. It will be appreciated that "list" as used herein may include other structures (e.g., tree structures, spreadsheets, objects, or other structured information). The pre-mapped default distributions lists may be obtained from, and/or based on, one or more distribution manager rules 346. For example, the pre-mapped default rules may have a predefined group for each "Department" and/or other predefined units of the entity/organization (e.g., HBO) or a particular project (e.g., HBO television show) associated with the limited-administration server system. Accordingly, a particular pre-mapped default distribution list may include all of the users (e.g., employees) assigned to the "Animation" department.

In some embodiments, the distribution manager engine 312 may function to map one or more additional distribution lists. The distribution manager engine 312 may map (or, "create") the one or more additional distribution lists from, and/or based on, the one or more distribution manager rules 346. For example, the distribution manager engine 312 may create a "temporary hire" distribution list. The temporary hire list may indicate some or all temporary users. Temporary uses may be active for any amount of time (e.g., 5 hours or 5 months), as bounded by a start time and/or end time.

In some embodiments, temporary user access may expire at a predetermined time and/or within a predetermined timeframe. For example, temporary user "Joe Smith" may be a "daily" hire having access (e.g., as defined by his user type, job role and/or group assignments) starting at 6 AM on Jan. 5, 2018, and expiring at 5 PM, Jan. 5, 2018. During that time, he may send and receive emails, view email attachments, and/or perform other actions dependent on his associated access permissions. At the expiration time, some or all access privileges may be revoked, and some or all actions may be prevented. For example, expired temporary users may no longer be able to view emails, view attachments, and/or the like.

In some embodiments, the distribution manager engine 312 may function to create "external" distribution lists for users outside the network that do not have direct access to the systems controlled by the limited-administration server system 102. For example, the external lists may include visitors. Users on external lists may also have expiring access privileges.

In some embodiments, the distribution manager engine 312 may function to deactivate one or more users from at least one of the one or more pre-mapped default distribution lists and/or additional distribution lists. For example, the distribution manager engine 312 may deactivate a user when the user is terminated, and/or when a temporary hire user has reached an expiration time and/or date.

In some embodiments, the distribution manager engine 312 activates one or more users from at least one of the one or more pre-mapped default distribution lists and/or additional distribution lists. For example, if a user returns from a leave of absence, rather than having to add the user again, the user can simply be activated. In another example, the distribution manager engine 312 may activate a temporary hire user that was previously deactivated. This may prevent the need to routinely add and remove users, which can be a time consuming and/or computing intensive process. Rather, temporary hires may be activated and deactivated as needed (e.g., within a single action or button-click).

In some embodiments, the distribution manager engine 312 may function to generate and/or present a distribution manager portal (e.g., as shown in FIGS. 14A-14I). The distribution manager portal may be presented in response to a user navigating to the distribution manager portal from another portal and/or interface (e.g., a main portal for the limited-administration server system). In some embodiments, the distribution manager portal may be presented in response to a recognized identifier associated with the user. For example, the device of the user (e.g., mobile device) may be recognized by the limited-administration server system as the device of the distribution manager and present the distribution manager portal. This may prevent different limited-administration managers attempting to log in to another limited-administration manager portal. Accordingly, even if another limited-administration manager had the distribution manager credentials, they may be unable to even attempt a login as the distribution manager.

The device manager engine 314 may function to register one or more devices. For example, devices may need to be registered in order to access other systems controlled by the limited-administration server system 102, such as other client systems and/or third-party systems (e.g., third-party systems 106). The device manager engine 314 may store, or cause to be stored, registered device information. The registered device information may be stored in user information (e.g., user information 332) stored in a datastore (e.g., datastore 322). The device information may include a device identifier (e.g., a unique identifier), device type (e.g., company device, BYOD device), device manufacturer (e.g., Apple), device model (e.g., iPhone X), and/or the like. In some embodiments, BYOD devices and other devices (e.g., company devices) may be managed by the device manager as if they were the same type of device. For example, one or more device manager rules 348 may specify separate rules for BYOD devices and other devices, but to the device manager they be managed as if they were the same. In some embodiments, the device manager engine 314 monitors one or more client systems' (e.g., client systems 108) endpoints and/or mobile device managers.

In some embodiments, the device manager engine 314 functions to generate and/or present a device manager portal. The device manager portal may be presented in response to a user navigating to the device manager portal from another portal and/or interface (e.g., a main portal for the limited-administration server system). In some embodiments, the device manager portal may be presented in response to a recognized identifier associated with the user. For example, the device of the user (e.g., laptop) may be recognized by the limited-administration server system as the device of the device manager and present the device manager portal. This may prevent different limited-administration managers attempting to log in to another limited-administration manager portal. Accordingly, even if another limited-administration manager had the device manager credentials, they may be unable to even attempt a login as the device manager.

The monitor manager engine 316 may function to present one or more activity logs. The activity logs may indicate activity of users and/or other limited-administration managers. The monitor engine 316 may also function to receive one or more alerts (e.g., alerts may be related to activity of users and/or other limited-administration managers). In some embodiments, suspicious activity may trigger an alert.

In some embodiments, the monitor engine 316 functions to filter at least a portion of the one or more activity logs based on at least one of the one or more alerts. For example, the monitor engine 316 may filter activity for the user and/or limited-administration manager associated with the alert. In some embodiments, the monitor engine 316 may also function to provide one or more notifications associated with the filtered activity logs and/or alerts. For example, the monitor engine 316 may notify one or more other limited-administration managers, so they may perform appropriate actions (e.g., suspend the user, wipe/deactivate devices).

Figure 15A:
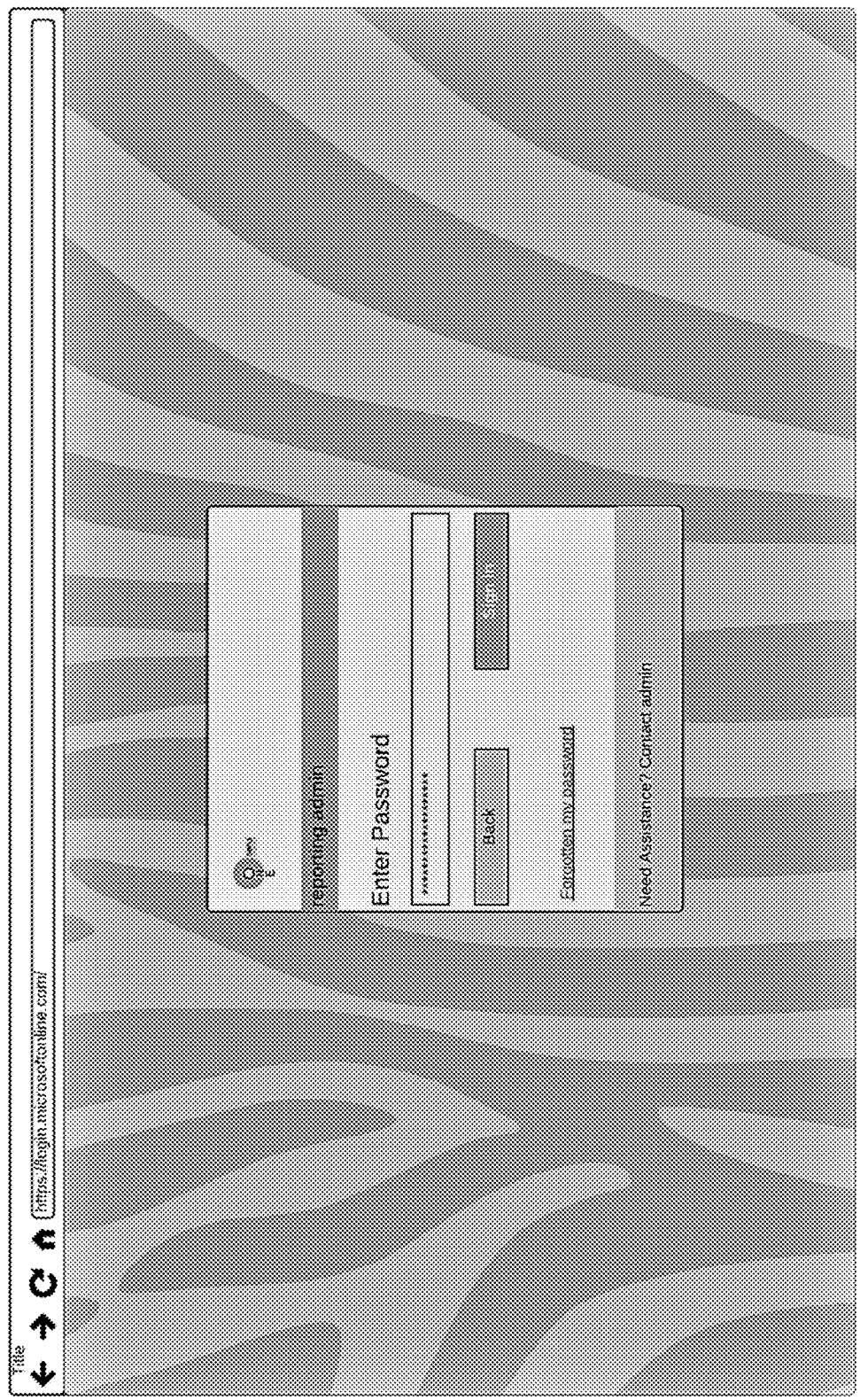

In some embodiments, the monitor manager engine 316 functions to generate and/or present a monitor manager portal (e.g., as shown in FIGS. 15A-15B). The monitor manager portal may be presented in response to a user navigating to the monitor manager portal from another portal and/or interface (e.g., a main portal for the limited-administration server system). In some embodiments, the monitor manager portal may be presented in response to a recognized identifier associated with the user. For example, the device of the user (e.g., laptop) may be recognized by the limited-administration server system as the device of the monitor manager and present the monitor manager portal. This may prevent different limited-administration managers attempting to log in to another limited-administration manager portal. Accordingly, even if another limited-administration manager had the monitor manager credentials, they may be unable to even attempt a login as the monitor manager.

In some embodiments, the monitor engine 316 functions to monitor client systems (e.g., client systems 108). For example, the activity logs may comprise activity logs of security information and event management (SIEM) systems of one or more the client systems.

The security engine 318 may authenticate actions (e.g., system actions and/or user actions). In some embodiments, action authentication may be "non-role" based instead of, or in addition to, role based. For example, whether a limited-administration manager can perform an action is based on the action itself, as opposed to the permissions of the limited-administration manager. In some embodiments, various features and/or information stored on the limited-administration server system 102 and/or associated systems may be associated with a "state," and based upon that state, an action may be allowed or denied. This may improve security, for example, because even if a limited-administration manager is hacked, the authentication engine 318 may prevent actions that may otherwise have been allowable based on the permissions of the limited-administration manager.

The limited-administration server system communication engine 320 may function to send requests, transmit and, receive communications, and/or otherwise provide communication with one or a plurality of systems. In some embodiments, the communication engine 320 functions to encrypt and decrypt communications. The communication engine 320 may function to send requests to and receive data from a system(s) through a network or a portion of a network. Depending upon implementation-specific considerations, the communication engine 320 may send requests and receive data through a connection, all or a portion of which may be a wireless connection. The communication engine 320 may request and receive messages, and/or other communications from associated systems. Communications may be stored in the limited-administration server system datastore 322.

Figure 4:
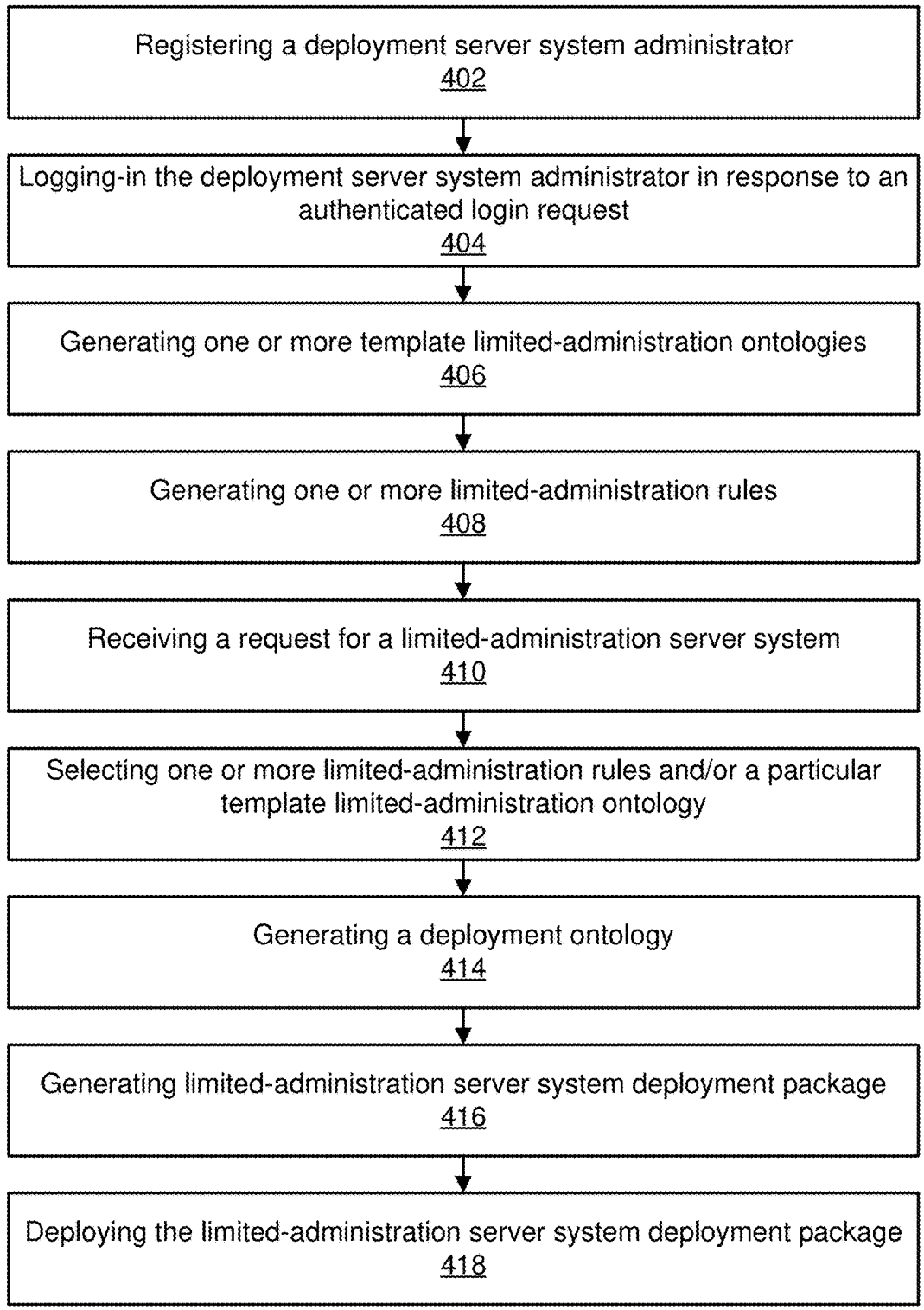
FIG. 4 depicts a flowchart of an example of a method of operation of deployment server system.

FIG. 4 depicts a flowchart 400 of an example of a method of deploying a limited-administration server system according to some embodiments. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed but may have been included for the sake of illustrative clarity.

In step 402, a deployment server system (e.g., deployment server system 104) registers a deployment server system administrator. The deployment server system may be associated (e.g., owned and/or operated by) with a first entity. In some embodiments, a registration engine (e.g., registration engine 202) registers the deployment server system administrator.

In step 404, the deployment server system logs in the deployment server system administrator in response to an authenticated login request. For example, the login request may be received through a server portal. In some embodiments, the login request is authenticated by an authentication engine (e.g., authentication engine 204), and the server portal is generated by a server portal engine (e.g., server portal engine 208).

In step 406, the deployment server system generates, updates, and/or otherwise creates and/or modifies template limited-administration ontologies (e.g., template limited-administration ontologies 230). Template limited-administration ontologies may define objects, parameters, relationships, and/or the like, for configuring a deployment of a limited-administration server system (e.g., limited-administration server system 102). In some embodiments, a limited-administration ontology creation engine (e.g., limited-administration ontology creation engine 206) generates, updates, and/or otherwise creates and/or modifies the template limited-administration ontologies, and the template limited-administration ontologies may be stored in a datastore (e.g., deployment server system datastore 218).

In step 408, the deployment server system generates, updates, and/or otherwise creates and/or modifies limited-administration rules (e.g., limited-administration rules 240). The limited-administration rules may define default rules associated with the template limited-administration ontologies. For example, the template limited-administration ontologies may define the different types of limited-administration managers and their privileges, default types of user groups, user types, job roles, and/or the like. The rules may define default assignments of user types to groups. In some embodiments, once an ontology is deployed (e.g., as part of a deployment server system deployment package) it may not be edited. This may help prevent changing privileges of limited-administration managers, thereby improving security.

In some embodiments, the deployment server system may assign and/or change managers, and/or perform other modifications to the limited-administration rules and/or limited-administration ontology (e.g., groups, user types, job roles, access permissions), for a limited-administration server system before and/or after the limited-administration server system has been deployed (e.g., after deployment, but before a user has been added to the limited-administration server system). In other embodiments, managers may not be assigned and/or changed once the limited-administration server system is deployed. In some embodiments, manager assignments and/or changes may not be made by the limited-administration server system at any time (e.g., before or after deployment). For example, manager assignments and/or changes may only be performed by the deployment server system.

In step 410, the deployment server system receives a request for a limited-administration server system (e.g., limited-administration server system 102). For example, a client administrator logging in through a client portal (e.g., generated by client portal engine 210) of the deployment server system may provide the request to the limited-administration server system. The client administrator may be associated with a second entity. For example, the second entity may be a film production company (e.g., HBO), and the request may be for a limited-administration server system to securely manage a project (e.g., an HBO television show production) of the second entity.

In step 412, the deployment server system identifies and/or selects one or more limited-administration rules (e.g., limited-administration rules 240) and/or a template limited-administration ontology (e.g., a particular template limited-administration ontology 230). The template limited-administration ontology may be selected from the template limited-administration ontologies automatically (e.g., without requiring user input) and/or manually (e.g., by the deployment server system administrator and/or client administrator). For example, the rules and/or ontology may be selected based on the request attributes.

The request attributes may include a deployment time (e.g., a time and/or date of the deployment), a number of client users (e.g., employees of the second entity), the number of devices being managed, the desired security settings (e.g., low security, medium security, high security), and/or client systems (e.g., client systems 108) and/or third-party systems (e.g., third-party systems 106) the client wants controlled by the limited-administration server system. For example, if a client administrator of a film production company submits a request for a high security system, the deployment server system may select a template limited-administration ontology configured with high security settings, and/or select limited-administration rules (or predefined set of limited-administration rules) suitable for a film production company (e.g., including temporary employees, studio groups, production groups). In some embodiments, a limited-administration deployment engine (e.g., limited-administration deployment engine 212) selects the one or more limited-administration rules and/or the template limited-administration ontology.

In step 414, the deployment server system generates a deployment ontology (e.g., deployment ontology 235). The deployment ontology is configured for a limited-administration server system deployment. For example, the deployment ontology may specify domain-level settings (e.g., web domain name, domain security settings), specify and/or elect limited-administration managers (e.g., a particular access permissions manager, a particular user manager, a particular invitation manager, a particular distribution manager, a particular device manager, and a particular monitor manager), and/or the like. In some embodiments, the client administrator may configure the particular template limited-administration ontology, and the limited-administration ontology creation engine generates the deployment ontology based on the configured template limited-administration ontology.

In step 416, the deployment server system generates a limited-administration server system deployment package (e.g., limited-administration server system deployment package 250). The limited-administration server system deployment package may include the one or more identified limited-administration rules and/or the deployment ontology, and/or other files/executables required to "spin-up" the limited-administration server system. In some embodiments, the limited-administration ontology creation engine generates the limited-administration server system deployment package.

In step 418, the deployment server system deploys the limited-administration server system deployment package. The deployment server system may deploy the limited-administration server system deployment package over a network (e.g., communication network 110). The deployment may create (or, "spin-up") the limited-administration server system and/or integrate the limited-administration server system with one or more other systems (e.g., client systems 108, third-party systems 106). For example, once the limited-administration server system is spun-up, it may manage and/or control access privileges for some or all of the client systems and/or third-party systems associated with the second entity (e.g., at least a portion of a client network).

Figure 5:
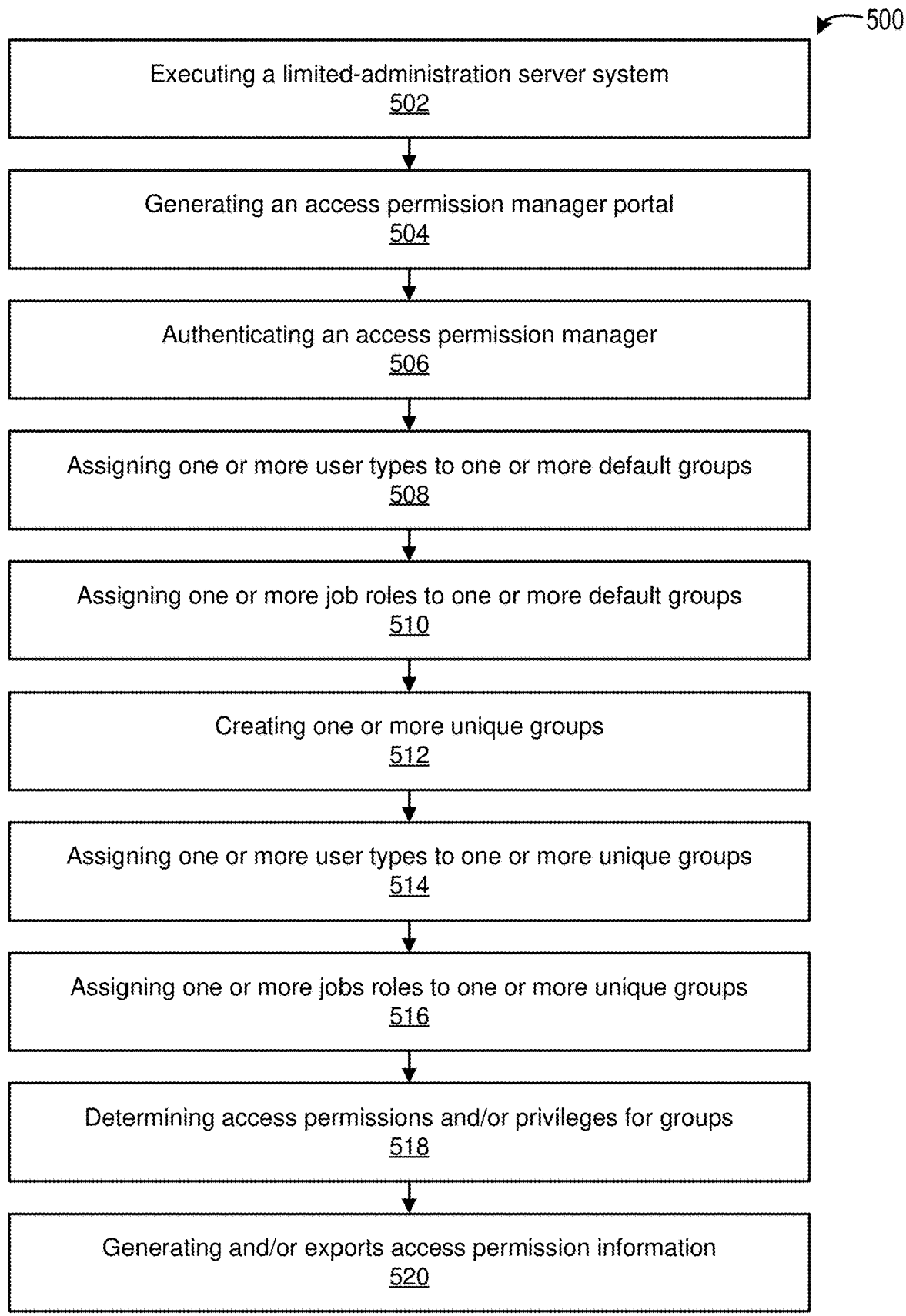
FIG. 5 depicts a flowchart of an example of a method of operation of a limited-administration server system for an access permissions manager according to some embodiments.

FIG. 5 depicts a flowchart 500 of an example of a method of operation of a limited-administration server system for an access permissions manager according to some embodiments.

In step 502, a limited-administration server system (e.g., limited-administration server system 102) is executed (e.g., in a virtual private cloud). The limited-administration server system may be associated with a second entity (or, "client" entity), and/or the limited-administration server system may control access to, and/or manage, systems and/or information associated with the second entity. For example, the associated systems may include client systems (e.g., client systems 108) and/or third-party systems (e.g., third-party systems 106).

In one example, the limited-administration server system may be associated with a company to control access to and/or share information associated with documents (e.g., scripts, production schedules), employees (e.g., employee contact information, job role, department), electronic communications (e.g., email), cloud-based services (e.g., Azure, Intune), user devices (e.g., BYOD devices, devices registered with the first entity). In some embodiments, the limited-administration server system 102 may perform such functionality by "hooking" into new and/or existing client systems and/or third-party systems, and/or the functionality thereof may be included in the limited-administration server system. For example, the limited-administration server system may include APIs for interacting/interfacing with Azure, Intune, and/or other systems associated with the second entity.

In step 504, the limited-administration server system generates and/or presents an access permission manager portal. The access permission manager portal may be presented in response to a user navigating to the access permission manager portal from another portal and/or interface (e.g., a main portal for the limited-administration server system). In some embodiments, the access permission manager portal may be presented in response to a recognized identifier associated with the user. For example, the device of the user (e.g., laptop) may be recognized by the limited-administration server system as the device of the access permissions manager, and subsequently present the access permission manager portal. This may prevent different limited-administration managers attempting to log in to another limited-administration manager portal. Accordingly, even if another limited-administration manager had the access permissions manager credentials, they may be unable to even attempt a login as the access permissions manager. In some embodiments, an access permission manager engine (e.g., access permission manager engine 306) generates the access permission manager portal.

In step 506, the limited-administration server system authenticates the access permissions manager. For example, the access permissions manager may provide credentials (e.g., username, password, multi-factor authentication) through the access permission manager portal. In some embodiments, an authentication engine (e.g., authentication engine 304) authenticates the access permissions manager. If the authentication is successful, the limited-administration server system may present one or more access permission manager interfaces of the access permission manager portal (e.g., as shown in FIGS. 11A-11N). If the authentication fails, the failed login attempt may be logged, and/or another limited-administration administrator may be notified (e.g., monitor manager).

In step 508, an access permission manager engine (e.g., access permission manager engine 306) assigns one or more user types to one or more default user groups (or, simply, "groups"). In some embodiments, the access permission manager engine may perform the assignments by editing one or more rules (e.g., limited-administration access permission manager rules 340).

In step 510, the access permission manager engine assigns one or more job roles to one or more default groups. In some embodiments, the access permission manager engine may perform the assignments by editing the one or more rules.

In step 512, the access permission manager engine creates one or more unique groups. In some embodiments, the access permission manager engine may create the one or more unique groups by editing the one or more rules.

In step 514, the access permission manager engine assigns one or more user types to one or more unique groups. In some embodiments, the access permission manager engine may perform the assignments by editing the one or more rules.

In step 516, the access permission manager engine assigns one or more jobs roles to one or more unique groups. In some embodiments, the access permission manager engine may perform the assignments by editing the one or more rules.

In step 518, the access permission manager determines access permissions and/or privileges (or, collectively, "permissions") for groups. In some embodiments, the access permission manager engine may determine the permissions based on the one or more rules. In various embodiments, the access permission manager engine may be able to create new permissions and/or edit existing permissions. In some embodiments, the permissions may not be editable (e.g., the rules are immutable), and the access permission manager engine may be limited to performing assignments and creating groups, and not be able to adjust the permissions associated with the job role, user type, and/or the like.

In step 520, the access permission manager engine generates and/or exports access permission information. Access permission information may include information associated with any of the steps 508-518. For example, the access permission information may include assignments of user types and jobs to default and/or unique groups, permissions of groups to access file sharing systems, and/or the like. The access permission information may be exported in spreadsheet format (e.g., Excel), as a list, and/or the like. In some embodiments, the access permission manager engine generates a model and/or object-oriented structure (e.g., an object model) from the exported document (e.g., the Excel spreadsheet) For example, an object model may comprise a graph in which the nodes are user types, job roles, and groups, and the edges may be the assignment. The edges may also indicate permissions (e.g., the edges may be weighted to indicate permissions).

Figure 6:
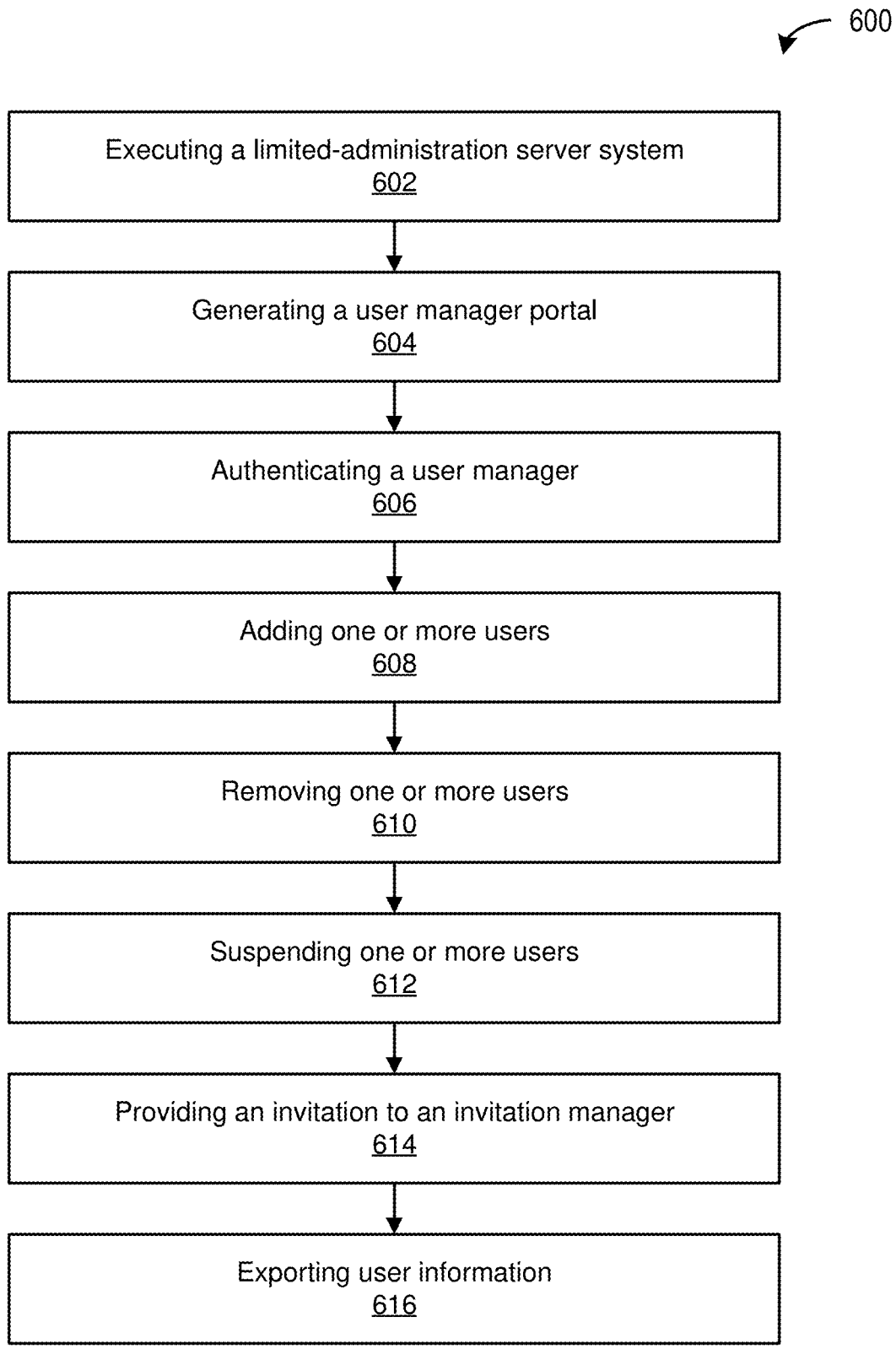
FIG. 6 depicts a flowchart of an example of a method of operation of a limited-administration server system for a user manager according to some embodiments.

FIG. 6 depicts a flowchart 600 of an example of a method of operation of a limited-administration server system for a user manager according to some embodiments.

In step 602, a limited-administration server system (e.g., limited-administration server system 102) is executed (e.g., in a virtual private cloud). The limited-administration server system may be associated with a second entity (or, "client" entity), and/or the limited-administration server system may control access to, and/or manage, systems and/or information associated with the second entity. For example, the associated systems may include client systems (e.g., client systems 108) and/or third-party systems (e.g., third-party systems 106).

In one example, the limited-administration server system may be associated with a film production company to control access to and/or share information associated with documents (e.g., scripts, production schedules), employees (e.g., employee contact information, job role, department), electronic communications (e.g., email), cloud-based services (e.g., Azure, Intune), user devices (e.g., BYOD devices, devices registered with the first entity). In some embodiments, the limited-administration server system 102 may perform such functionality by "hooking" into new and/or existing client systems and/or third-party systems, and/or the functionality thereof may be included in the limited-administration server system. For example, the limited-administration server system may include APIs for interacting/interfacing with Azure, Intune, and/or other systems associated with the second entity.

In step 604, the limited-administration server system generates and/or presents a user manager portal. Like the other limited-administration portals described herein, they are limited to functionality of the associated manager. For example, the user manager portal provides access to functionality of a user manager, but not the functionality of an access permissions manager. The user manager portal may be presented in response to a user navigating to the user manager portal from another portal and/or interface (e.g., a main portal for the limited-administration server system). In some embodiments, the user manager portal may be presented in response to a recognized identifier associated with the user. For example, the device of the user (e.g., laptop) may be recognized by the limited-administration server system as the device of the user manager and present the user manager portal. This may prevent different limited-administration managers attempting to log in to another limited-administration manager portal. Accordingly, even if another limited-administration manager had the user manager credentials, they may be unable to even attempt a login as the user manager. In some embodiments, a user manager engine (e.g., user manager engine 308) generates the user manager portal.

In step 606, the limited-administration server system authenticates the user manager. For example, the user manager may provide credentials (e.g., username, password, multi-factor authentication) through the user manager portal. In some embodiments, an authentication engine (e.g., authentication engine 304) authenticates the user manager. If the authentication is successful, the limited-administration server system may present one or more user manager interfaces of the user manager portal (e.g., as shown in FIGS. 12A-12J). If the authentication fails, the failed login attempt may be logged, and/or another limited-administration administrator may be notified (e.g., monitor manager).

In step 608, the user manager engine adds one or more users. The user manager engine may add users according to one or more rules (e.g., user manager rules 342). For example, the user manager engine may input user information (e.g., user information 332) as free-text and/or selections from dropdown menus (e.g., defined by user manager rules 342), and/or the like (e.g., as shown in FIGS. 12B-12F), and the user information may be stored in a datastore (e.g., datastore 322).

In step 610, the user manager engine removes one or more users. The user manager engine may remove users according to the one or more rules. For example, the user manager engine may delete the user information corresponding to the removed user.

In step 612, the user manager engine suspends one or more users. For example, a user may be temporarily suspended and may be eligible for reactivation. The user manager engine may remove users according to the one or more rules. For example, the user manager engine may flag the user information corresponding to the suspending user, the flag indicating a suspended status. The user manager engine may subsequently reactivate the user (e.g., by removing and/or modifying the flag). The user manager engine may repeat suspension and/or reactivation actions. This may, for example, reduce system load and/or cruft.

In step 614, the user manager engine provides an invitation to an invitation manager. The invitation may include some or all of the user information (e.g., as specified by the one or more rules). In one example, the user manager end provides a notification to an invitation manager engine (e.g., invitation manager engine 310) that there are new users to approve and/or invite. In some embodiments, the notification only includes a user identifier (e.g., a user name), and/or the notification may be provided in the form of an email.

In step 616, the user manager engine exports the user information. The user manager engine may export the user information based on the one or more rules. For example, the one or more rules may specify a destination (e.g., a target folder address), encryption protocols, and/or the like.

Figure 7:
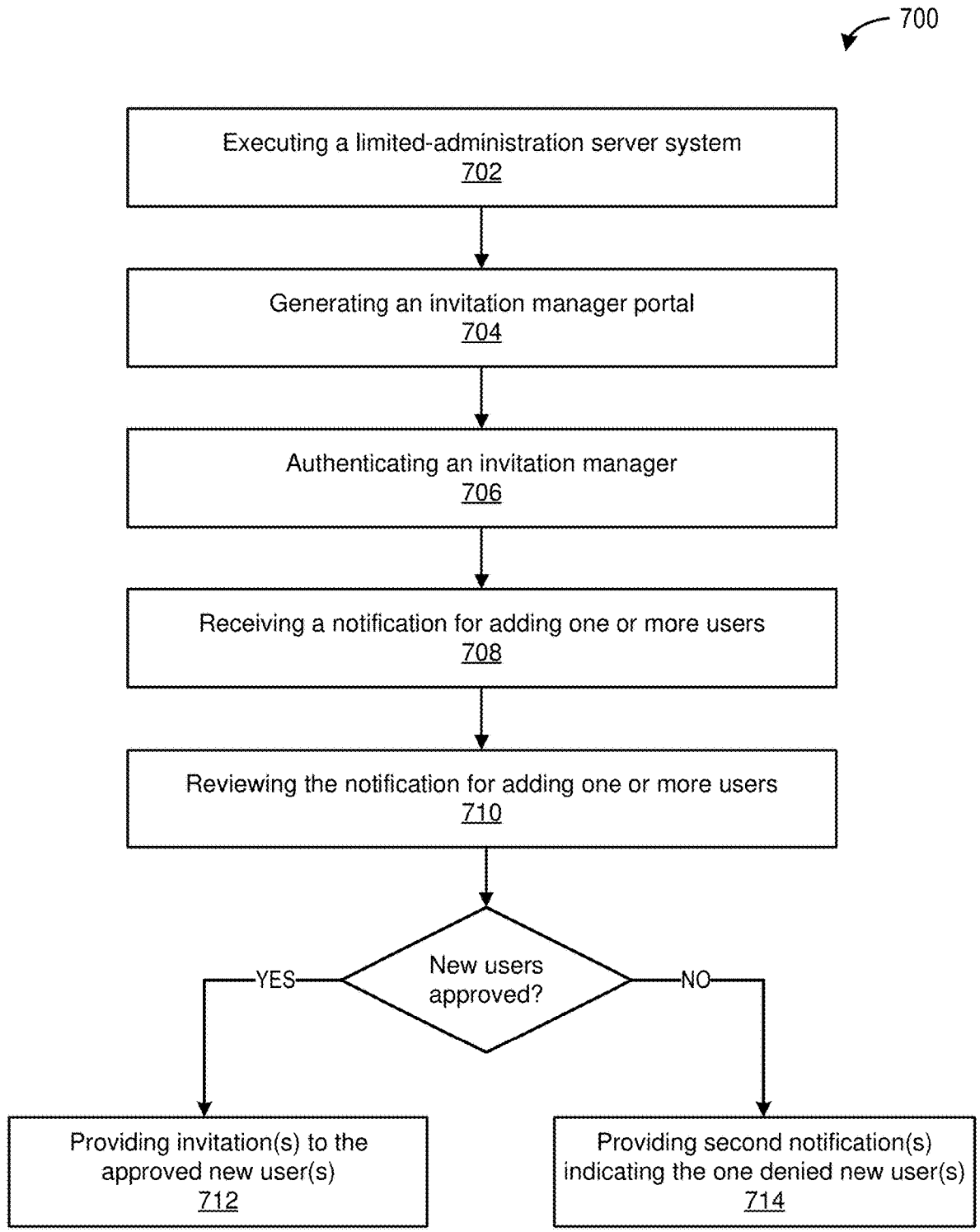
FIG. 7 depicts a flowchart of an example of a method of operation of a limited-administration server system for an invitation manager according to some embodiments.

FIG. 7 depicts a flowchart 700 of an example of a method of operation of a limited-administration server system for an invitation manager according to some embodiments.

In step 702, a limited-administration server system (e.g., limited-administration server system 102) is executed (e.g., in a virtual private cloud). The limited-administration server system may be associated with a second entity (or, "client" entity), and/or the limited-administration server system may control access to, and/or manage, systems and/or information associated with the second entity. For example, the associated systems may include client systems (e.g., client systems 108) and/or third-party systems (e.g., third-party systems 106).

In one example, the limited-administration server system may be associated with a film production company to control access to and/or share information associated with documents (e.g., scripts, production schedules), employees (e.g., employee contact information, job role, department), electronic communications (e.g., email), cloud-based services (e.g., Azure, Intune), user devices (e.g., BYOD devices, devices registered with the first entity). In some embodiments, the limited-administration server system 102 may perform such functionality by "hooking" into new and/or existing client systems and/or third-party systems, and/or the functionality thereof may be included in the limited-administration server system. For example, the limited-administration server system may include APIs for interacting/interfacing with Azure, Intune, and/or other systems associated with the second entity.

In step 704, the limited-administration server system generates and/or presents an invitation manager portal. The invitation manager portal may be presented in response to a user navigating to the invitation manager portal from another portal and/or interface (e.g., a main portal for the limited-administration server system). In some embodiments, the invitation manager portal may be presented in response to a recognized identifier associated with the user. For example, the device of the user (e.g., laptop) may be recognized by the limited-administration server system as the device of the invitation manager and present the invitation manager portal. This may prevent different limited-administration managers attempting to log in to another limited-administration manager portal. Accordingly, even if another limited-administration manager had the invitation manager credentials, they may be unable to even attempt a login as the invitation manager. In some embodiments, an invitation manager engine (e.g., invitation manager engine 310) generates the invitation manager portal.

In step 706, the limited-administration server system authenticates the invitation manager. For example, the invitation manager may provide credentials (e.g., username, password, multi-factor authentication) through the invitation manager portal. In some embodiments, an authentication engine (e.g., authentication engine 304) authenticates the invitation manager. If the authentication is successful, the limited-administration server system may present one or more invitation manager interfaces of the invitation manager portal (e.g., as shown in FIGS. 13A-13C). If the authentication fails, the failed login attempt may be logged, and/or another limited-administration administrator may be notified (e.g., monitor manager).

In step 708, the invitation manager engine receives a notification for adding one or more new users. For example, a user manager engine (e.g., user manager engine 308) may have input user information (e.g., user information 332) for a new user into a datastore (e.g., datastore 322). The notification may include an identifier (e.g., name(s) of the one or more users) and/or other information (e.g., at least a portion of the corresponding user information) The notification may be received from a user manager engine (e.g., user manager engine 308).

In step 710, the invitation manager engine reviews the notification. For example, the invitation manager engine may review the notification for accuracy of user names, assigned departments, job roles, special roles, access dates (e.g., start/end dates), and/or the like. Based on the review, the invitation manager engine may either approve or deny the addition of the one or more new users.

If approved (step 712), the invitation manager engine may provide a respective invitation (e.g., email invitation) to each of the approved one or more users invitations. The invitations may be "welcome" invitations indicating onboarding steps the users need to perform (e.g., setup passwords, register devices).

If denied (step 714), the denied users may remain uninvited, and unable to setup or access accounts, until their information is corrected. For example, the invitation manager engine may provide a second notification to the user manager engine indicating the denial, and the user manager engine may correct the information and provide an updated notification back to the invitation manager engine. The second notification may indicate the denied users and/or the reasons for denial (e.g., misspelled name).

Figure 8:
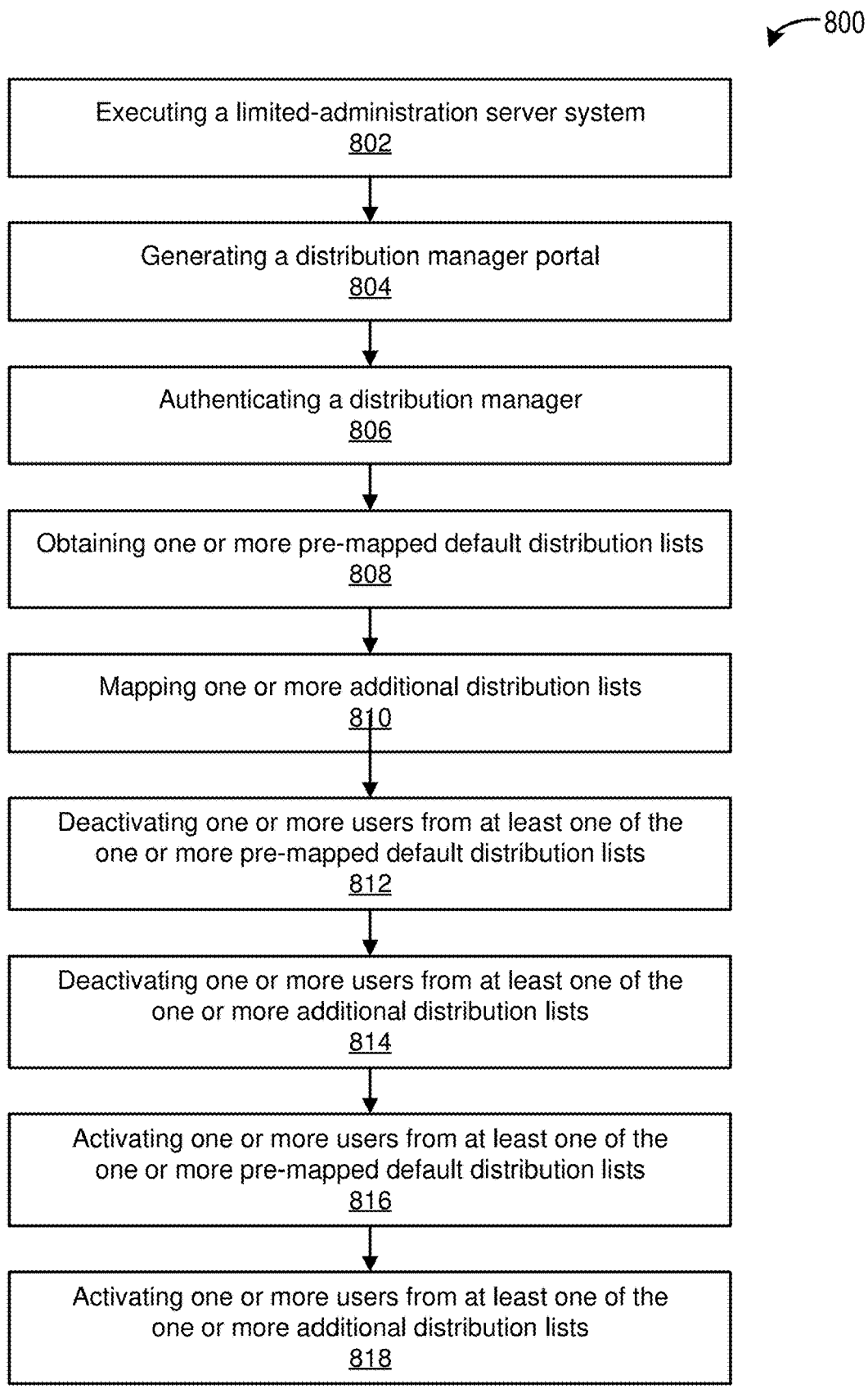
FIG. 8 depicts a flowchart of an example of a method of operation of a limited-administration server system for a distribution manager according to some embodiments.

FIG. 8 depicts a flowchart 800 of an example of a method of operation of a limited-administration server system for a distribution manager according to some embodiments.

In step 802, a limited-administration server system (e.g., limited-administration server system 102) is executed (e.g., in a virtual private cloud). The limited-administration server system may be associated with a second entity (or, "client" entity), and/or the limited-administration server system may control access to, and/or manage, systems and/or information associated with the second entity. For example, the associated systems may include client systems (e.g., client systems 108) and/or third-party systems (e.g., third-party systems 106).

In one example, the limited-administration server system may be associated with a film production company to control access to and/or share information associated with documents (e.g., scripts, production schedules), employees (e.g., employee contact information, job role, department), electronic communications (e.g., email), cloud-based services (e.g., Azure, Intune), user devices (e.g., BYOD devices, devices registered with the first entity). In some embodiments, the limited-administration server system 102 may perform such functionality by "hooking" into new and/or existing client systems and/or third-party systems, and/or the functionality thereof may be included in the limited-administration server system. For example, the limited-administration server system may include APIs for interacting/interfacing with Azure, Intune, and/or other systems associated with the second entity.

In step 804, the limited-administration server system generates and/or presents a distribution manager portal. The distribution manager portal may be presented in response to a user navigating to the distribution manager portal from another portal and/or interface (e.g., a main portal for the limited-administration server system). In some embodiments, the distribution manager portal may be presented in response to a recognized identifier associated with the user. For example, the device of the user (e.g., laptop) may be recognized by the limited-administration server system as the device of the distribution manager and present the distribution manager portal. This may prevent different limited-administration managers attempting to log in to another limited-administration manager portal. Accordingly, even if another limited-administration manager had the distribution manager credentials, they may be unable to even attempt a login as the distribution manager. In some embodiments, a distribution manager engine (e.g., distribution manager engine 312) generates the distribution manager portal.

In step 806, the limited-administration server system authenticates the distribution manager. For example, the distribution manager may provide credentials (e.g., username, password, multi-factor authentication) through the distribution manager portal. In some embodiments, an authentication engine (e.g., authentication engine 304) authenticates the distribution manager. If the authentication is successful, the limited-administration server system may present one or more distribution manager interfaces of the distribution manager portal (e.g., as shown in FIGS. 14A-14I). If the authentication fails, the failed login attempt may be logged, and/or another limited-administration administrator may be notified (e.g., monitor manager).

In step 808, the distribution manager engine obtains one or more pre-mapped default distribution lists. It will be appreciated that "list" as used herein may include other structures (e.g., tree structures, spreadsheets, objects, or other structured information). The pre-mapped default distributions lists may be obtained from, and/or based on, one or more rules (e.g., distribution manager rules 346). For example, the pre-mapped default rules may have a predefined group for each "Department" and/or other predefined units of the organization/entity associated with the limited-administration server system. Accordingly, a particular pre-mapped default distribution list may include all of the users (e.g., employees) assigned to the "Animation" department.

In step 810, the distribution manager engine maps one or more additional distribution lists. The distribution manager engine may map (or, "create") the one or more additional distribution lists from, and/or based on, the one or more rules. For example, the distribution manager engine may create a "temporary hire" distribution list. The temporary hire list may indicate some or all of temporary users. Temporary uses may be active for any amount of time (e.g., 5 hours or 5 months). In some embodiments, temporary user access may expire at a predetermined time and/or within a predetermined time. For example, temporary user "Joe Smith" may be a "daily" hire having access (e.g., as defined his job type and role and/or group assignments) starting at 6 AM on Jan. 5, 2018, and expiring at 5 PM, Jan. 5, 2018. During that time, he may send and received emails, view email attachments, and/or perform other actions dependent on his associated access permissions. At the expiration time, some or all access privilege may be revoked, and some or all actions may be prevented. For example, expired temporary user may no longer be able to view emails, view attachments, and/or the like.

In another example, the distribution manager engine may create an "external" distribution list for users outside without direct access to the systems controlled by the limited-administration server system. For example, the external list may include visitors. Users on the external list may also have expiring access privileges.

In one example, the distribution manager engine only adds daily hires, potential hires, and/or other "non-user" roles (e.g., individuals without access to client systems, third-party systems, and/or the like) to distribution lists only, as such non-user may not receive additional privileges. The distribution manager engine may activate such non-users to receive communications (e.g., emails) provided based on distribution lists in which they are included, but such users may not have other privileges. The distribution manager engine may also deactivate non-users. In some embodiments, deactivated non-users may remain on the distributions lists, but will not receive communications, and/or be able to view past communications, associated with those distribution lists, until they are reactivated. In other embodiments, deactivated non-users may be removed from associated distribution lists, and are automatically re-added when they are reactivated. In some embodiments, activating/deactivating non-users and users may cause client distribution lists (e.g., Outlook Email Groups, Microsoft Teams, and/or the like) to be similarly updated.

In step 812, the distribution manager engine deactivates one or more users from at least one of the one or more pre-mapped default distribution lists. For example, the distribution manager engine may deactivate a user when the user is terminated.

In step 814, the distribution manager engine deactivates one or more users from at least one of the one or more additional distribution lists. For example, the distribution manager engine may deactivate a temporary hire user when the user at the expiration date and time.

In step 816, the distribution manager engine activates one or more users from at least one of the one or more pre-mapped default distribution lists. For example, if a user returns from a leave of absence, rather than having add the user again, the use can be activated.

In step 818, the distribution manager engine activates one or more users from at least one of the one or more additional distribution lists. For example, the distribution manager engine may activate a temporary hire user that was previously deactivated. This may prevent the need to routinely add and remove users, which can be a time consuming and/or computing intensive process. Rather, temporary hires may be activated and deactivated as needed (e.g., within a single action or button-click).

Figure 9:
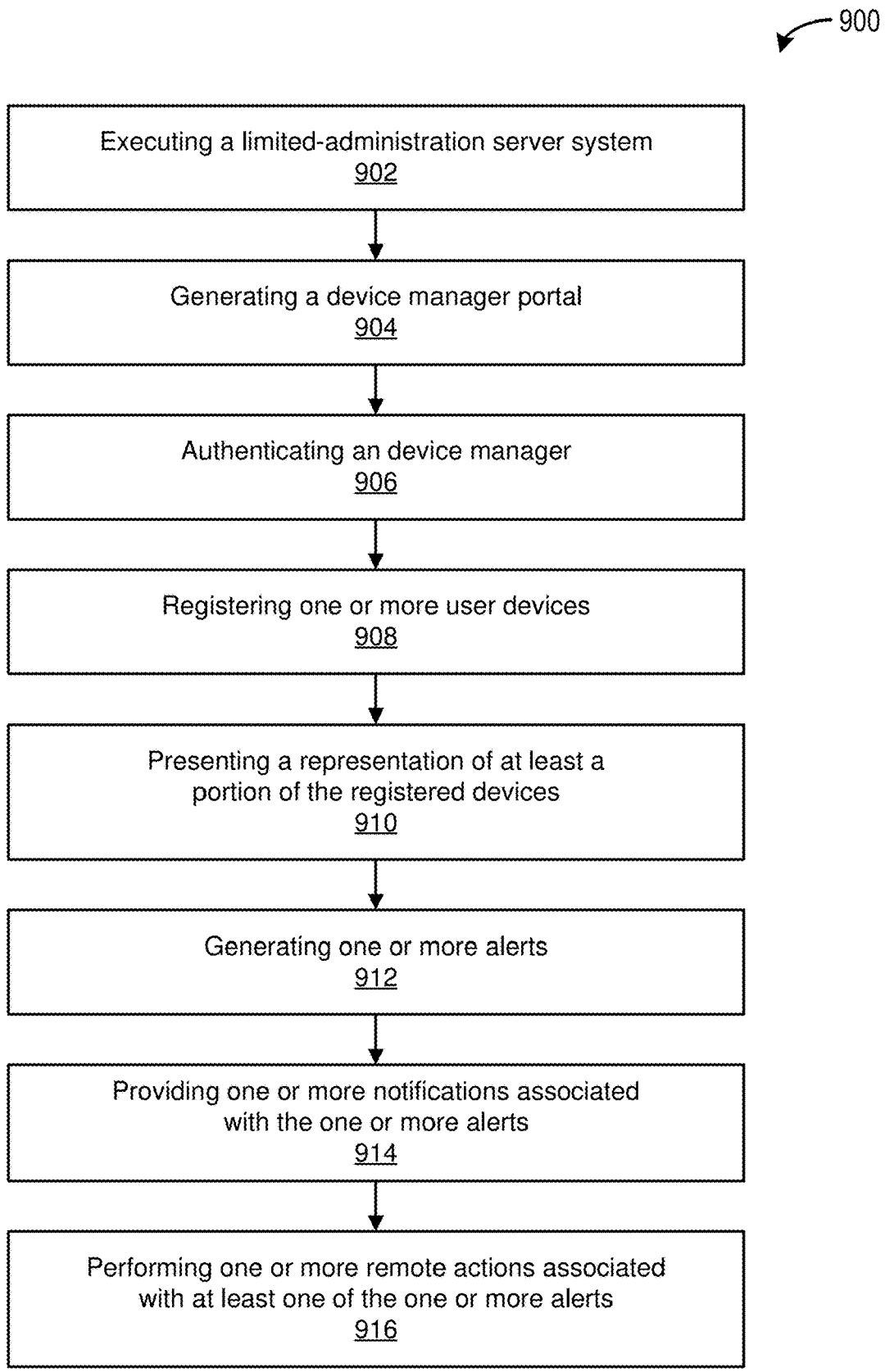
FIG. 9 depicts a flowchart of an example of a method of operation of a limited-administration server system for a device manager according to some embodiments.

FIG. 9 depicts a flowchart 900 of an example of a method of operation of a limited-administration server system for a device manager according to some embodiments.

In step 902, a limited-administration server system (e.g., limited-administration server system 102) is executed (e.g., in a virtual private cloud). The limited-administration server system may be associated with a second entity (or, "client" entity), and/or the limited-administration server system may control access to, and/or manage, systems and/or information associated with the second entity. For example, the associated systems may include client systems (e.g., client systems 108) and/or third-party systems (e.g., third-party systems 106).

In one example, the limited-administration server system may be associated with a film production company to control access to and/or share information associated with documents (e.g., scripts, production schedules), employees (e.g., employee contact information, job role, department), electronic communications (e.g., email), cloud-based services (e.g., Azure, Intune), user devices (e.g., BYOD devices, devices registered with the first entity). In some embodiments, the limited-administration server system 102 may perform such functionality by "hooking" into new and/or existing client systems and/or third-party systems, and/or the functionality thereof may be included in the limited-administration server system. For example, the limited-administration server system may include APIs for interacting/interfacing with Azure, Intune, and/or other systems associated with the second entity.

In step 904, the limited-administration server system generates and/or presents a device manager portal. The device manager portal may be presented in response to a user navigating to the device manager portal from another portal and/or interface (e.g., a main portal for the limited-administration server system). In some embodiments, the device manager portal may be presented in response to a recognized identifier associated with the user. For example, the device of the user (e.g., laptop) may be recognized by the limited-administration server system as the device of the device manager and present the device manager portal. This may prevent different limited-administration managers attempting to log in to another limited-administration manager portal. Accordingly, even if another limited-administration manager had the device manager credentials, they may be unable to even attempt a login as the device manager. In some embodiments, a device manager engine (e.g., device manager engine 314) generates the device manager portal.

In step 906, the limited-administration server system authenticates the device manager. For example, the device manager may provide credentials (e.g., username, password, multi-factor authentication) through the device manager portal. In some embodiments, an authentication engine (e.g., authentication engine 304) authenticates the device manager. If the authentication is successful, the limited-administration server system may present one or more device manager interfaces of the device manager portal (e.g., as shown in FIGS. 14A-14I). If the authentication fails, the failed login attempt may be logged, and/or another limited-administration administrator may be notified (e.g., monitor manager).

In step 908, the device manager engine registers one or more user devices (e.g., client systems 108). Devices may need to be registered in order to access other systems controlled by the limited-administration server system, such other client systems and/or third-party systems (e.g., third-party systems 106). The device manager engine may store registered device information in user information (e.g., user information 332) stored in a datastore (e.g., datastore 322). The device information may include a device identifier (e.g., a unique identifier), device type (e.g., company device, BYOD device), device manufacturer (e.g., Apple), device model (e.g., iPhone X), and/or the like. In some embodiments, BYOD devices and other devices (e.g., company devices) may be managed by the device manager as if they were the same type of device. For example, one or more rules (e.g., device manager rules 348) may specify separate rules for BYOD devices and other devices, but to the device manager they be managed as if they were the same.

In step 910, the device manager engine presents a representation of at least a portion of the registered devices. For example, the device manager engine may present a graphical list of all devices on the network and/or the devices associated with a particular user.

In step 912, the device manager engine generates, receives and/or presents alerts. The alerts may relate to non-compliant devices, users having more than a predetermined number of allowed registered devices, and/or the like. Non-compliant devices may be devices be BYOD devices that do not meet predefined security standards (e.g., as defined by the one or more rules), devices with failing components (e.g., battery health), devices without legacy hardware and/or software, devices with software installed that do not conform with a whitelist, devices with software installed that are associated with a blacklist, and/or the like.

In step 914, the device manager engine provides one or more notifications associated with the alerts. For example, the device manager engine may provide notifications to users (e.g., users who have non-compliant devices) and/or other limited-administration managers (e.g., monitor manager).

In step 916, the device manager engine performs remote action(s) associated with the alerts. For example, the device manager engine may be able activate and/or deactivate devices, remote wipe devices, and/or the like.

Figure 10:
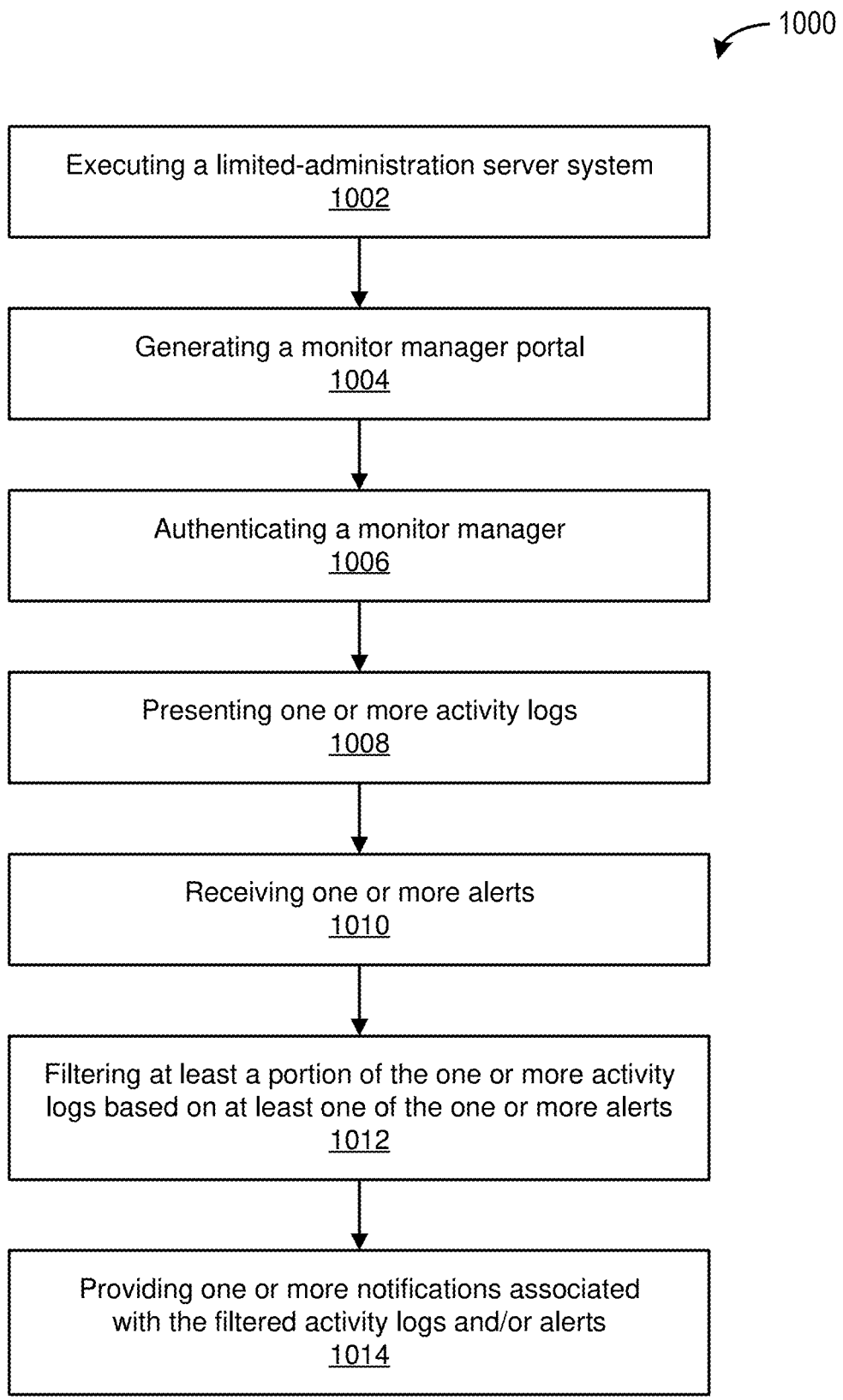
FIG. 10 depicts a flowchart of an example of a method of operation of a limited-administration server system for a monitor manager according to some embodiments.

FIG. 10 depicts a flowchart 1000 of an example of a method of operation of a limited-administration server system for a monitor manager according to some embodiments.

In step 1002, a limited-administration server system (e.g., limited-administration server system 102) is executed (e.g., in a virtual private cloud). The limited-administration server system may be associated with a second entity (or, "client" entity), and/or the limited-administration server system may control access to, and/or manage, systems and/or information associated with the second entity. For example, the associated systems may include client systems (e.g., client systems 108) and/or third-party systems (e.g., third-party systems 106).

In one example, the limited-administration server system may be associated with a film production company to control access to and/or share information associated with documents (e.g., scripts, production schedules), employees (e.g., employee contact information, job role, department), electronic communications (e.g., email), cloud-based services (e.g., Azure, Intune), user devices (e.g., BYOD devices, devices registered with the first entity). In some embodiments, the limited-administration server system 102 may perform such functionality by "hooking" into new and/or existing client systems and/or third-party systems, and/or the functionality thereof may be included in the limited-administration server system. For example, the limited-administration server system may include APIs for interacting/interfacing with Azure, Intune, and/or other systems associated with the second entity.

In step 1004, the limited-administration server system generates and/or presents a monitor manager portal. The monitor manager portal may be presented in response to a user navigating to the monitor manager portal from another portal and/or interface (e.g., a main portal for the limited-administration server system). In some embodiments, the monitor manager portal may be presented in response to a recognized identifier associated with the user. For example, the device of the user (e.g., laptop) may be recognized by the limited-administration server system as the device of the monitor manager and present the monitor manager portal. This may prevent different limited-administration managers attempting to log in to another limited-administration manager portal. Accordingly, even if another limited-administration manager had the monitor manager credentials, they may be unable to even attempt a login as the monitor manager. In some embodiments, a monitor manager engine (e.g., monitor manager engine 316) generates the monitor manager portal.

In step 1006, the limited-administration server system authenticates the monitor manager. For example, the monitor manager may provide credentials (e.g., username, password, multi-factor authentication) through the monitor manager portal. In some embodiments, an authentication engine (e.g., authentication engine 304) authenticates the monitor manager. If the authentication is successful, the limited-administration server system may present one or more monitor manager interfaces of the monitor manager portal (e.g., as shown in FIGS. 14A-14I). If the authentication fails, the failed login attempt may be logged, and/or another limited-administration administrator may be notified (e.g., monitor manager).

In step 1008, the monitor engine presents one or more activity logs (e.g., activity logs of one or more client systems 108 managed by the limited-administration server system). The activity logs may indicate activity of users and/or other limited-administration managers.

In step 1010, the monitor engine receives one or more alerts. The alerts may be related to activity of users and/or other limited-administration administrators. For example, suspicious activity may trigger an alert.

In step 1012, the monitor engine filters at least a portion of the one or more activity logs based on at least one of the one or more alerts. For example, the monitor engine may filter activity for the user and/or limited-administration associated with the alert.

In step 1014, the provides one or more notifications associated with the filtered activity logs and/or alerts. For example, the monitor may notify one or more other limited-administration managers, so they may perform appropriate actions (e.g., suspend the user).

FIGS. 11A-11N depict screenshots of example access permission manager interfaces 1105-1170 of an example limited-administration server system (e.g., limited-administration server system 102) according to some embodiments. The screenshots of FIGS. 11A-11N, as well other screenshots shown herein, may be shown in order, or they may be shown out of order. For example, the GUI 1110 may be reached from the GUI 1105 in some embodiments.

In the example of FIG. 11A, the example graphical user interface (GUI) 1105 depicts a sign-on page for an access permissions manager to sign-on to an access manager portal. The GUI 1105 may be generated by the limited-administration server system and/or displayed by a client system (e.g., client system 108). The user is prompted to enter authentication credentials (e.g., password). In some embodiments, the GUI 1105 and/or related features may be limited based on a source of the login request. For example, if the login request is coming from a device that is not registered with the limited-administration server system 102, then the limited-administration server system 102 may deny the request, regardless of whether the proper credentials are given.

In the example of FIG. 11B, the example GUI 1110 depicts an access permission manager (or, "security configuration manager") interface. The GUI 1110 includes a base location and additional locations. These locations may be geographical locations of an organization associated with the limited-administration server system (e.g., HBO). For example, the locations may be of various production studios.

Figure 11C:
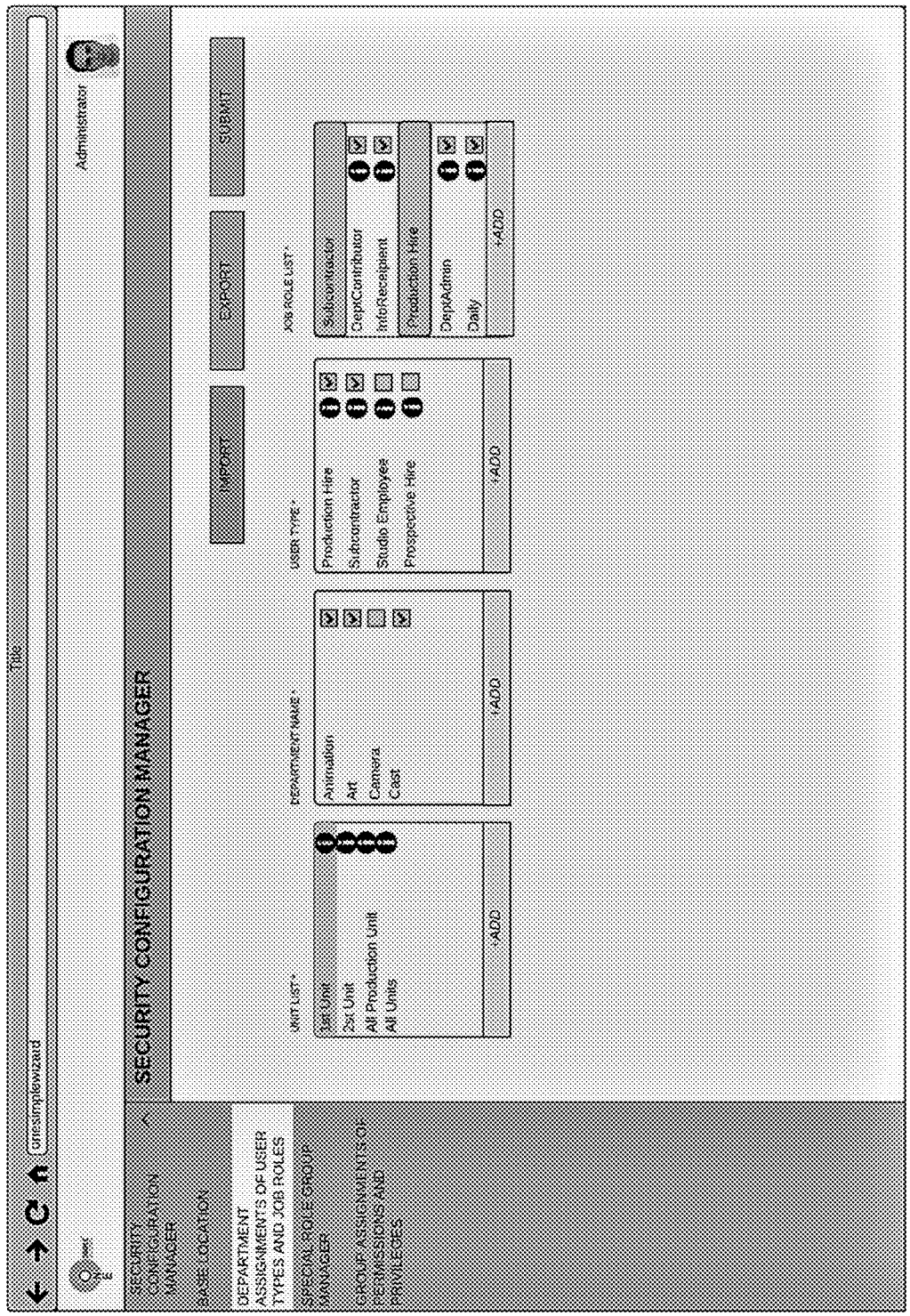
Figure 11D:
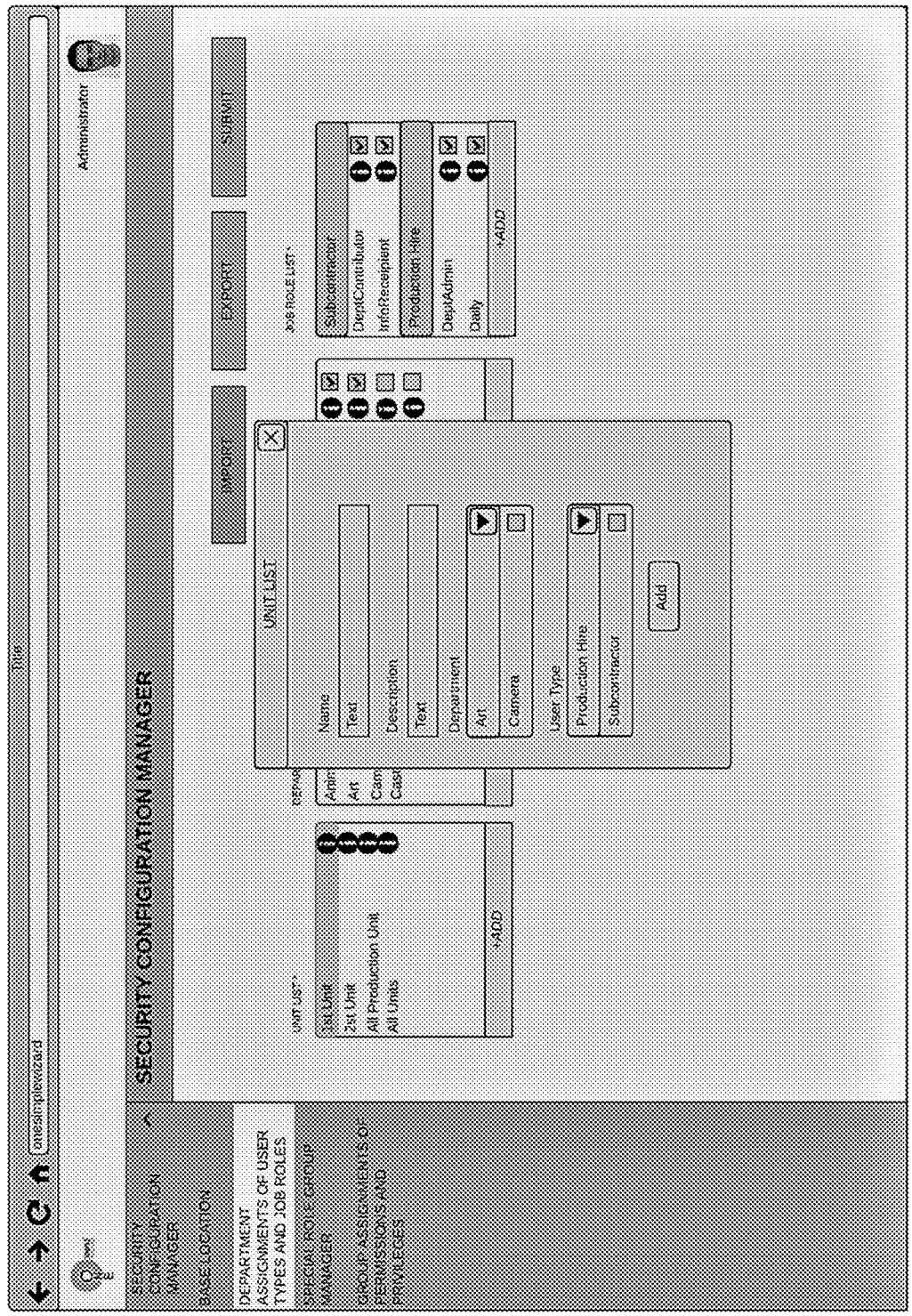
Figure 11E:
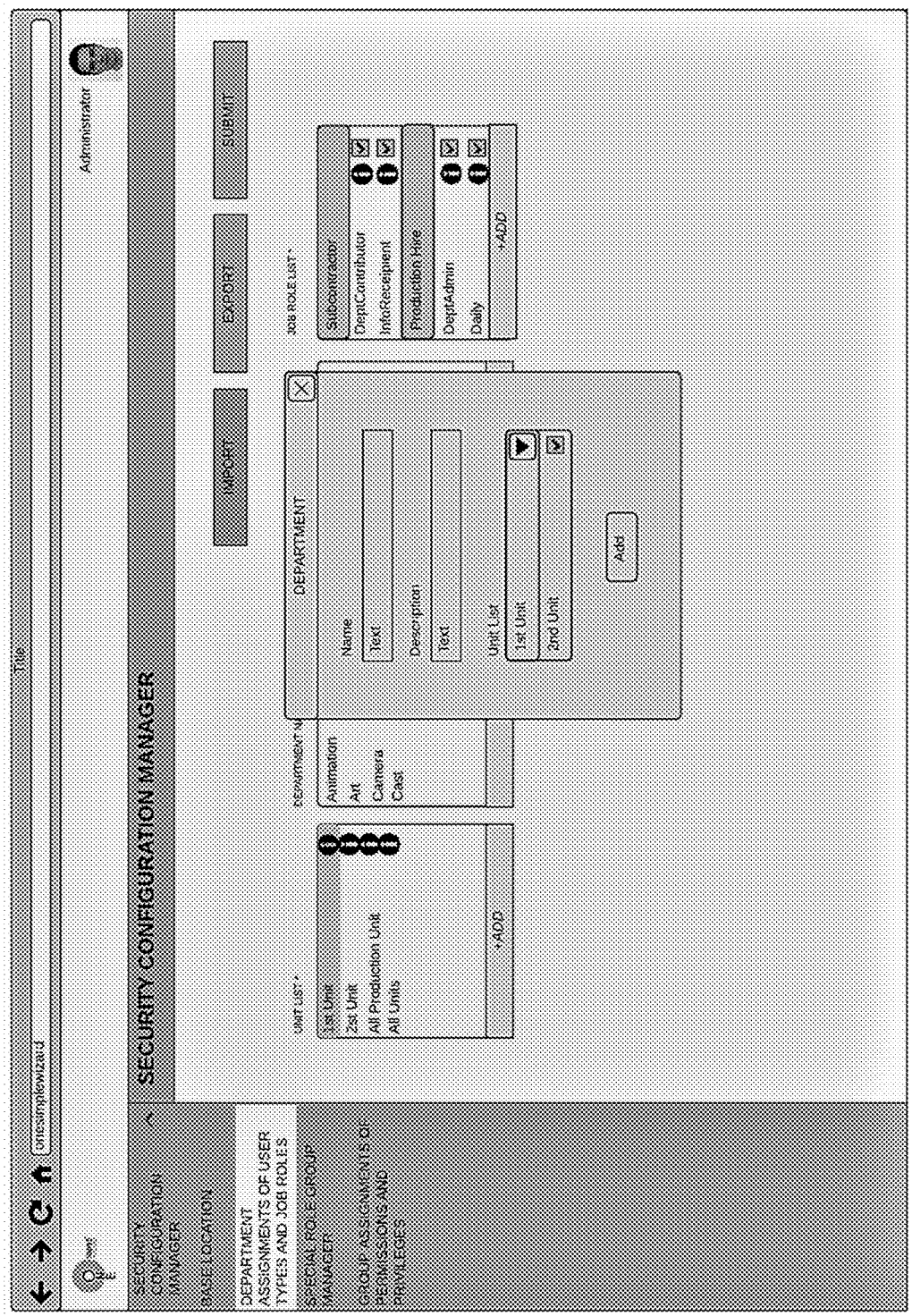
Figure 11F:
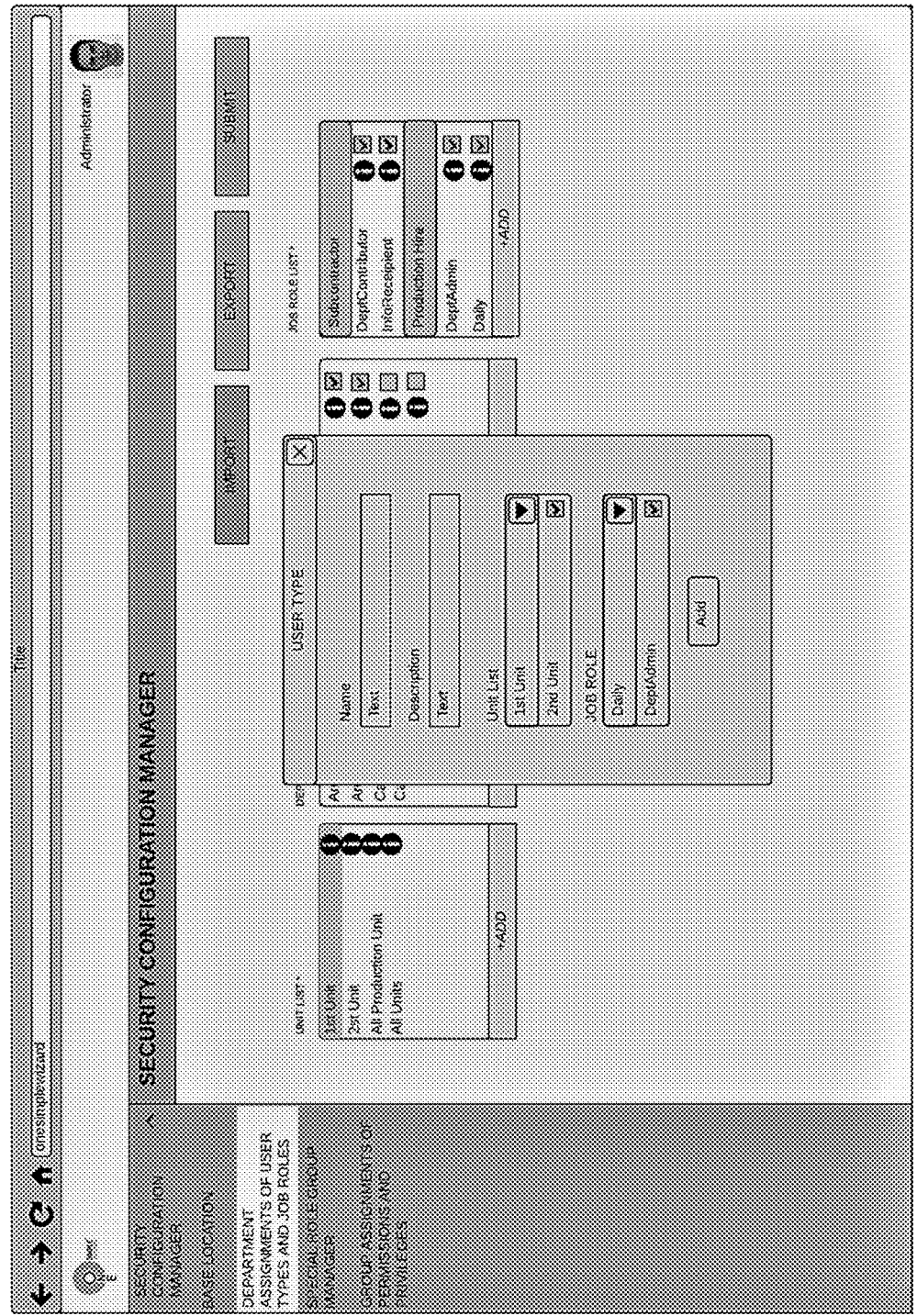
Figure 11G:
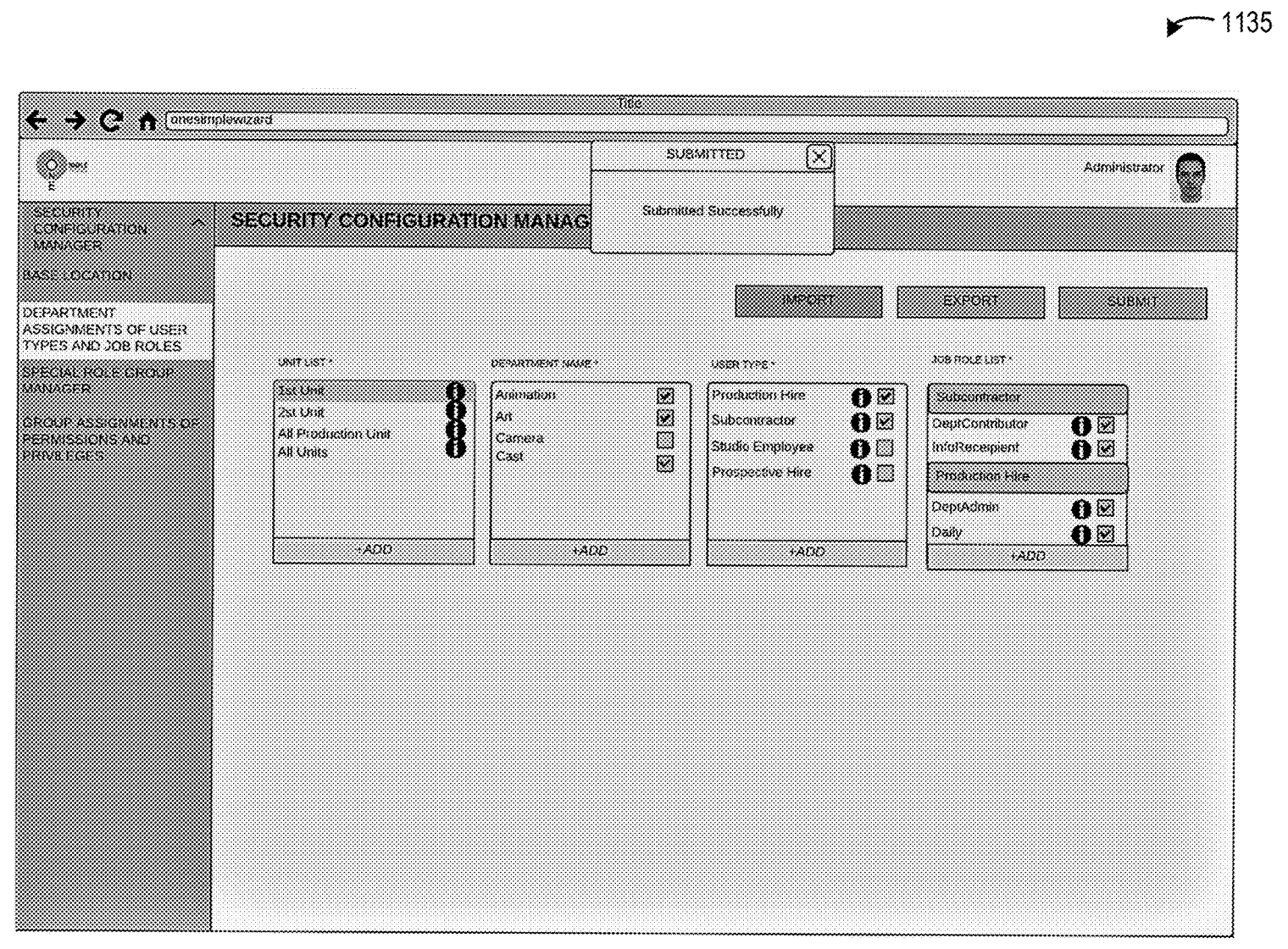
Figure 11H:
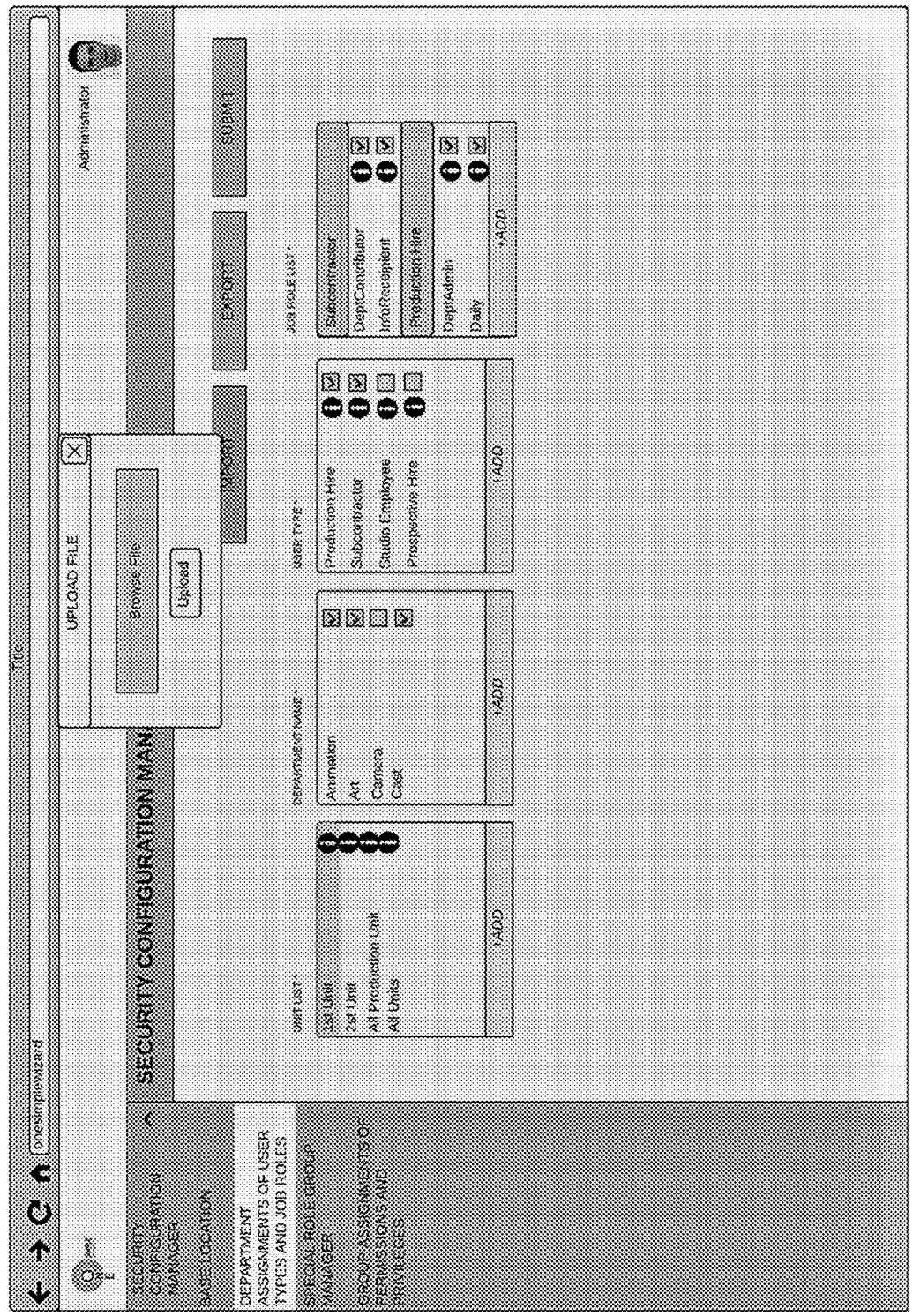

In the example of FIG. 11C, the example GUI 1115 depicts an access permission manager interface. The GUI 1115 allows the access permission manager to specify department assignments of user types and job roles. These interface(s) may be used to define new rules and/or modify existing rules (e.g., access permission manager rules 340). This may allow the access permission manager to define permission at a more granular level than specified in the limited-administration ontology associated with the limited-administration server system.

Figure 11I:
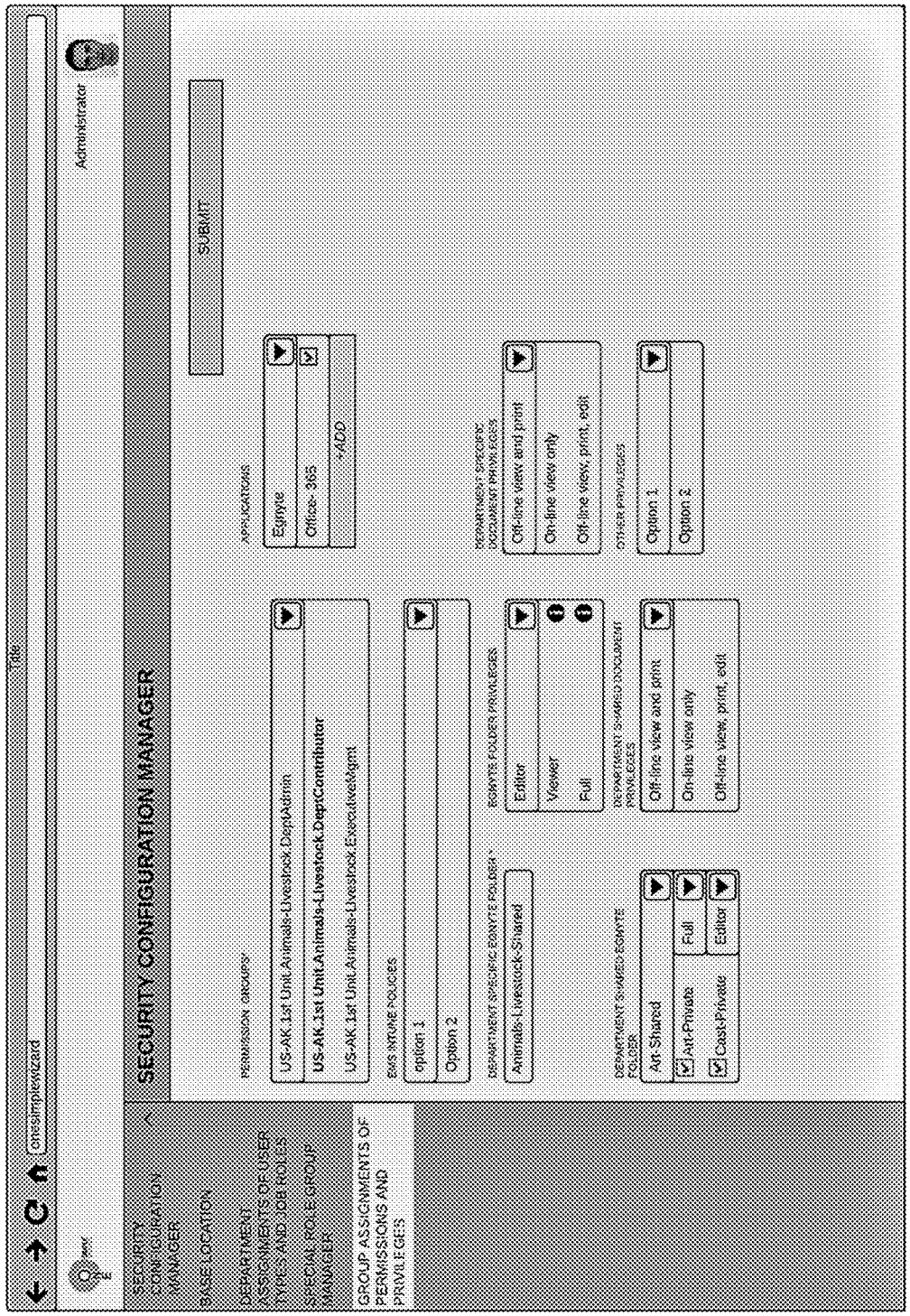
Figure 11J:
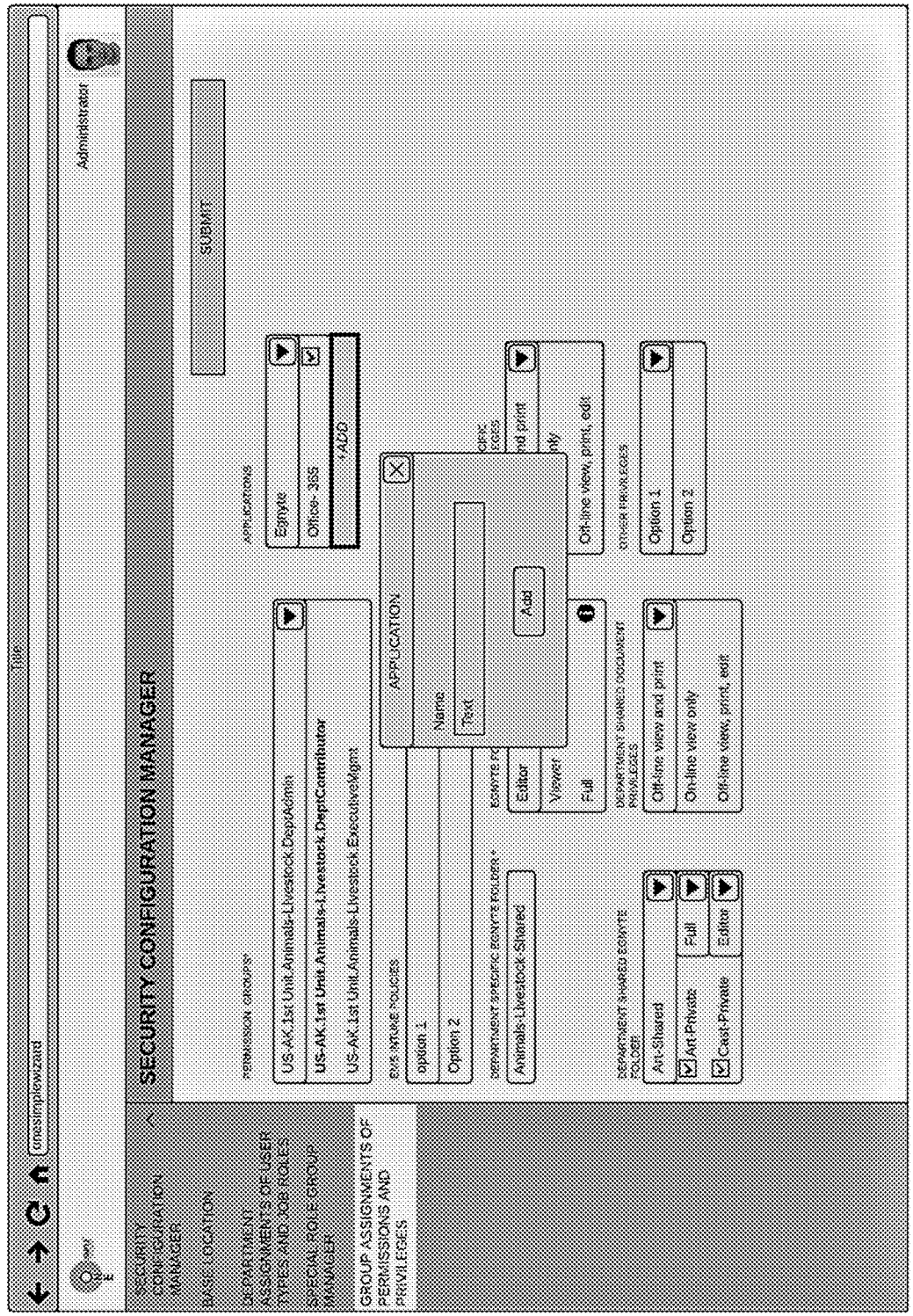
Figure 11K:
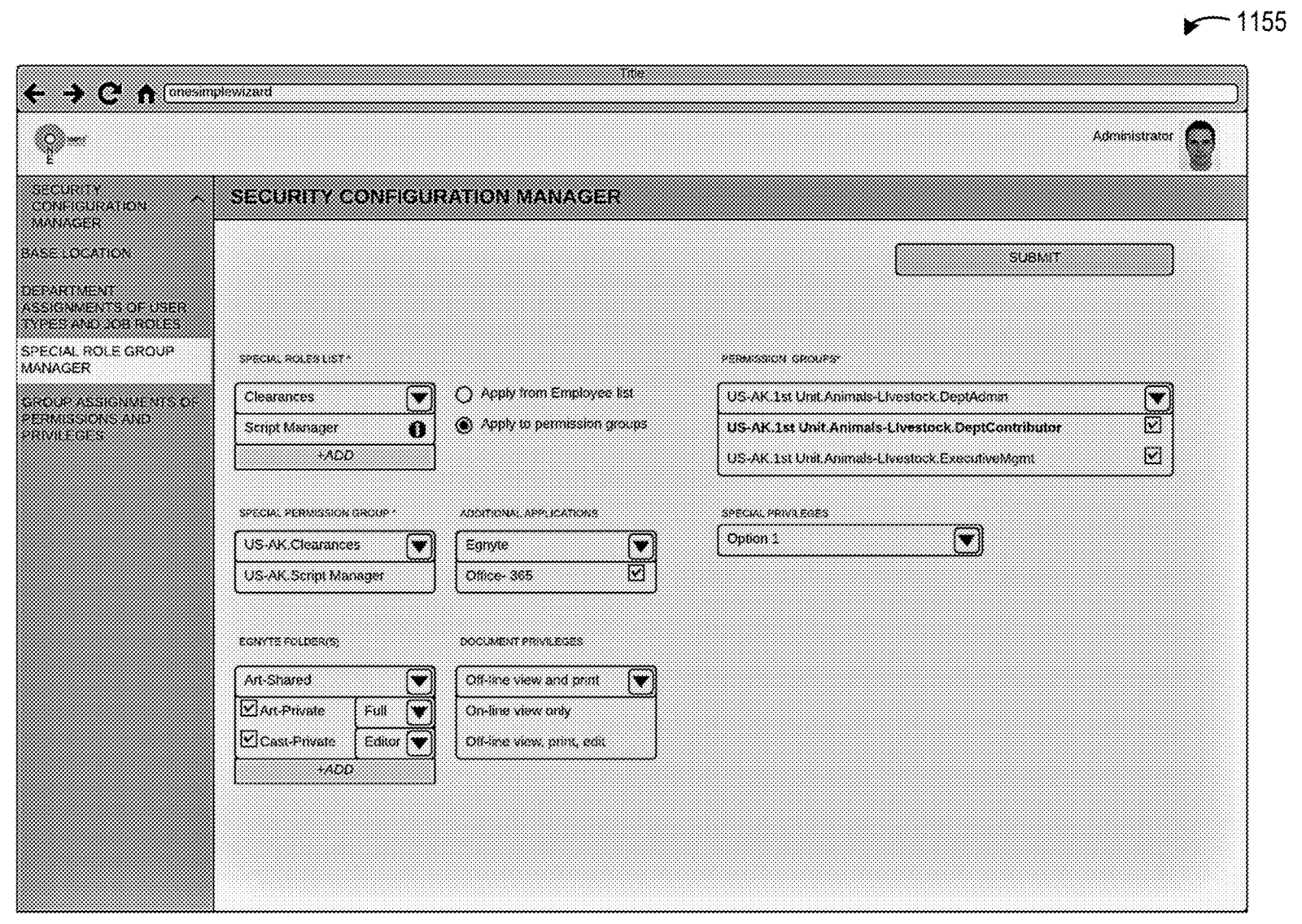
Figure 11L:
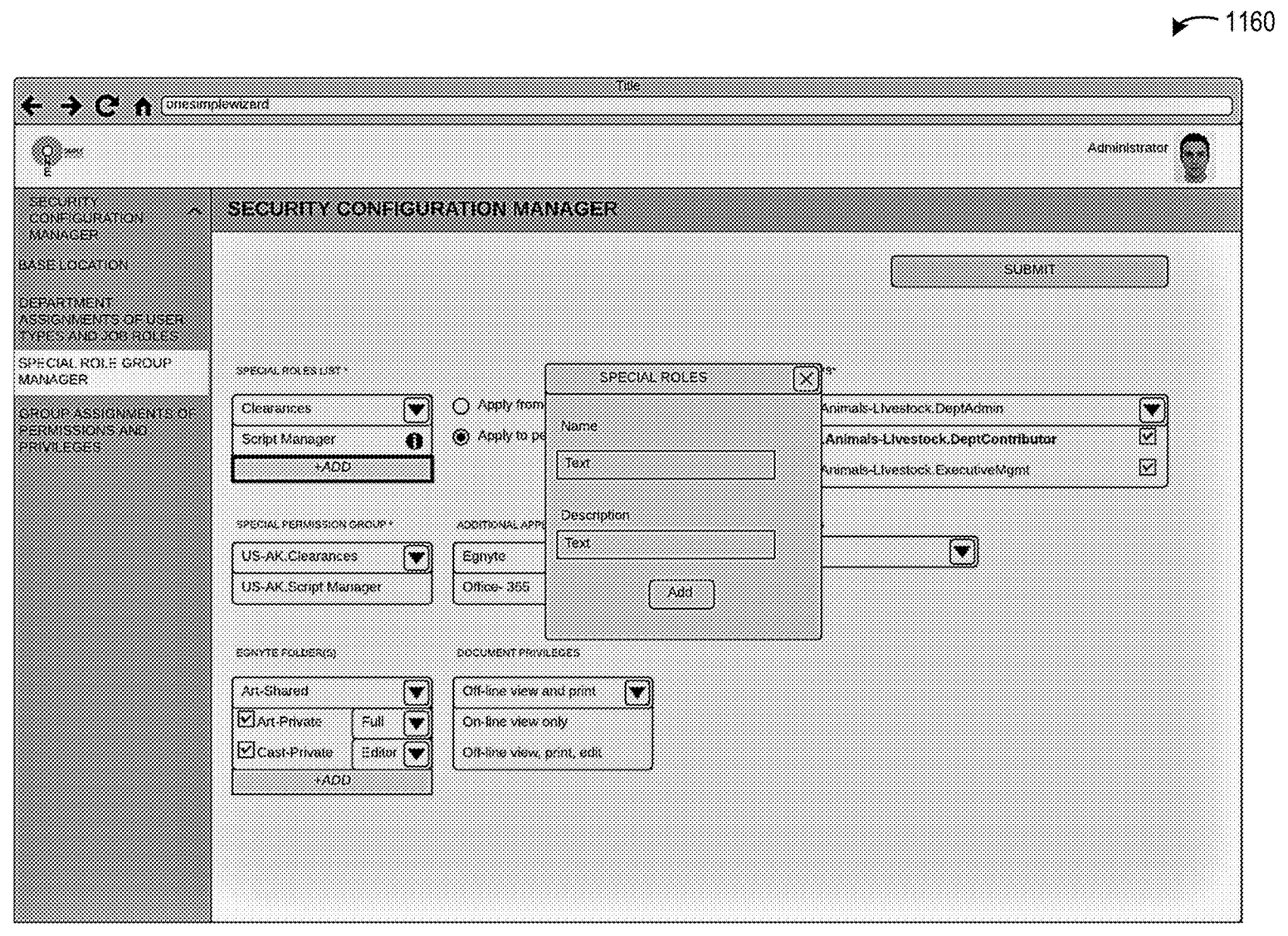
Figure 11M:
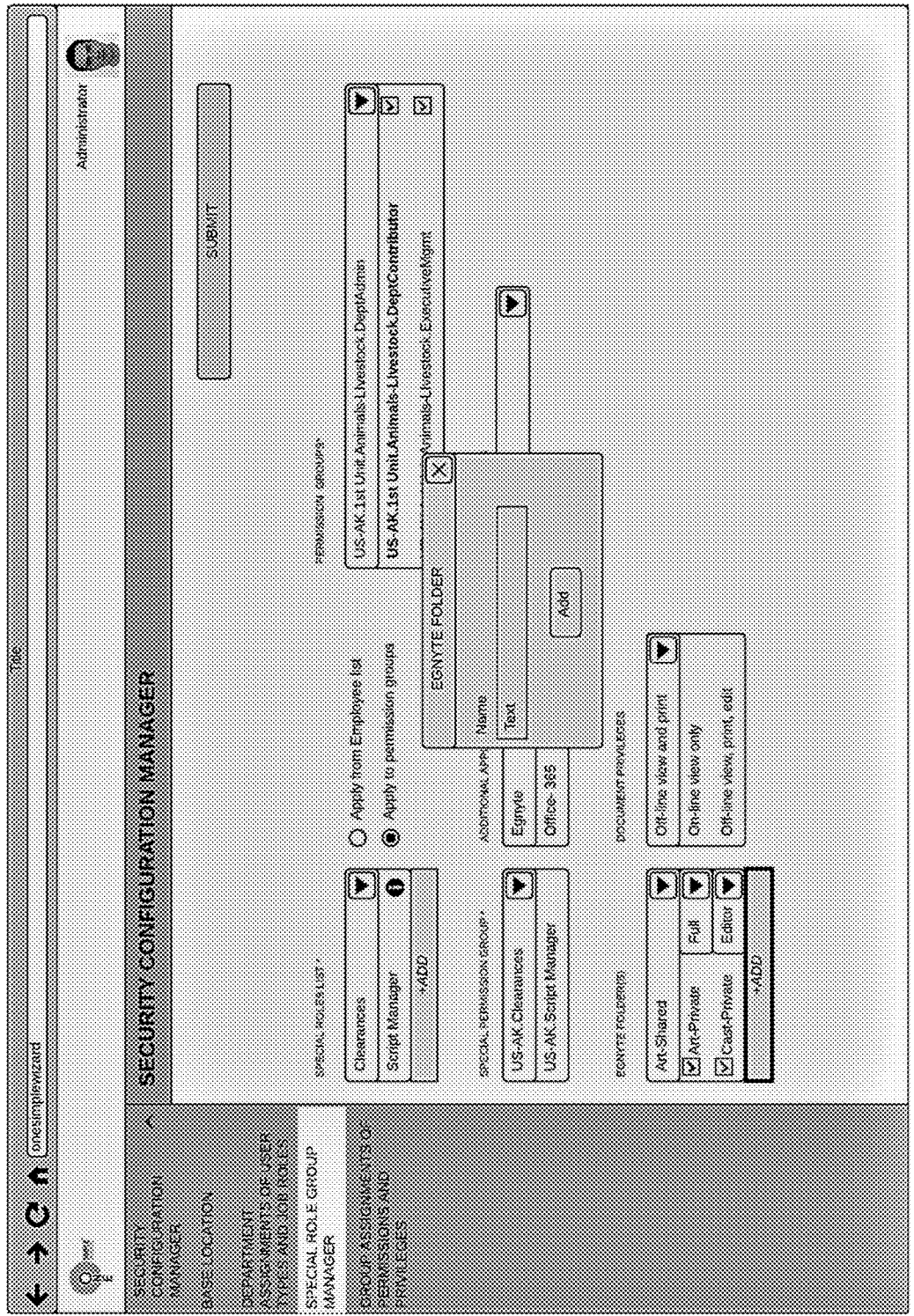
Figure 11N:
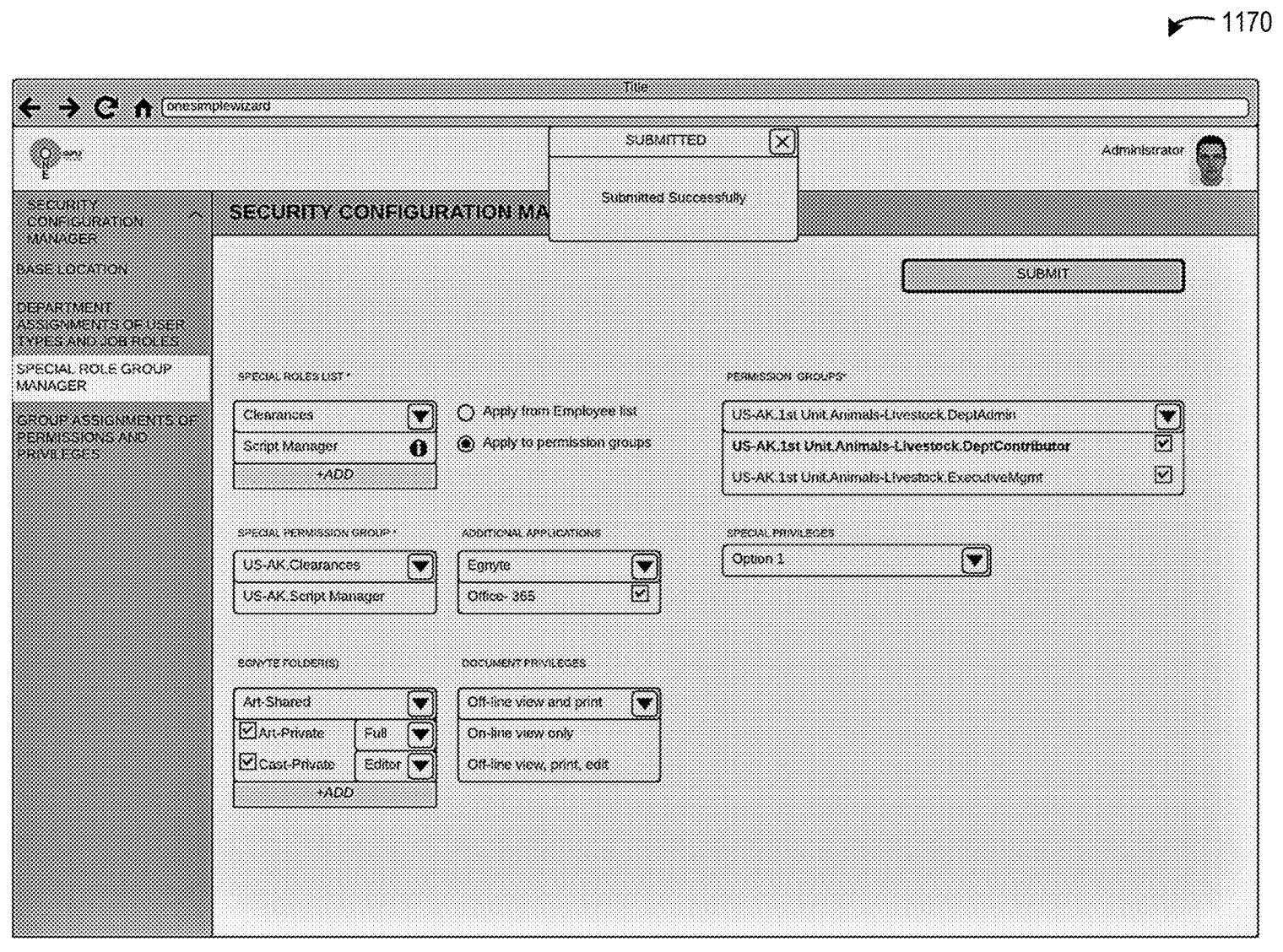

In the examples of FIGS. 11D-11H, the example GUIs 1120-1140 depict additional access permission manager interfaces associated with specifying department assignments of user types and job roles. In the examples of FIGS. 11I-11J, the example GUIs 1145-1150 depict access permission manager interfaces for group assignments of permissions and privileges. In the examples of FIGS. 11K-11N, the example GUIs 1155-1170 depict access permission manager interfaces for special roles.

Figure 12A:
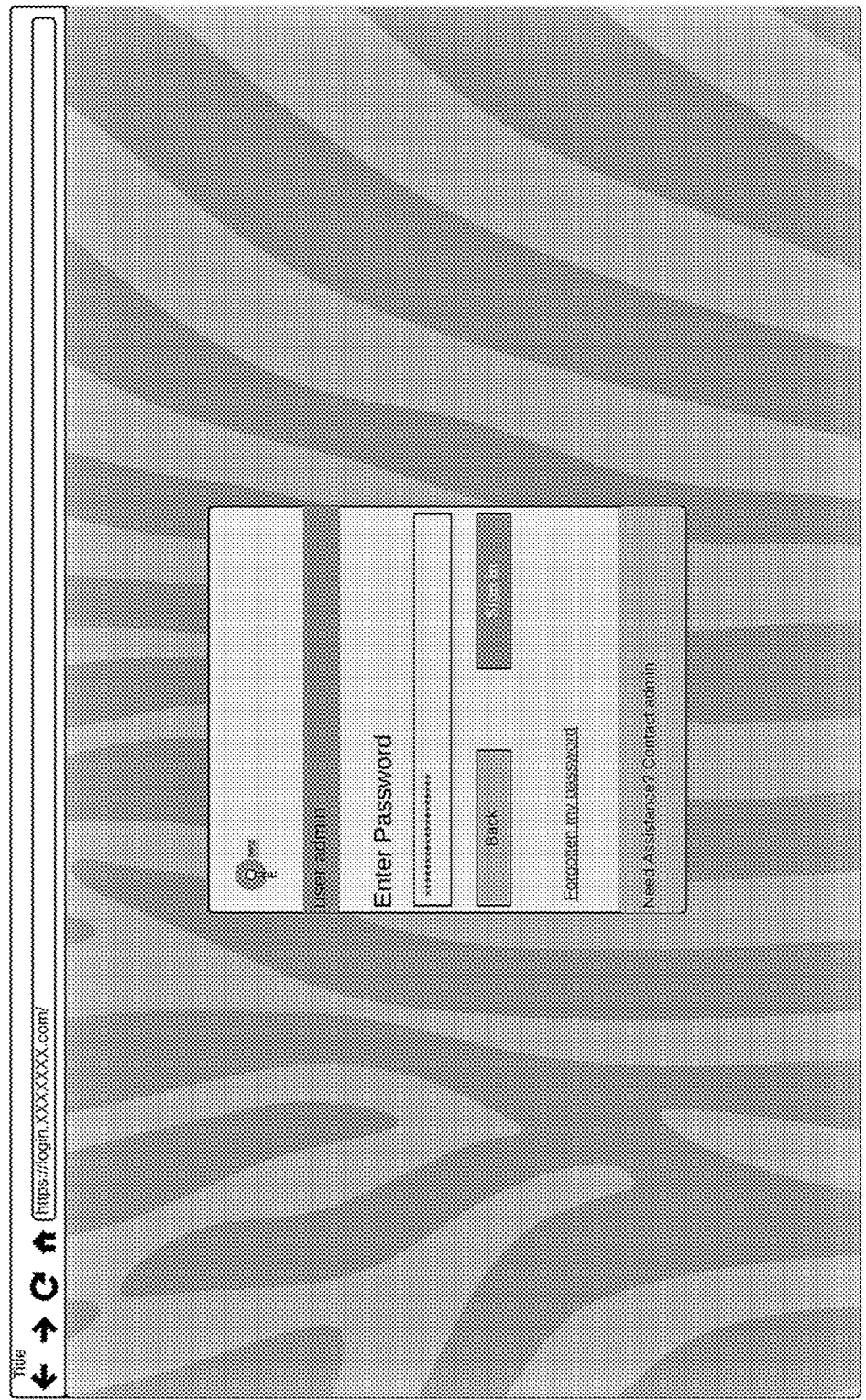
Figure 12B:
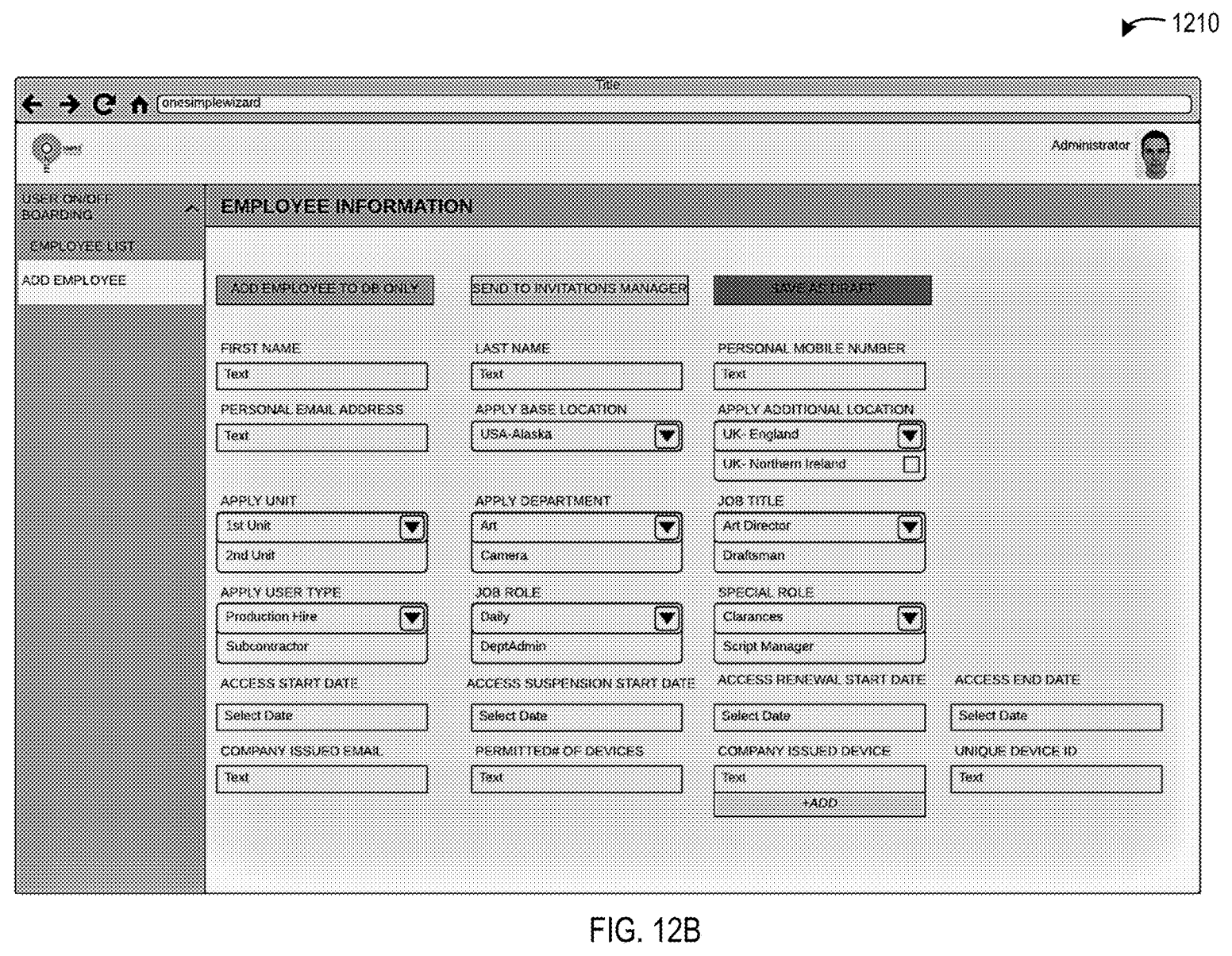
Figure 12C:
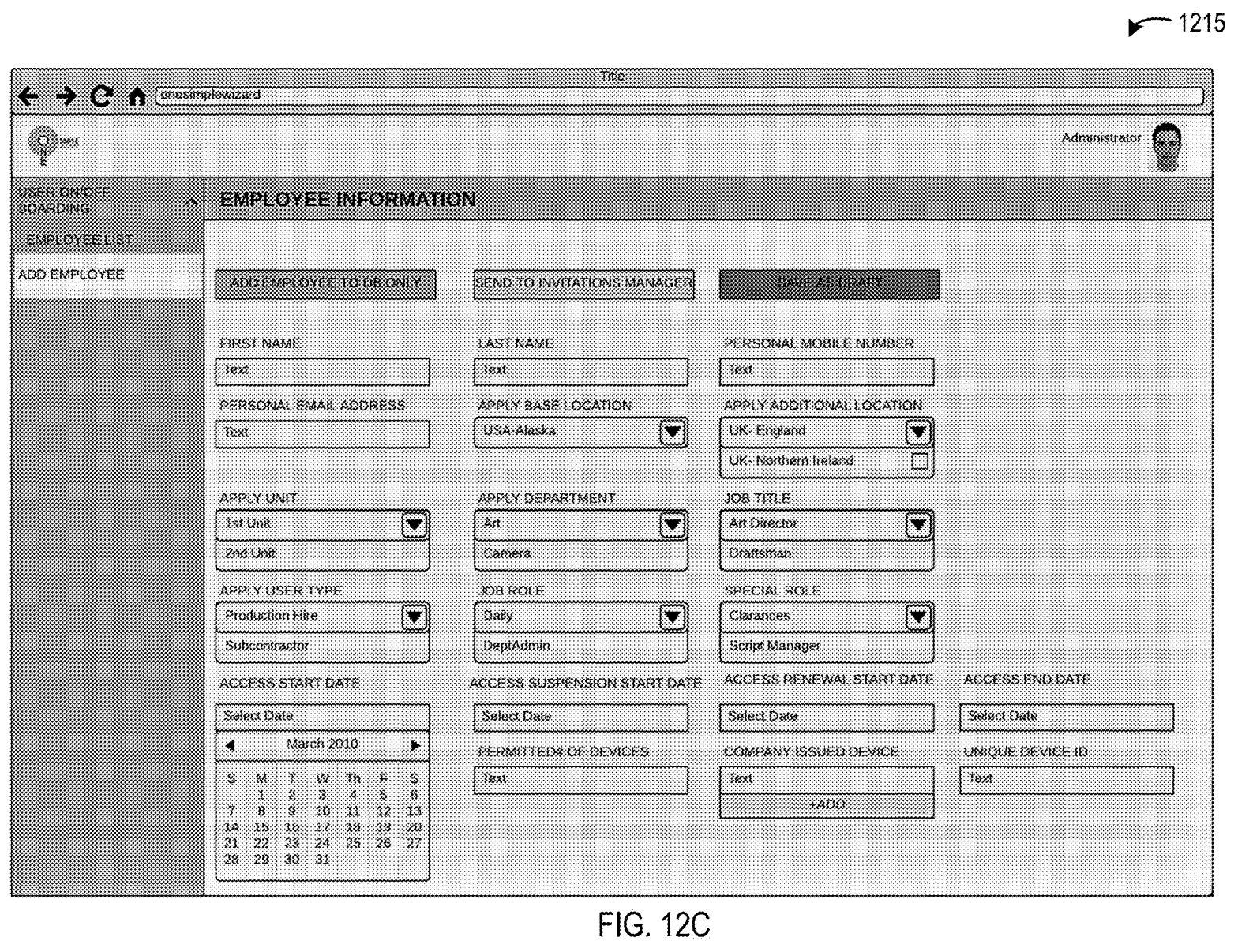
Figure 12D:
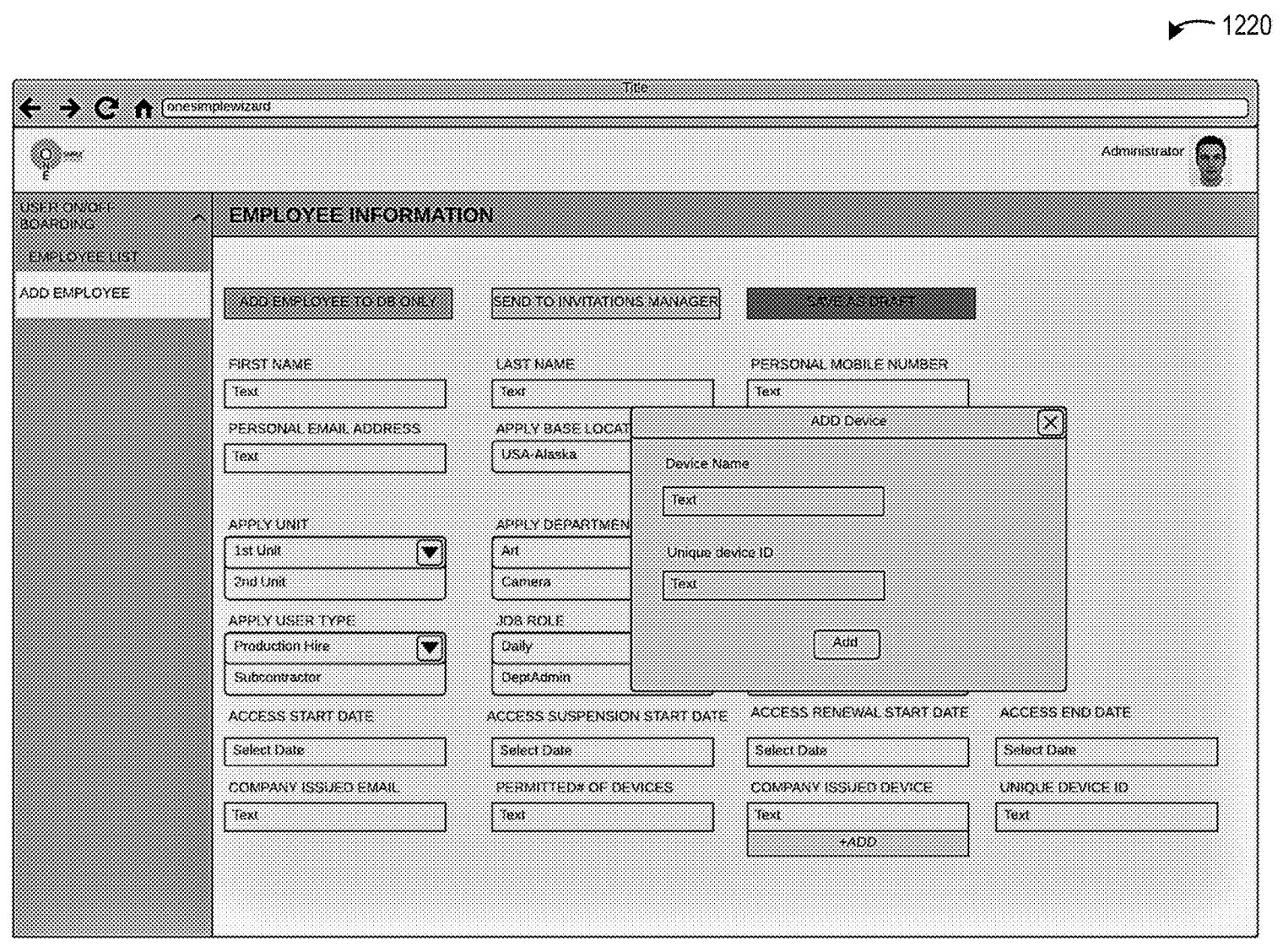
Figure 12E:
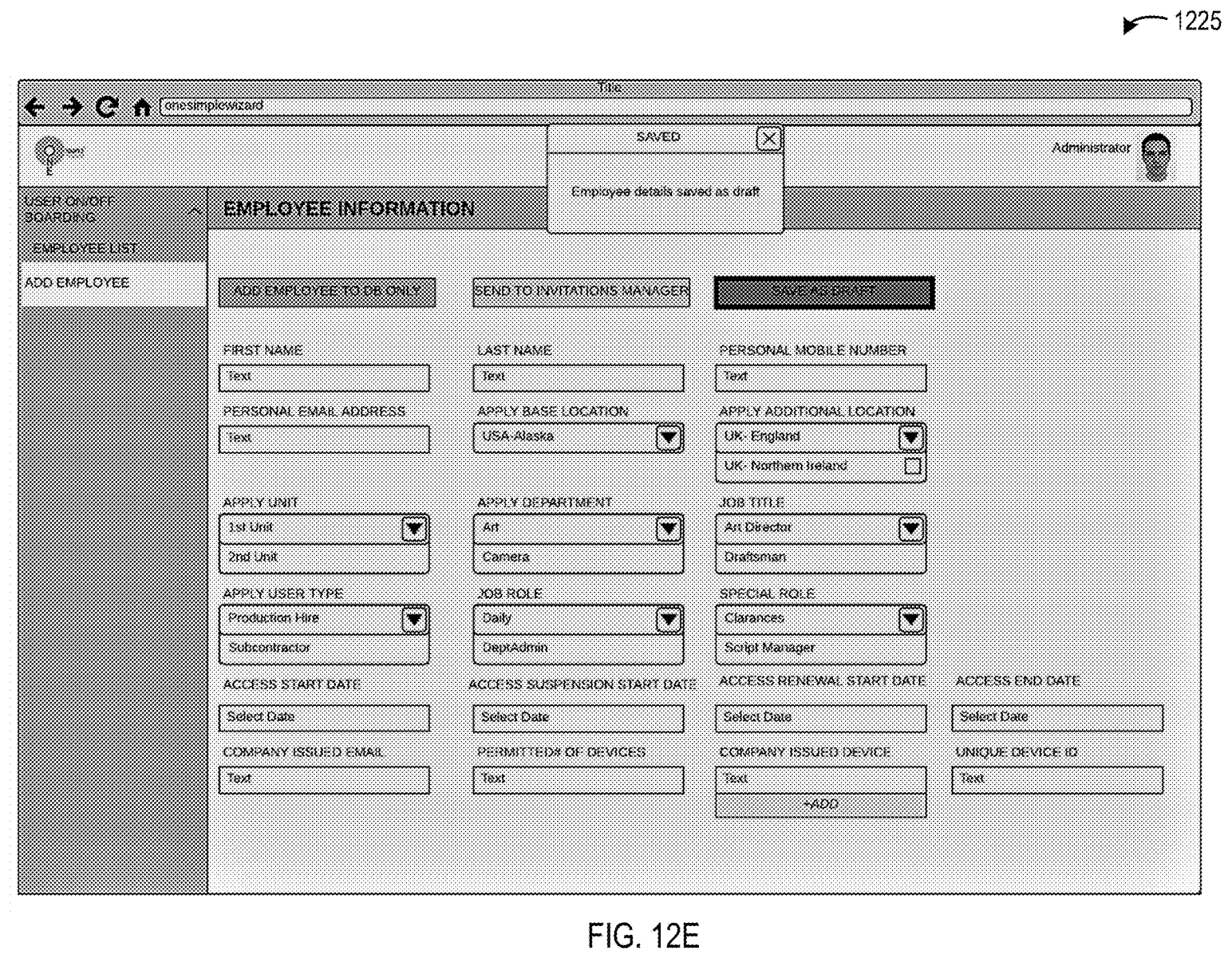
Figure 12F:
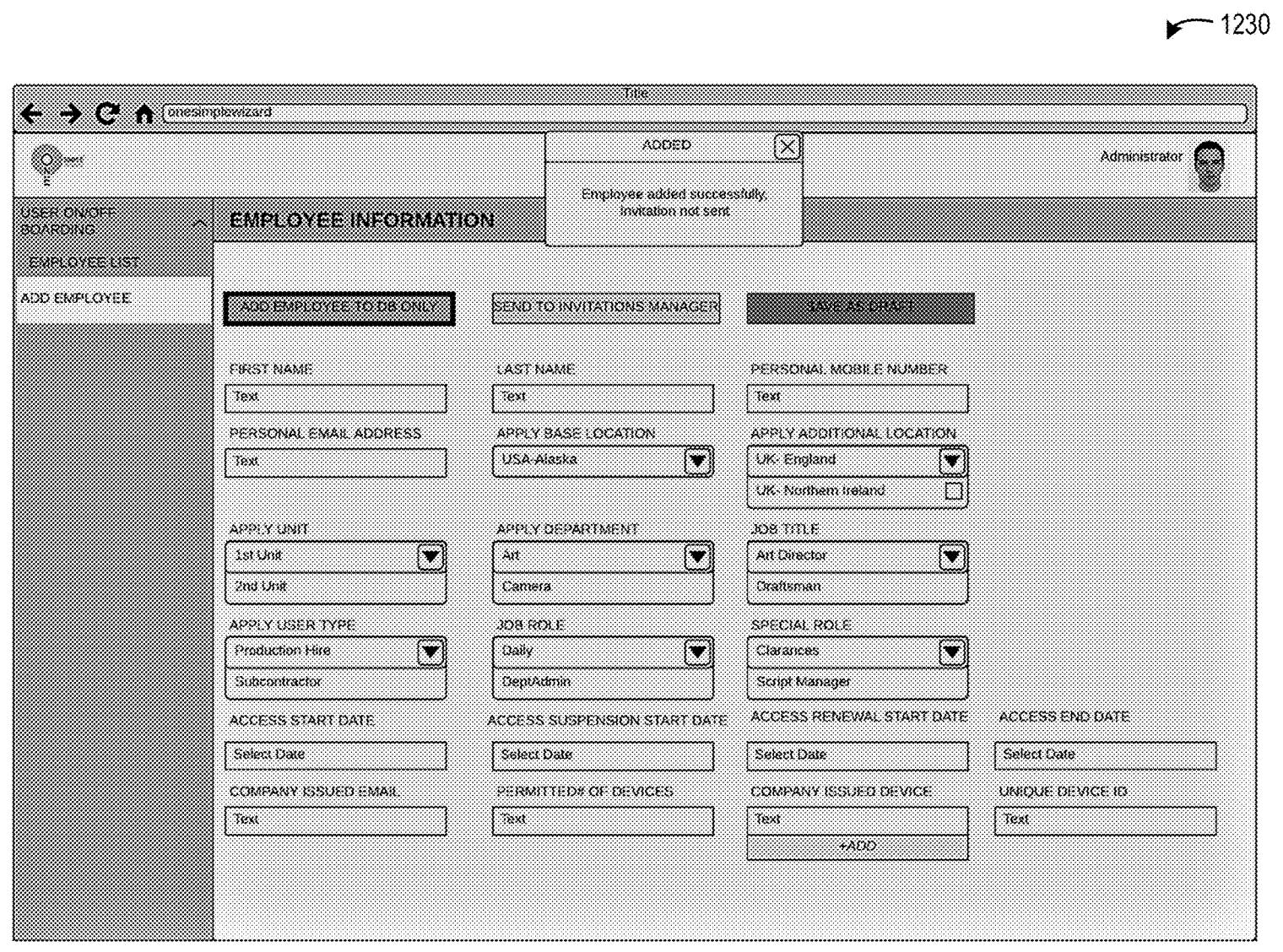
Figure 12G:
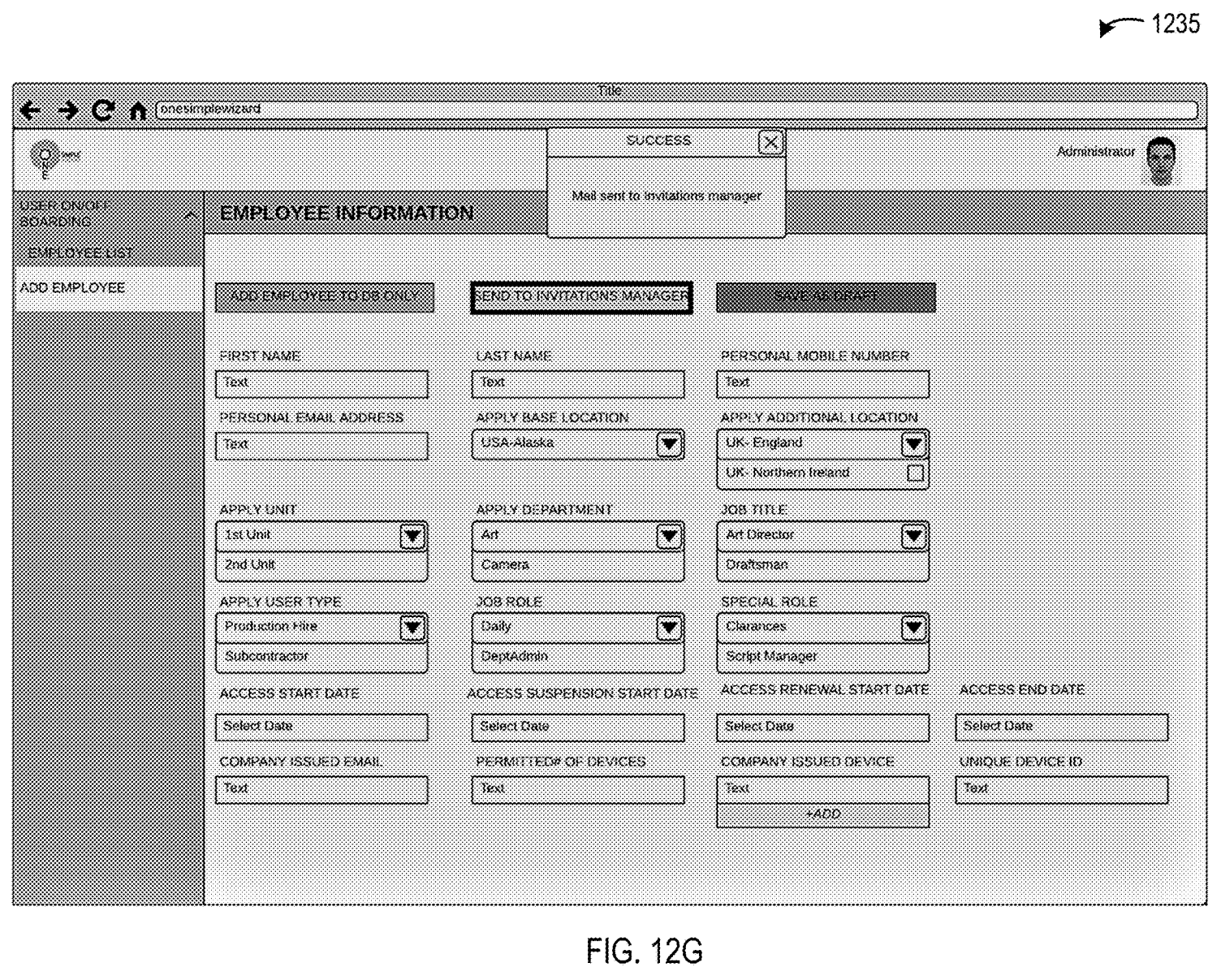
Figure 12H:
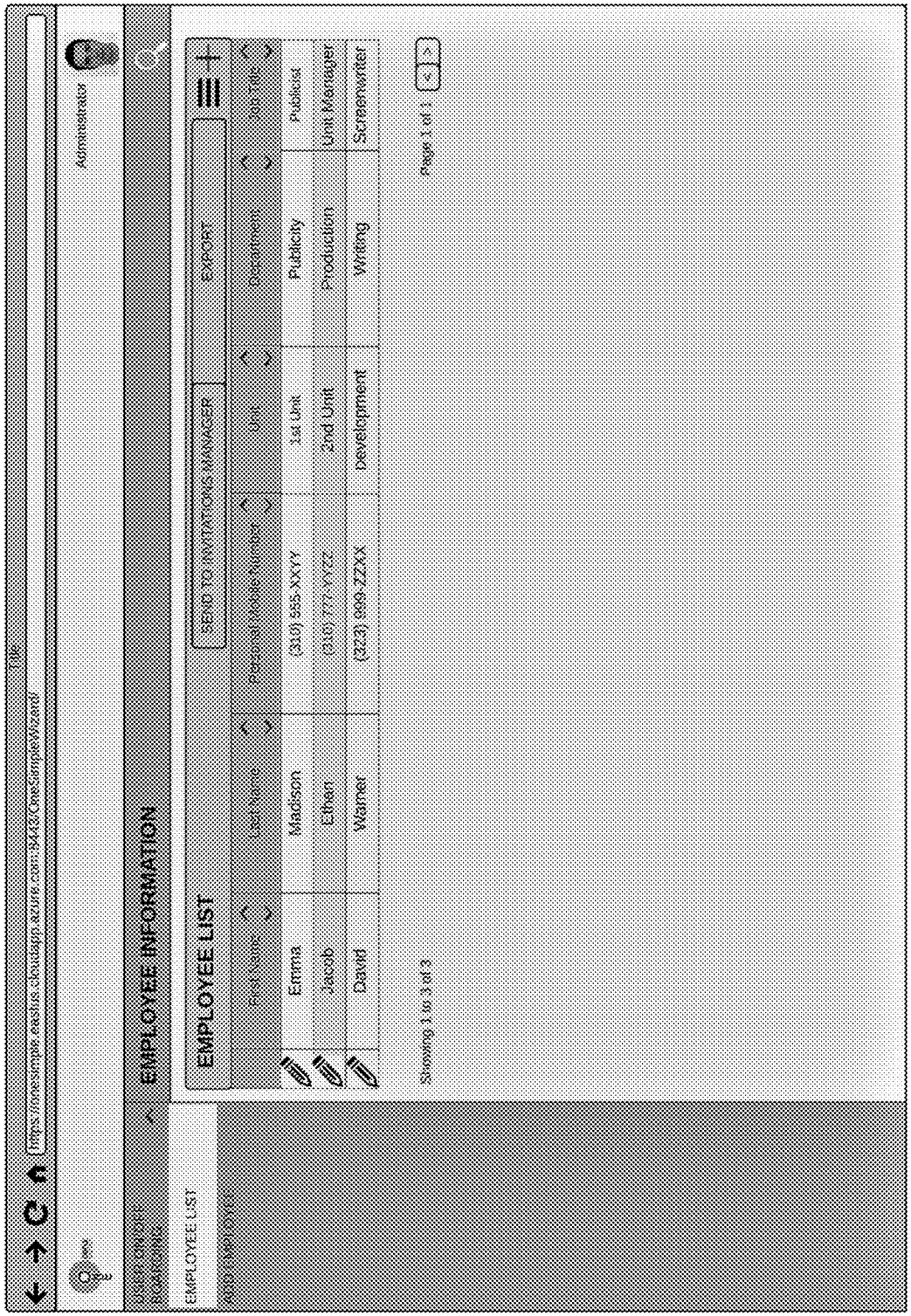
Figure 12I:
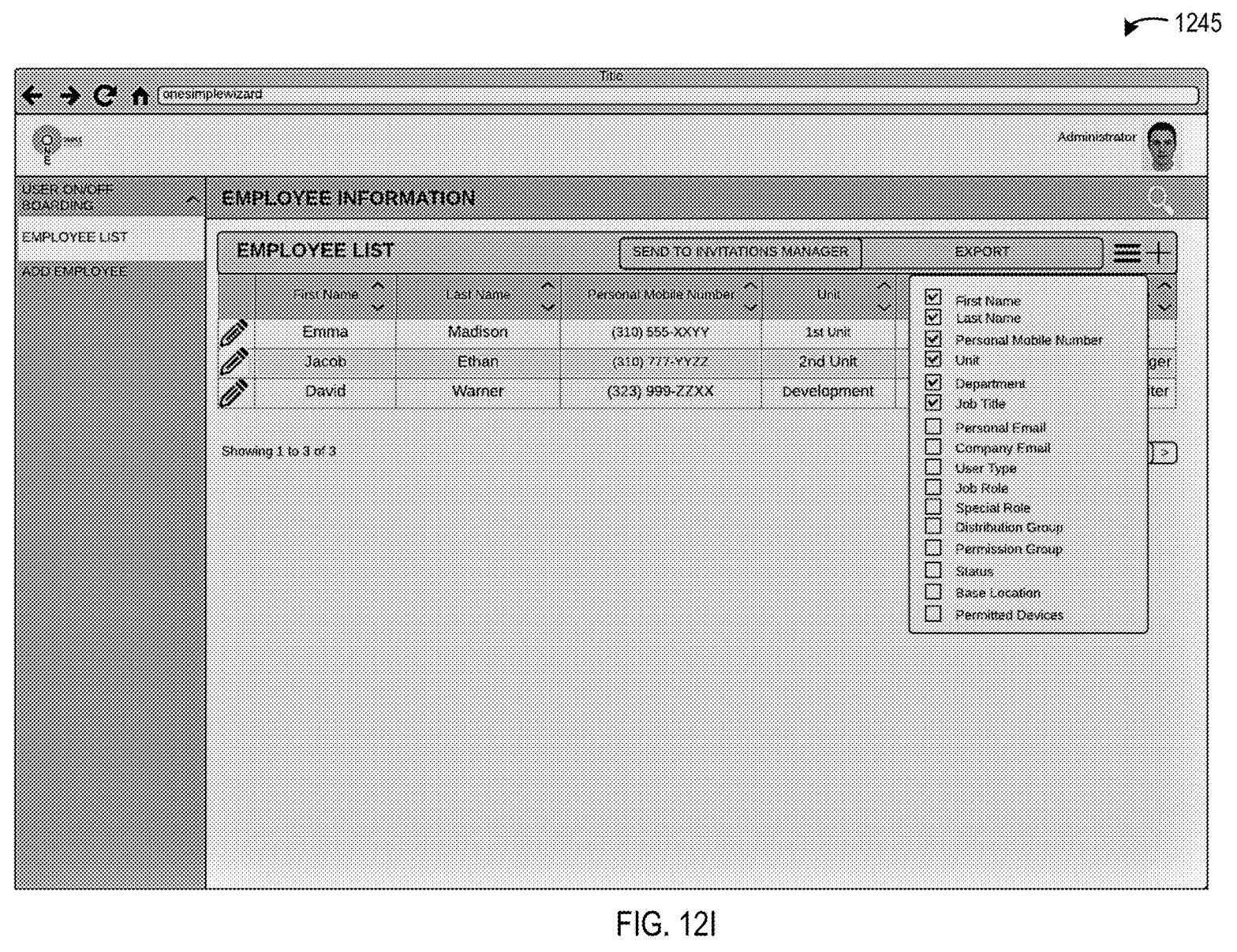
Figure 12J:
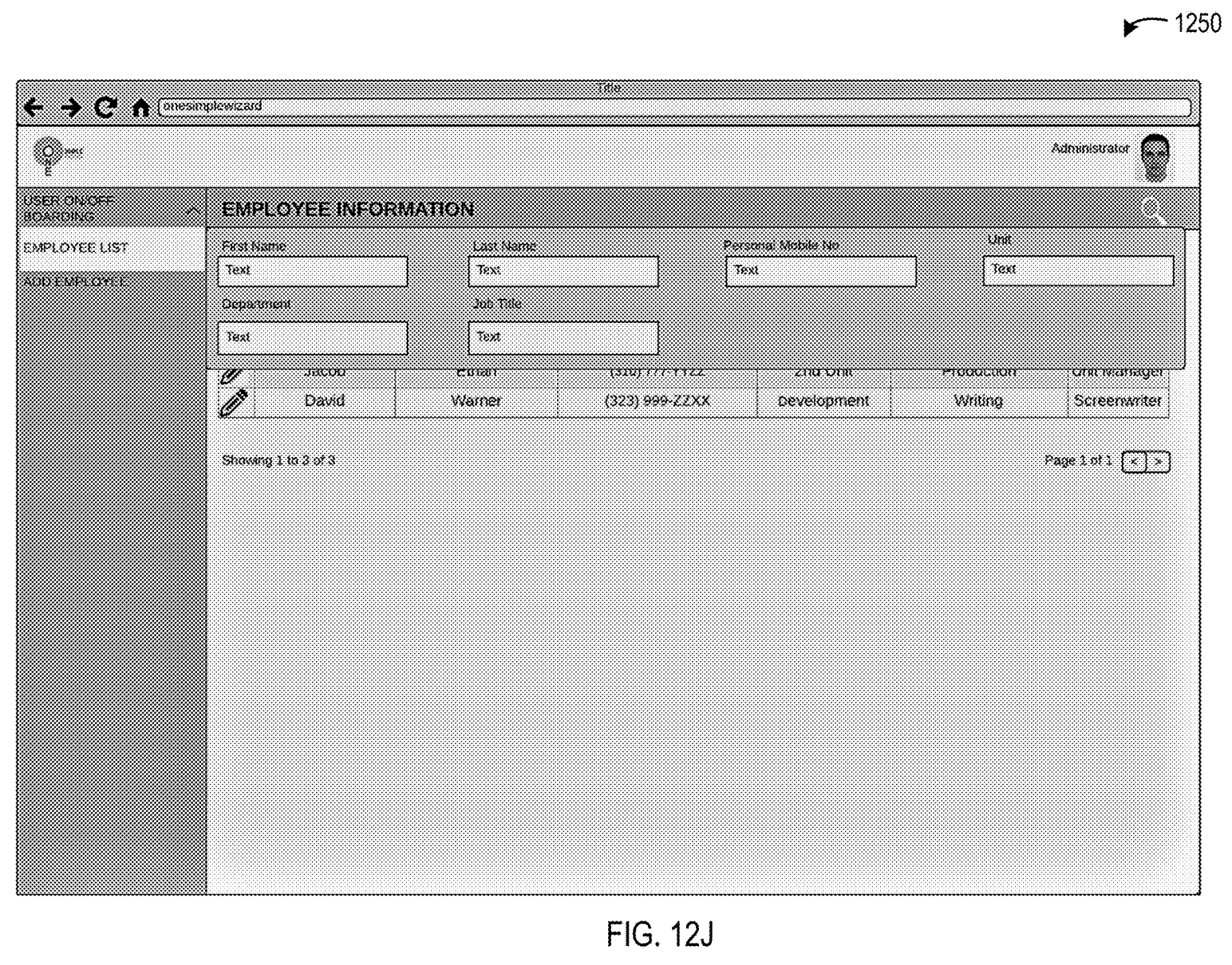

FIGS. 12A-12J depict screenshots of example user manager interfaces 1205-1250 of an example limited-administration server system according to some embodiments. Interface 1204 shows a sign-in page in which a user manager can log in to the user manager portal. FIGS. 12A-12G show interfaces in which a user manager may add an employee. For example, the user manager may provide names, phone numbers, email addresses, job title, job roles, user types, and/or the like. Input may be provided in text boxes, dropdown menus, and/or the like. FIGS. 12H-12J show an example employee list. The employee list may include employee name, employee phone number, and/or the like.

FIGS. 13A-13C depict screenshots of example invitation manager interfaces 1305-1320 of an example limited-administration server system according to some embodiments. FIG. 13A shows a sign-on page in which an invitation manager may sign-on to an invitation manager portal. FIGS. 13B-13C show an interface allowing the invitation manager to select users to receive an invitation, and then send the invitations to the selected users.

Figure 14A:
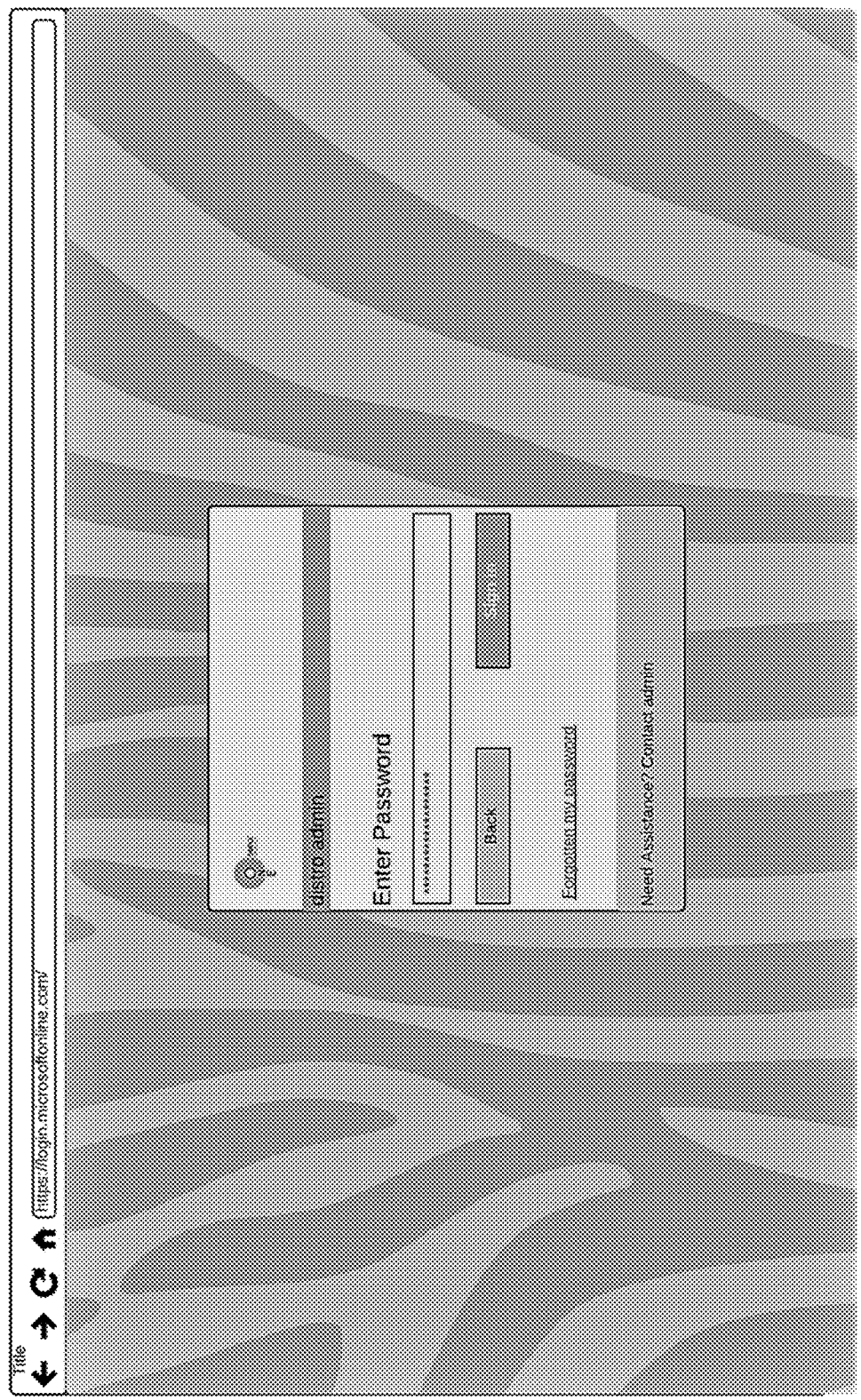
Figure 14B:
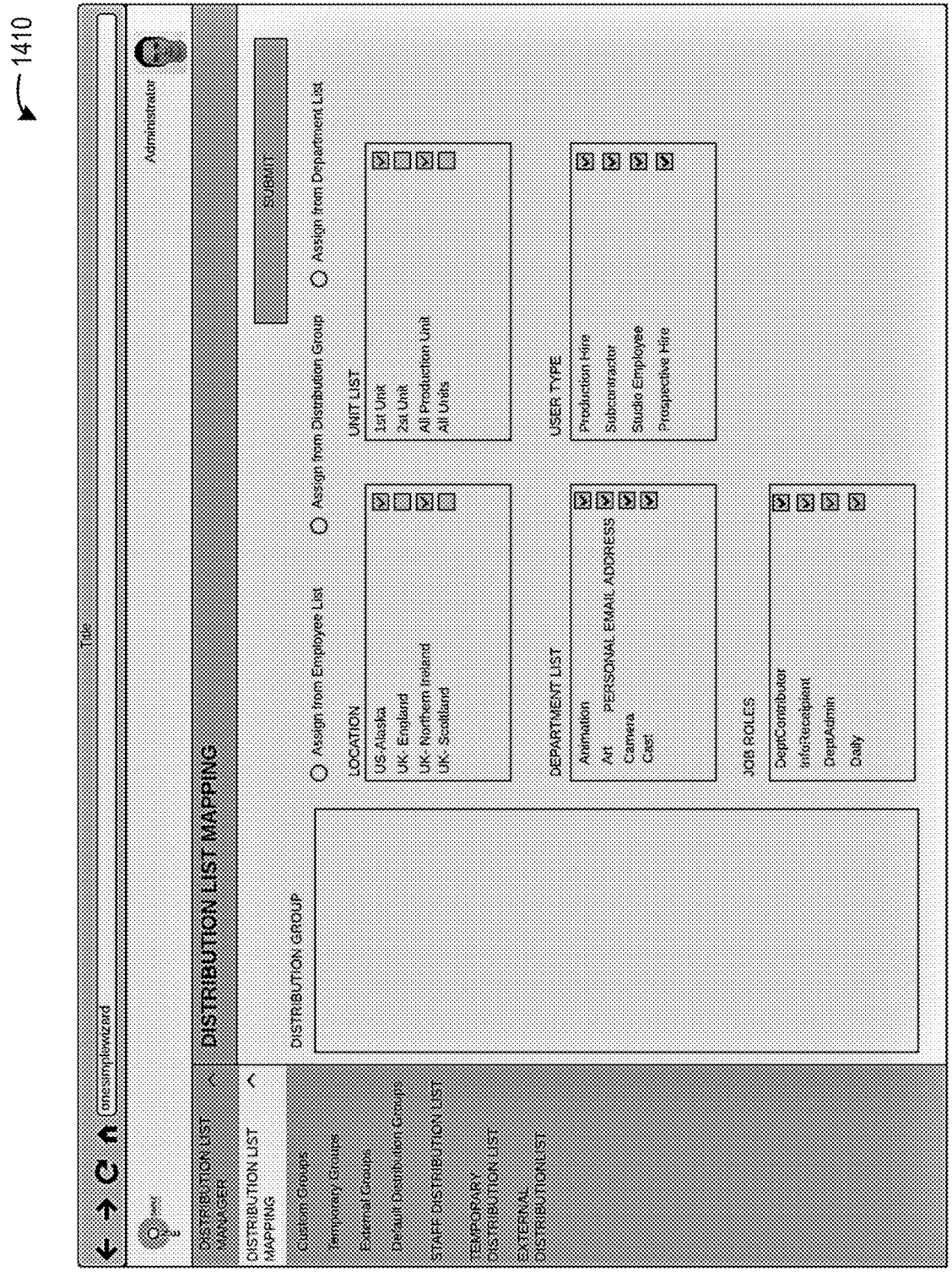
Figure 14C:
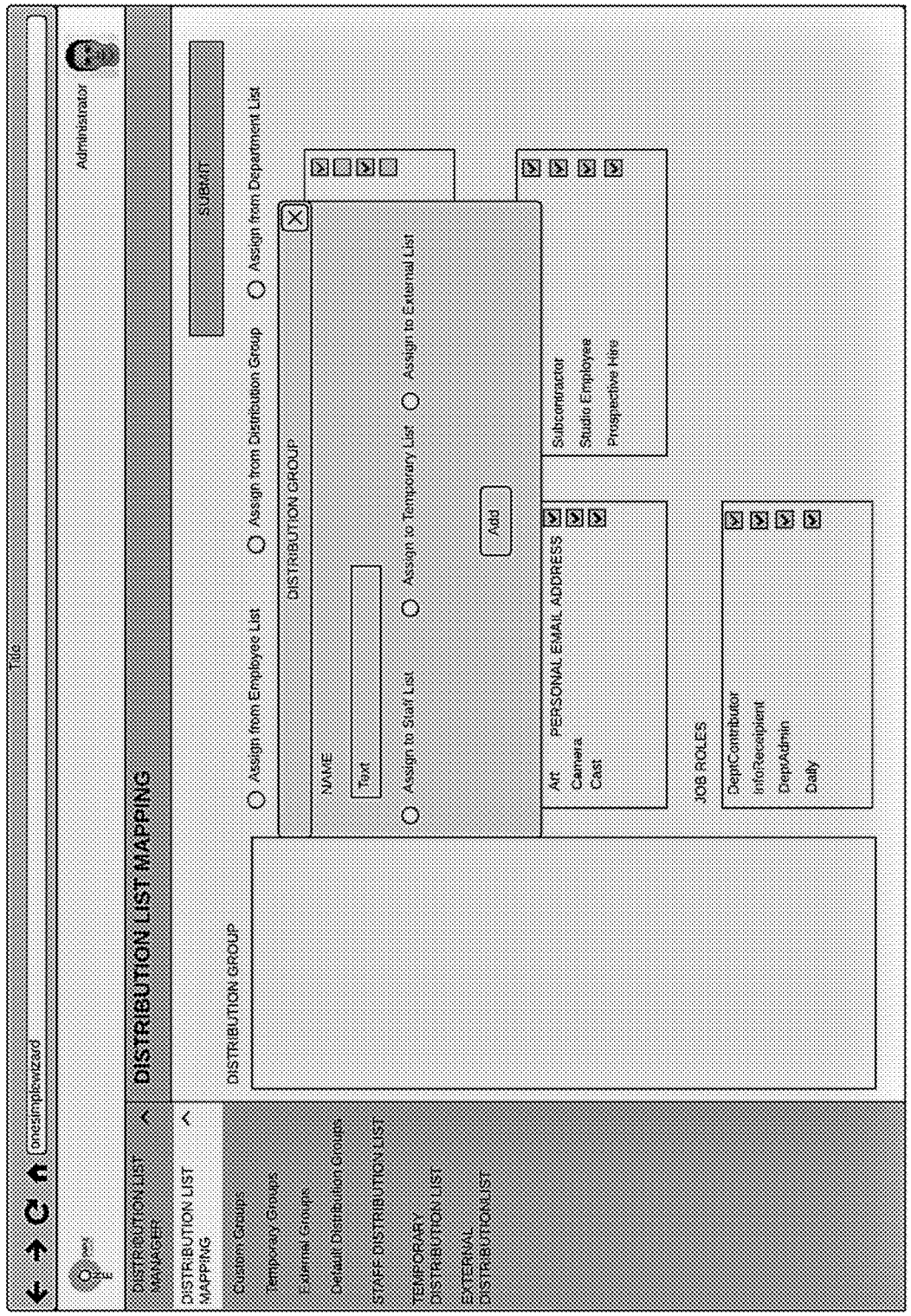
Figure 14D:
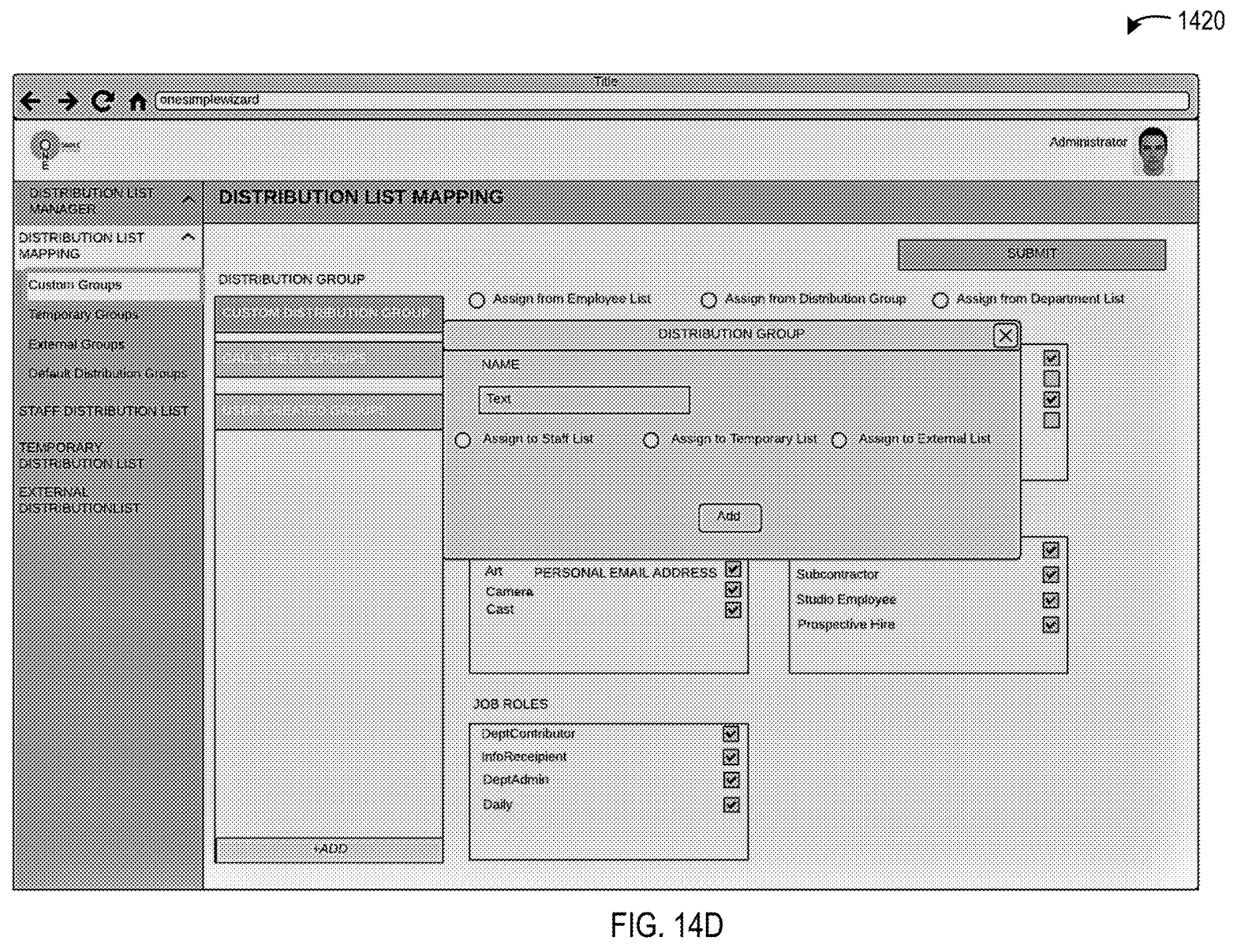
Figure 14E:
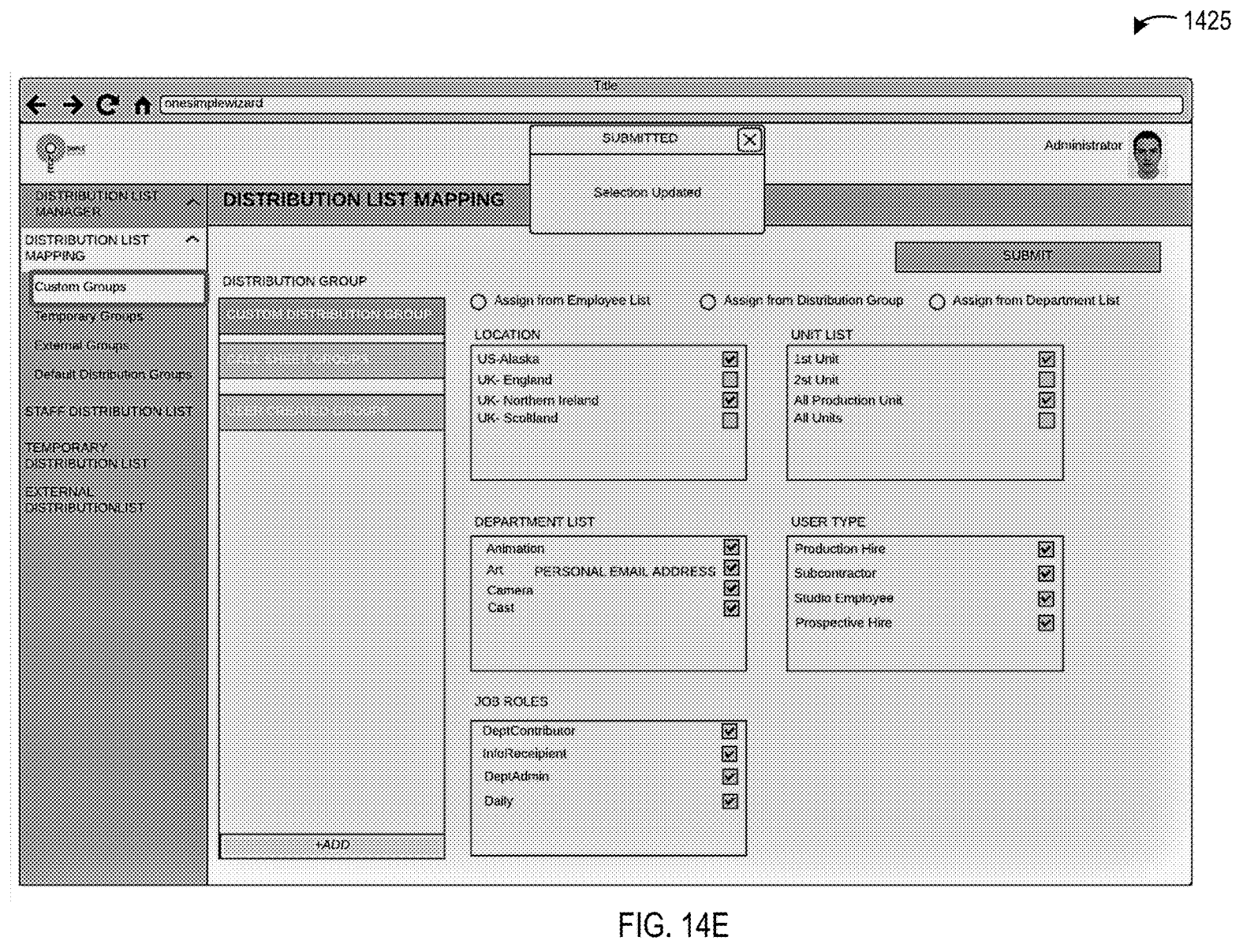
Figure 14F:
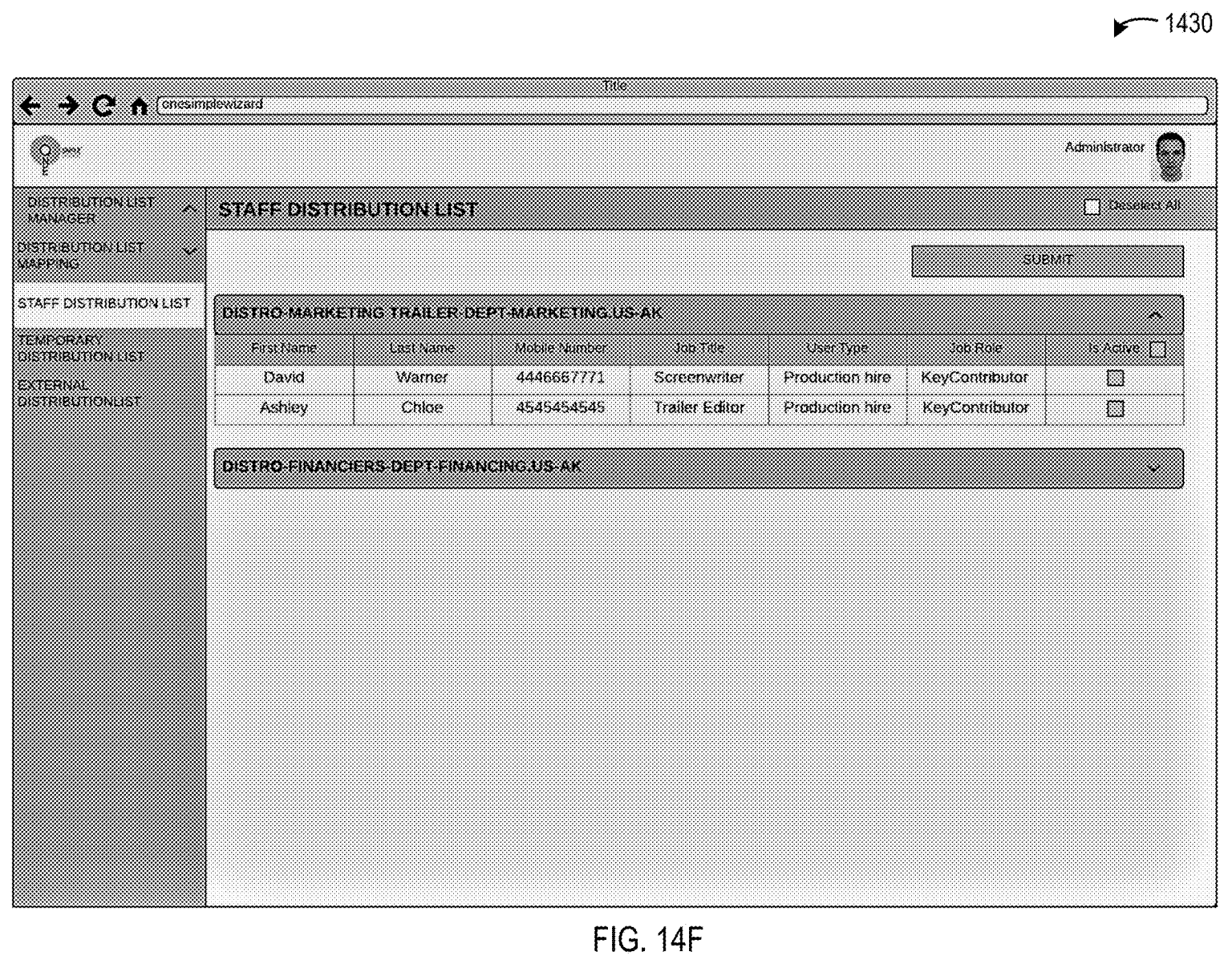
Figure 14G:
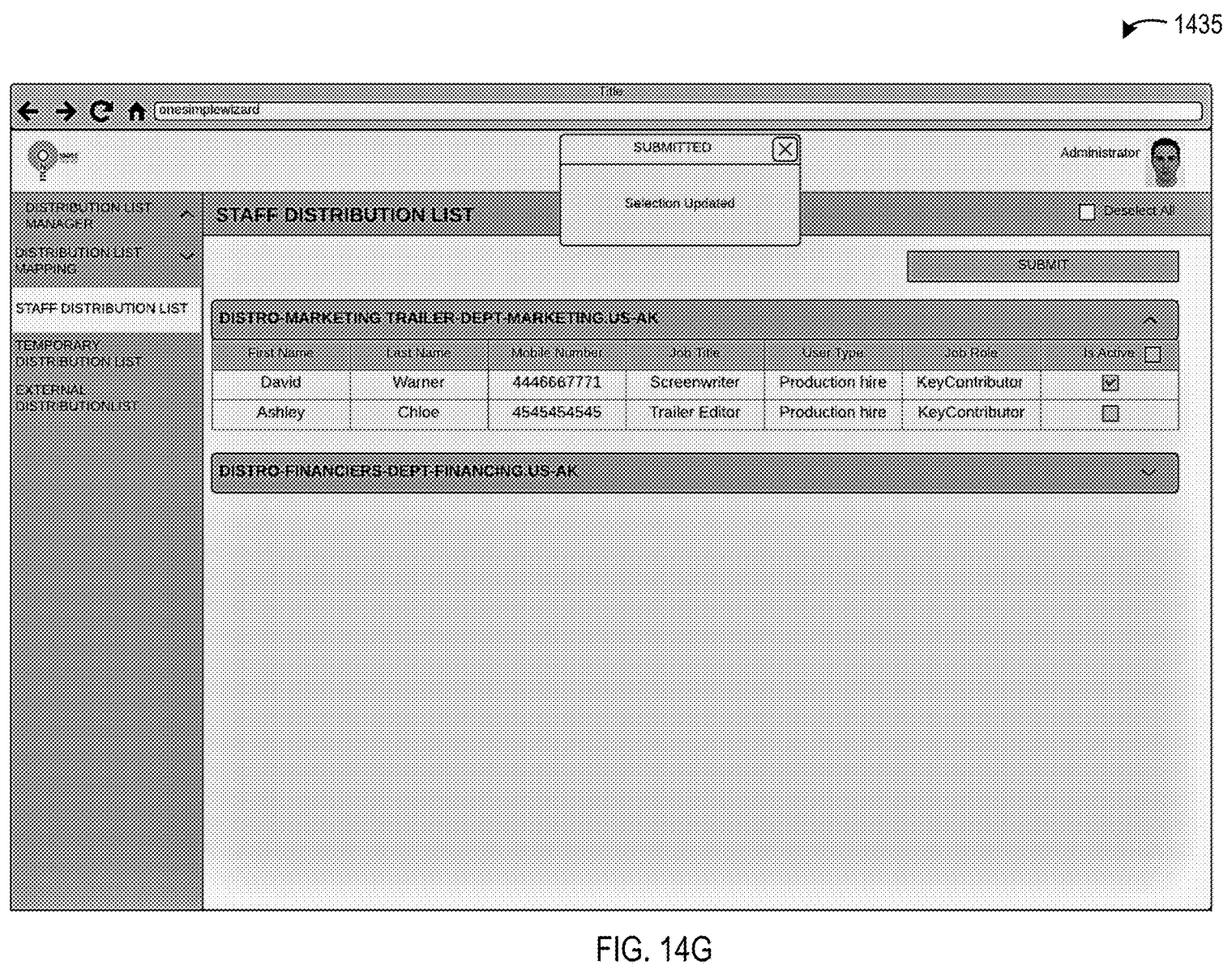
Figure 14H:
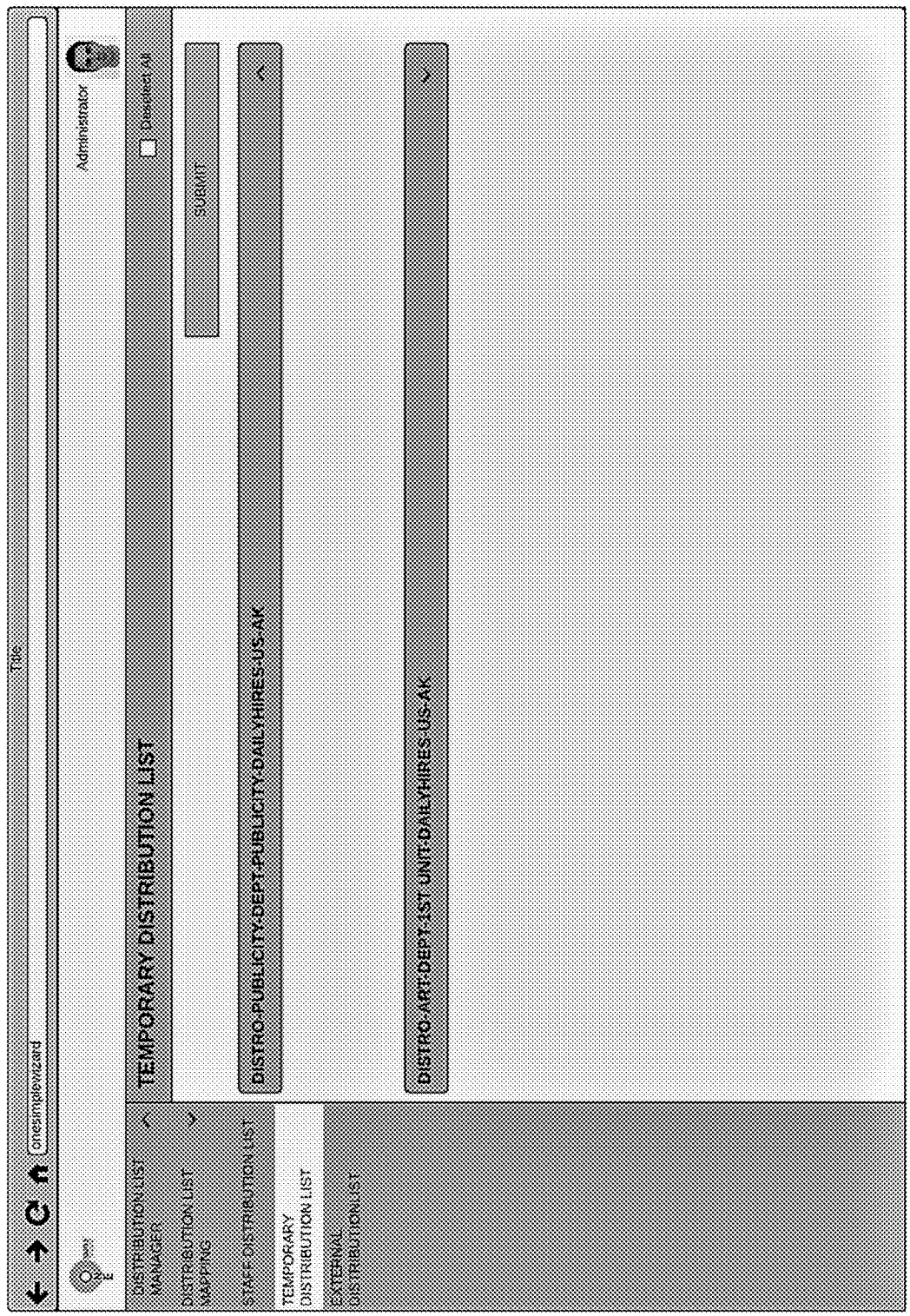
Figure 14I:
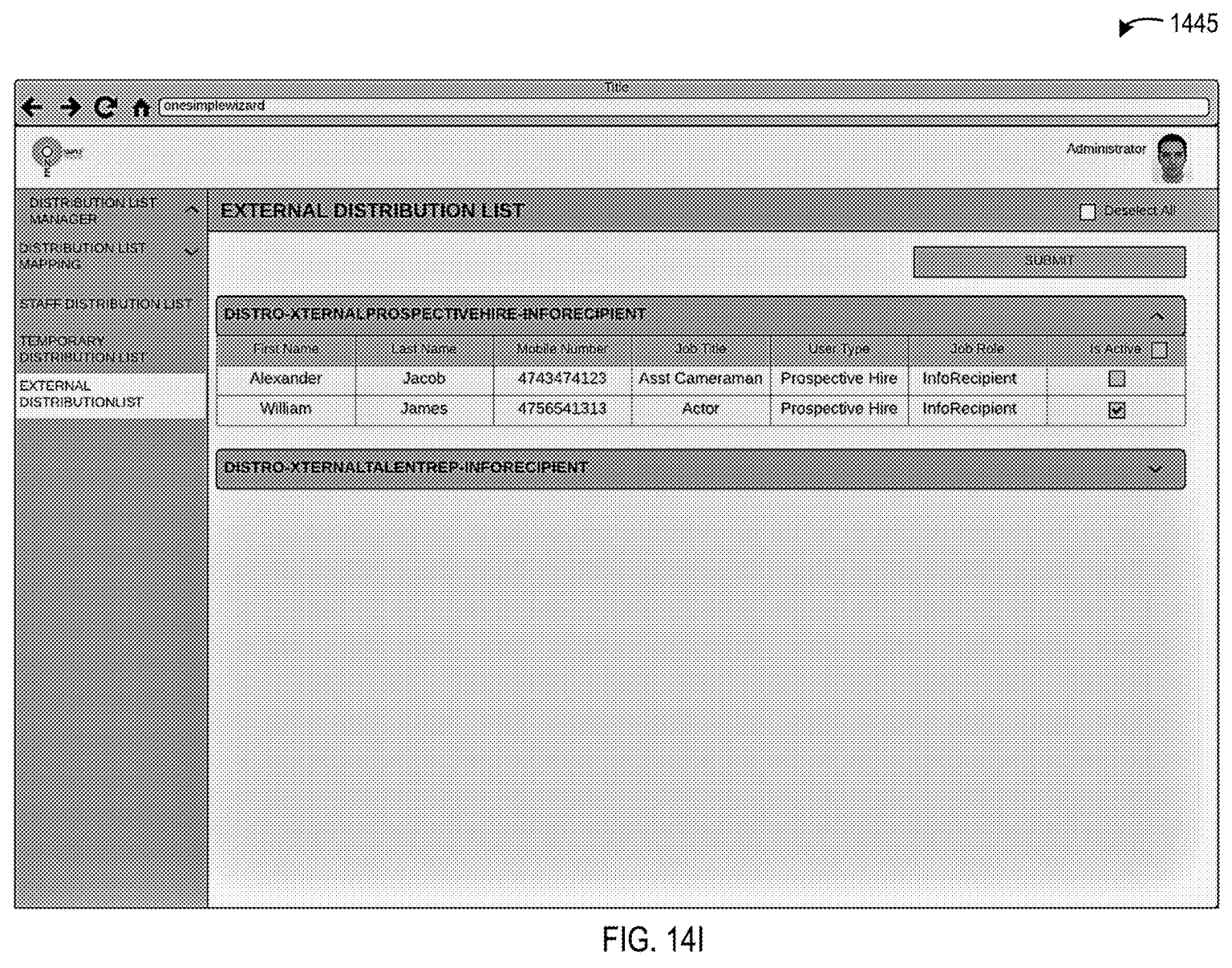

FIGS. 14A-14I depict screenshots of example distribution manager interfaces 1405-1445 of an example limited-administration server system according to some embodiments. FIG. 14A shows a sign-on page in which a distribution manager may sign-on to a distribution manager portal. FIGS. 14B-14E show interfaces for creating a distribution list mapping (or, creating a distribution list). The distribution manager can create groups, assigns locations, department lists, job roles, user types, units lists, and/or the like. FIGS. 14F-14I show example distribution lists.

FIGS. 15A-15B depict screenshots of example monitor manager interfaces 1105-1110 of an example limited-administration server system according to some embodiments. FIG. 15A shows a sign-on page in which a monitor manager may sign-on to monitor manager portal. FIG. 15B shows an example security audit log. The example security audit log includes an entry/action type (e.g., failure audit), a date, time, source application, category, user identifier, computer identifier, event class, and message text.

Figure 16:
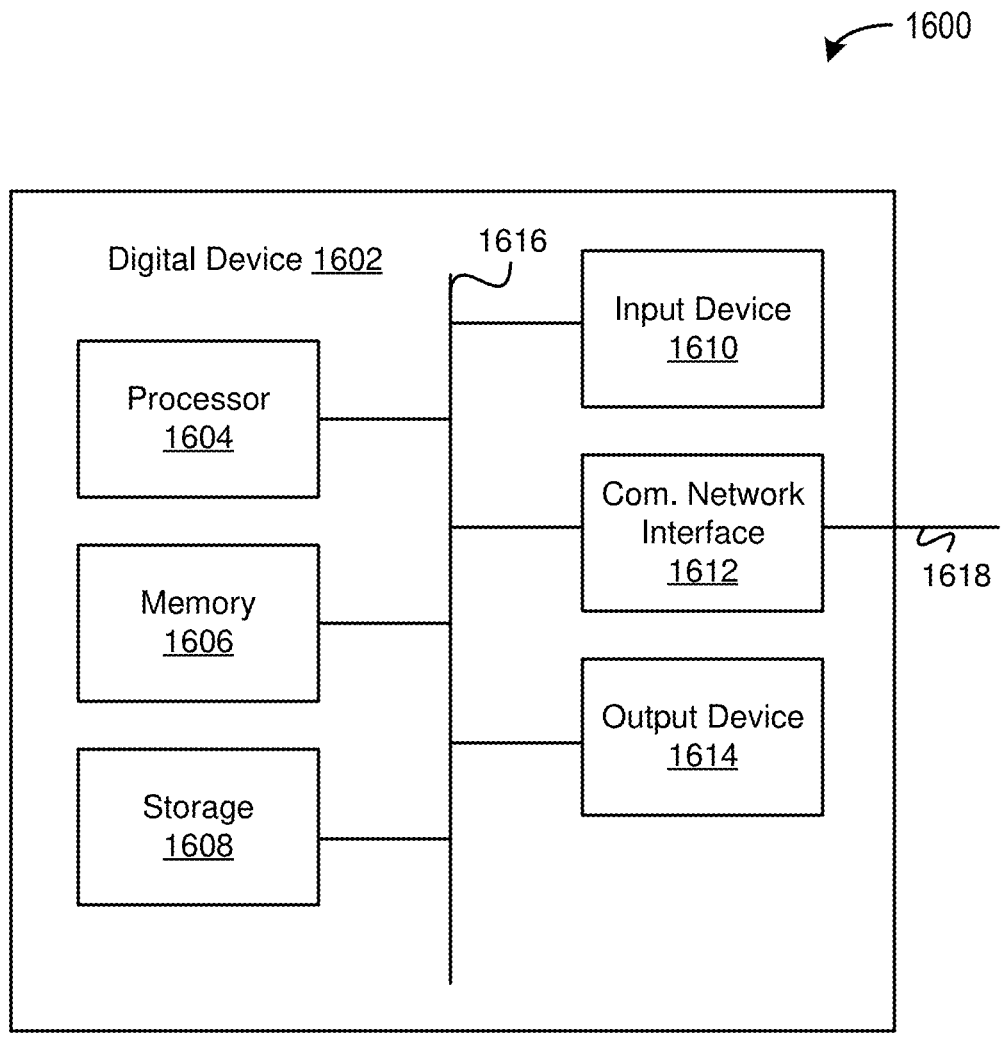
FIG. 16 depicts a diagram of an example computer system for implementing the features disclosed herein.

FIG. 16 depicts a diagram 1600 of an example of a computing device 1602. Any of the systems 102-108, and the communication network 110 may comprise an instance of one or more computing devices 1602. The computing device 1602 comprises a processor 1604, memory 1606, storage 1608, an input device 1610, a communication network interface 1612, and an output device 1614 communicatively coupled to a communication channel 1616. The processor 1604 is configured to execute executable instructions (e.g., programs). In some embodiments, the processor 1604 comprises circuitry or any processor capable of processing the executable instructions.

The memory 1606 stores data. Some examples of memory 1606 include storage devices, such as RAM, ROM, RAM cache, virtual memory, etc. In various embodiments, working data is stored within the memory 1606. The data within the memory 1606 may be cleared or ultimately transferred to the storage 1608.

The storage 1608 includes any storage configured to retrieve and store data. Some examples of the storage 1608 include flash drives, hard drives, optical drives, cloud storage, and/or magnetic tape. Each of the memory system 1606 and the storage system 1608 comprises a computer-readable medium, which stores instructions or programs executable by processor 1604.

The input device 1610 is any device that inputs data (e.g., mouse and keyboard). The output device 1614 outputs data (e.g., a speaker or display). It will be appreciated that the storage 1608, input device 1610, and output device 1614 may be optional. For example, the routers/switchers may comprise the processor 1604 and memory 1606 as well as a device to receive and output data (e.g., the communication network interface 1612 and/or the output device 1614).

The communication network interface 1612 may be coupled to a network (e.g., network 110) via the link 1618. The communication network interface 1612 may support communication over an Ethernet connection, a serial connection, a parallel connection, and/or an ATA connection. The communication network interface 1612 may also support wireless communication (e.g., 802.11a/b/g/n, WiMax, LTE, WiFi). It will be apparent that the communication network interface 1612 may support many wired and wireless standards.

It will be appreciated that the hardware elements of the computing device 1602 are not limited to those depicted in FIG. 16. A computing device 1602 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1604 and/or a co-processor located on a GPU (e.g., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A deployment server system comprising:
one or more processors; and
memory storing instructions that, when executed by the one or more processors, cause the system to perform:
storing one or more template limited-administration ontologies, each template limited administration ontology of the one or more template limited-administration ontologies identifying a closed set of different managers associated with the template limited administration ontology, each different manager of the closed set of different managers having distinct and limited system access privileges and functions;
receiving a request for a limited-administration server system, the request being associated with a client entity;
selecting a particular template limited-administration ontology of the one or more template limited-administration ontologies based on the request;
generating a deployment ontology based on the particular template limited-administration ontology and the request;
generating a limited-administration server system deployment package based on the deployment ontology; and
processing the limited-administration server system deployment package, the processing of the limited-administration server system deployment package causing the deployment server to assist in creating the limited-administration server system, the limited-administration server system being capable of controlling access to one or more other systems associated with the client entity, and to assist in creating a particular closed set of different managers, each different manager of the particular closed set of different managers having particular distinct and limited system privileges and functions identified in the deployment ontology, no manager of the particular closed set of different managers having access to all system privileges and functions, no manager of the particular closed set of different managers having access to the deployment server.

2. The system of claim 1, wherein the particular set of different managers includes an access permissions manager, the access permission manager including system access privileges for assigning one or more user types to one or more groups.

3. The system of claim 1, wherein the particular set of different managers includes a distribution manager, the distribution manager including system access privileges for creating distribution lists.

4. The system of claim 1, wherein the particular set of different managers includes a user manager, the user manager including system access privileges for adding, removing, and suspending one or more users, wherein adding one or more users includes storing user information associated with each added user.

5. The system of claim 4, wherein the particular set of different managers includes an invitation manager, the invitation manager including system access privileges for verifying the user information associated with each of one or more users.

6. The system of claim 1, wherein the particular set of different managers includes a device manager, the device manager including system access privileges for registering user devices, the user devices including (BYOD) devices and non-BYOD devices.

7. The system of claim 6, wherein the particular set of different managers includes a monitor manager, the monitor manager including system access privileges for accessing one or more activity logs associated with the user devices.

8. A method being implemented by a deployment server system including one or more physical processors and storage media storing machine-readable instructions, the method comprising:
storing one or more template limited-administration ontologies, each template limited administration ontology of the one or more template limited-administration ontologies identifying a closed set of different managers associated with the template limited administration ontology, each different manager of the closed set of different managers having distinct and limited system access privileges and functions;
receiving a request for a limited-administration server system, the request being associated with a client entity;
selecting a particular template limited-administration ontology of the one or more template limited-administration ontologies based on the request;
generating a deployment ontology based on the particular template limited-administration ontology and the request;
generating a limited-administration server system deployment package based on the deployment ontology; and
processing the limited-administration server system deployment package, the processing of the limited-administration server system deployment package causing the deployment server to assist in creating the limited-administration server system, the limited-administration server system being capable of controlling access to one or more other systems associated with the client entity, and to assist in creating a particular closed set of different managers, each different manager of the particular closed set of different managers having particular distinct and limited system privileges and functions identified in the deployment ontology, no manager of the particular closed set of different managers having access to all system privileges and functions, no manager of the particular closed set of different managers having access to the deployment server.

9. The method of claim 8, wherein the of different managers includes an access permissions manager, the access permission manager including system access privileges for assigning one or more user types to one or more groups.

10. The method of claim 8, wherein the particular set of different managers includes a distribution manager, the distribution manager including system access privileges for creating distribution lists.

11. The method of claim 8, wherein the particular set of different managers includes a user manager, the user manager including system access privileges for adding, removing, and suspending one or more users, wherein adding one or more users includes storing user information associated with each added user.

12. The method of claim 11, wherein the particular set of different managers includes an invitation manager, the invitation manager including system access privileges for verifying the user information associated with each of one or more users.

13. The method of claim 8, wherein the particular set of different managers includes a device manager, the device manager including system access privileges for registering user devices, the user devices including BYOD devices and non-BYOD devices.

14. The method of claim 13, wherein the particular set of different managers includes a monitor manager, the monitor manager including system access privileges for accessing one or more activity logs associated with the user devices.

15. A non-transitory computer readable medium comprising instructions that, when executed, cause one or more processors of a deployment server system to perform:
storing one or more template limited-administration ontologies, each template limited administration ontology of the one or more template limited-administration ontologies identifying a closed set of different managers associated with the template limited administration ontology, each different manager of the closed set of different managers having distinct and limited system access privileges and functions;
receiving a request for a limited-administration server system, the request being associated with a client entity;
selecting a particular template limited-administration ontology of the one or more template limited-administration ontologies based on the request;
generating a deployment ontology based on the particular template limited-administration ontology and the request;
generating a limited-administration server system deployment package based on the deployment ontology; and
processing the limited-administration server system deployment package, the processing of the limited-administration server system deployment package causing the deployment server to assist in creating the limited-administration server system, the limited-administration server system being capable of controlling access to one or more other systems associated with the client entity, and to assist in creating a particular closed set of different managers, each different manager of the particular closed set of different managers having particular distinct and limited system privileges and functions identified in the deployment ontology, no manager of the particular closed set of different managers having access to all system privileges and functions, no manager of the particular closed set of different managers having access to the deployment server.

16. The non-transitory computer readable medium of claim 15, wherein the plurality of different managers includes an access permissions manager, the access permission manager including system access privileges for assigning one or more user types to one or more groups.

17. The non-transitory computer readable medium of claim 15, wherein the particular set of different managers includes a distribution manager, the distribution manager including system access privileges for creating distribution lists.

18. The non-transitory computer readable medium of claim 15, wherein the particular set of different managers includes a device manager, the device manager including system access privileges for registering user devices, the user devices including BYOD devices and non-BYOD devices.

19. The non-transitory computer readable medium of claim 15, wherein the particular set of different managers includes a user manager, the user manager including system access privileges for adding, removing, and suspending one or more users, wherein adding one or more users includes storing user information associated with each added user.

20. The non-transitory computer readable medium of claim 19, wherein the particular set of different managers includes an invitation manager, the invitation manager including system access privileges for verifying the user information associated with each of one or more users.

* * * * *